United States Patent
Yang et al.

(10) Patent No.: US 11,800,415 B2
(45) Date of Patent: Oct. 24, 2023

(54) METHOD AND COMMUNICATION DEVICE FOR PERFORMING MEASUREMENT

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 17/251,181

(22) PCT Filed: Aug. 2, 2019

(86) PCT No.: PCT/KR2019/009651
§ 371 (c)(1),
(2) Date: Dec. 10, 2020

(87) PCT Pub. No.: WO2020/027615
PCT Pub. Date: Feb. 6, 2020

(65) Prior Publication Data
US 2021/0227413 A1    Jul. 22, 2021

(30) Foreign Application Priority Data

Aug. 2, 2018 (KR) .................. 10-2018-0090450
Sep. 19, 2018 (KR) .................. 10-2018-0112234

(51) Int. Cl.
*H04W 36/00* (2009.01)
*H04W 24/08* (2009.01)
(Continued)

(52) U.S. Cl.
CPC ....... *H04W 36/0069* (2018.08); *H04W 24/08* (2013.01); *H04W 24/10* (2013.01); *H04W 72/0446* (2013.01); *H04L 27/2602* (2013.01)

(58) Field of Classification Search
None
See application file for complete search history.

(56) References Cited

U.S. PATENT DOCUMENTS

2014/0094188 A1* 4/2014 Kazmi .................. H04W 4/023
                                                                   455/456.1
2015/0249934 A1   9/2015 Siomina et al.
(Continued)

FOREIGN PATENT DOCUMENTS

WO    2017077463    5/2017

OTHER PUBLICATIONS

PCT International Application No. PCT/KR2019/009651, International Search Report dated Nov. 8, 2019, 2 pages.
(Continued)

*Primary Examiner* — Chi H Pham
*Assistant Examiner* — Raul Rivas
(74) *Attorney, Agent, or Firm* — LEE HONG DEGERMAN KANG WAIMEY

(57) ABSTRACT

There is provided a method for performing measurement, the method performed by a communication device and comprising: receiving information related to configured measurement gap (MG) from a serving cell, wherein the information related to the configured MG includes MG timing advance value; determining a MG based on the information related to the configured MG; and performing the measurement during the determined MG, wherein the determined MG starts at the MG timing advance value advanced to an end of the latest subframe occurring immediately before the configured MG.

18 Claims, 76 Drawing Sheets

(51) Int. Cl.
    *H04W 24/10*     (2009.01)
    *H04W 72/0446*     (2023.01)
    *H04L 27/26*     (2006.01)

(56) References Cited

U.S. PATENT DOCUMENTS

| | | | |
|---|---|---|---|
| 2017/0164249 A1 | 6/2017 | Uemura et al. | |
| 2018/0295600 A1* | 10/2018 | Kumar | H04L 5/0051 |
| 2020/0154481 A1* | 5/2020 | Goto | H04W 74/0833 |
| 2020/0154485 A1* | 5/2020 | Gao | H04L 27/2607 |

OTHER PUBLICATIONS

Nokia, et al., "Interruption time for MG in EN-Dc", 3GPP TSG RAN WG4 Meeting #86, R4-1803476, Mar. 2018, 8 pages.

NTT Docomo, "[draft] Clarification on measurement gap timing advance", 3GPP TSG RAN WG4 Meeting #86bis, R4-1805510, Apr. 2018, 8 pages.

* cited by examiner

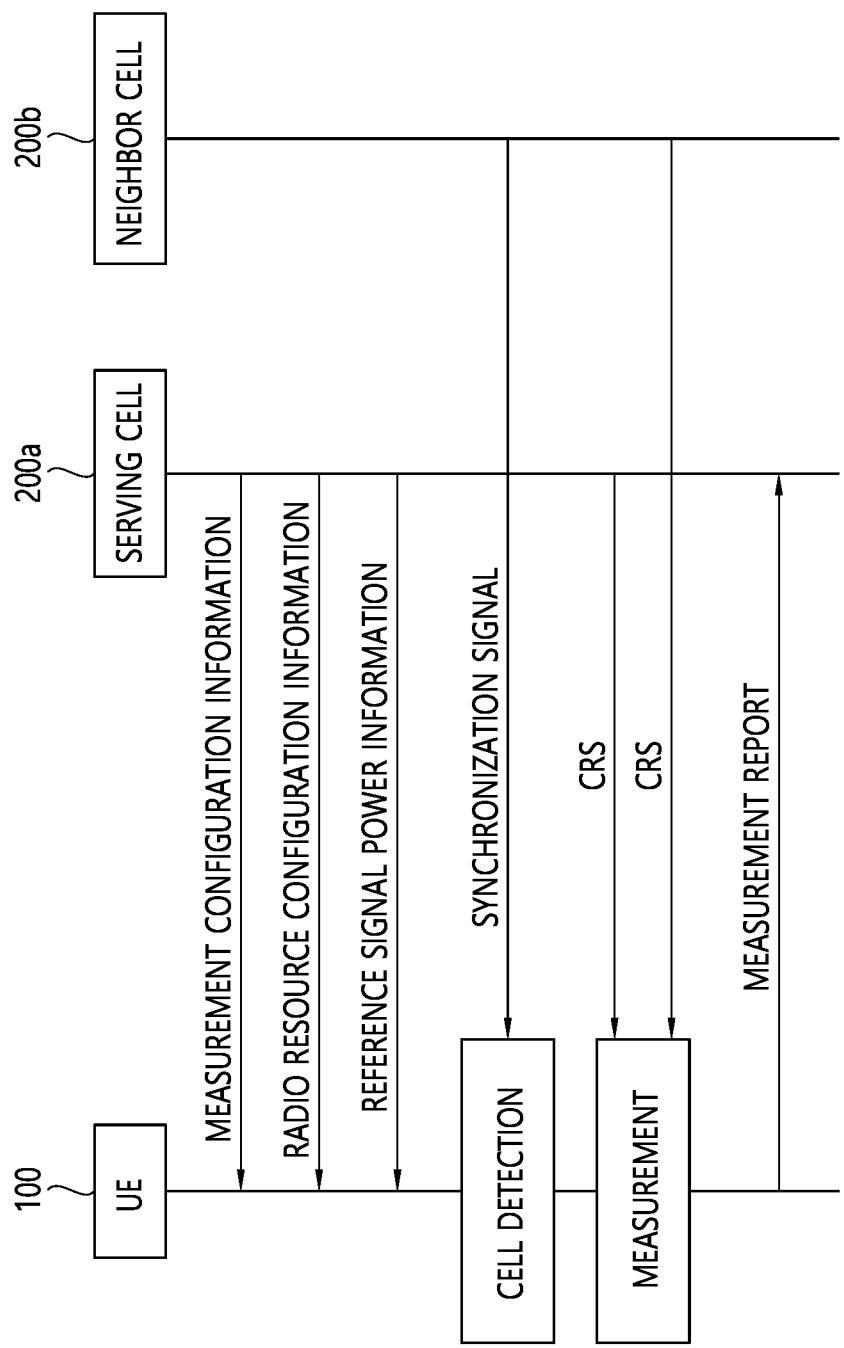

METHOD AND COMMUNICATION DEVICE FOR PERFORMING MEASUREMENT

CROSS-REFERENCE TO RELATED APPLICATIONS

This application is the National Stage filing under 35 U.S.C. 371 of International Application No. PCT/KR2019/009651, filed on Aug. 2, 2019, which claims the benefit of earlier filing date and right of priority to Korean Patent Application Nos. 10-2018-0090450, filed on Aug. 2, 2018, and 10-2018-0112234, filed on Sep. 19, 2018, the contents of which are all incorporated by reference herein in their entirety.

FIELD OF THE SPECIFICATION

The present specification relates to mobile communication.

BACKGROUND ART

With the success of long term evolution (LTE)/LTE-A (LTE-Advanced) for the 4th generation mobile communication, more interest is rising to the next generation, i.e., 5th generation (also known as 5G, NR(New Radio), 5G NR) mobile communication and extensive research and development are being carried out accordingly.

A user equipment (UE) may perform measurements by using measurement gap (MG). The MG is periods that the UE may use to perform measurements. In NR, MG timing advance (MGTA) is introduced for adjusting timing of the MG.

However, it is still unclear that how the MGTA is applied for using the MG. Thus, there are problems that data transmission or data reception before and after the MG cannot be performed clearly or efficiently. UE behavior related to the MGTA needs to be clearly defined to solve the problems.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a method for performing measurement. The method by a communication device and comprising: receiving information related to configured measurement gap (MG) from a serving cell, wherein the information related to the configured MG includes MG timing advance value; determining a MG based on the information related to the configured MG; and performing the measurement during the determined MG, wherein the determined MG starts at the MG timing advance value advanced to an end of the latest subframe occurring immediately before the configured MG.

Wherein a starting time of the determined MG is determined based on DL timing of the latest subframe occurring immediately before the MG and the information related to the MG.

Wherein the starting time of the determined MG is determined to be a time point that the MG timing advance value advanced to the end of the latest subframe occurring immediately before the configured MG.

Wherein the determined MG starts at the starting time of the MG and the determined MG ends at a time point that a MG Length (MGL) value after from the starting time of the MG.

Wherein the information related to the configured MG further includes MG Length (MGL) value and MG Repetition Period (MGRP) value.

Wherein the configured MG is one of per-wireless device MG, per-FR MG for (Frequency Range) FR 1, and per-FR MG for FR 2.

The method further comprising: transmitting uplink data based on subcarrier spacing (SCS) value configured for the wireless device and the MG timing advance value.

Wherein half-slots, which do not overlap with the determined MG, occur before and after the determined MG, based on that subcarrier spacing (SCS) value configured for the wireless device is equal to 15 kHz.

Wherein the MG timing advance value is one of 0 ms, 0.25 ms or 0.5 ms.

Wherein the MG timing advance is not applied for the measurement based on that the MG timing advance value is equal to 0 ms.

In accordance with an embodiment of the present disclosure, a disclosure of the present specification provides a communication device for performing measurement, the communication device comprising, a transceiver; a memory and a processor operatively coupled to the transceiver and the memory, the processor is configured to: control the transceiver to receive information related to measurement gap (MG) from a serving cell, wherein the information related to the configured MG includes MG timing advance value; determine a MG based on the information related to the configured MG; and perform the measurement during the determined MG, wherein the determined MG starts at the MG timing advance value advanced to an end of the latest subframe occurring immediately before the configured MG.

Wherein the communication device is a autonomous driving device communicating with at least one of a mobile terminal, network or autonomous driving vehicle other than the communication device.

In accordance with an embodiment of the present disclosure, a disclosure of the present specification provides a processor for a communication device, wherein the processor is configured to control the communication device to: receive information related to measurement gap (MG) from a serving cell, wherein the information related to the configured MG includes MG timing advance value; determine a MG based on the information related to the configured MG; and perform the measurement during the determined MG, wherein the determined MG starts at the MG timing advance value advanced to an end of the latest subframe occurring immediately before the configured MG.

According to a disclosure of the present disclosure, the above problem of the related art is solved.

BRIEF DESCRIPTION OF THE DRAWINGS

FIG. 2 shows a procedure for cell detection and measurement.

DESCRIPTION OF EXEMPLARY EMBODIMENTS

Figure 1:
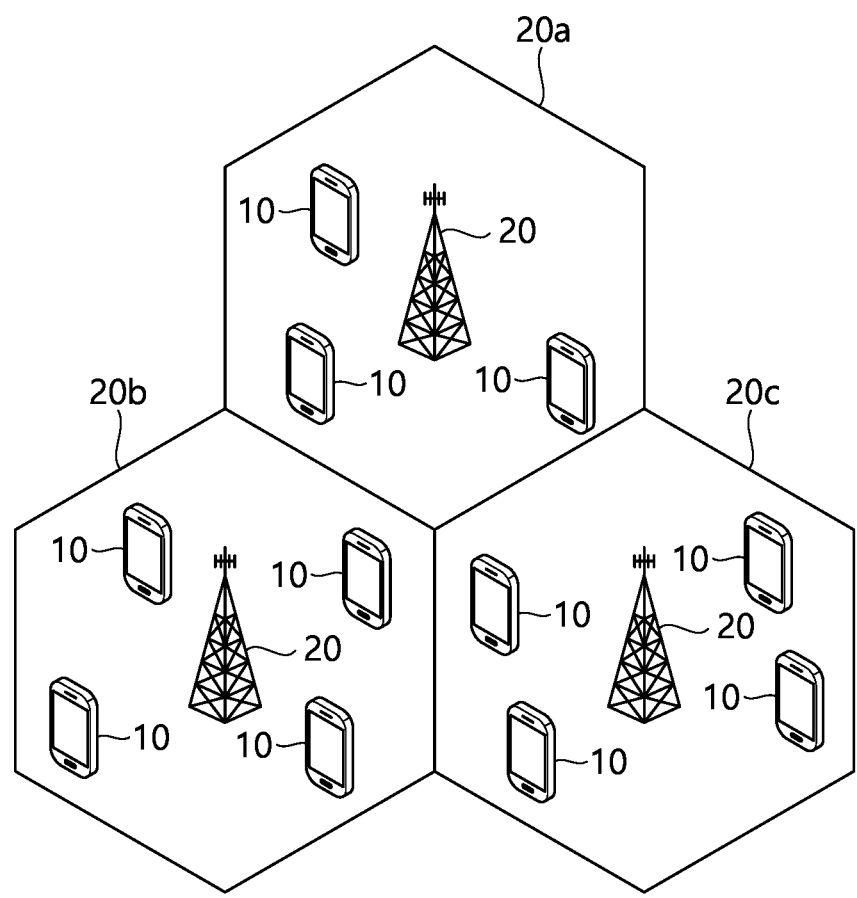
FIG. 1 is a wireless communication system.

Hereinafter, based on 3rd Generation Partnership Project (3GPP) long term evolution (LTE), 3GPP LTE-advanced (LTE-A) or 3GPP fifth-generation (so called 5G) mobile communication (a new radio access technology (New RAT or NR)), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), gNB (next generation NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (PCell) based on a CRS. This is so called Radio Link Monitoring (RLM).

FIG. 2 Shows a Procedure for Cell Detection and Measurement.

Referring to FIG. 2, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200a and the neighbor cell respectively transmit Cell-specific Reference Signals (CRSs), the UE 100 measures the CRSs and transmits a result of the measurement to the serving cell 200a. In this case, the UE 100 may compare power of the received CRS s based on received information on a reference signal power.

At this point, the UE 100 may perform the measurement in the following three ways.

1) RSRP (reference signal received power): This represents an average reception power of all REs that carry the CRS which is transmitted through the whole bands. In this case, instead of the CRS, an average reception power of all REs that carry the CSI RS may also be measured.

2) RS S (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100a for the measurement. The radio resource configuration information element (IE) is used to configure/modify/cancel a radio bearer or to modify an MAC configuration. The radio resource configuration IE includes subframe pattern information. The subframe pattern information is information on a measurement resource restriction pattern on the time domain, for measuring RSRP and RSRQ of a serving cell (e.g., PCell).

Meanwhile, the UE 100 receives a measurement configuration information element (IE) from the serving cell 100a for the measurement. A message including the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. A message including the measurement result is called a measurement report message.

The measurement configuration IE may include measurement object information. The measurement object information is information of an object which is to be measured by the UE. The measurement object includes at least one of an intra-frequency measurement object which is an object of intra-cell measurement, an inter-frequency measurement object which is an object of inter-cell measurement and an inter-RAT measurement object which is an object of inter- RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

TABLE 1

Measurement object field description carrierFreq
This indicates an E-UTRA carrier frequency to which this configuration is applied.
measCycleSCell
This indicates a cycle for measurement of a secondary cell (SCell) in a non-activated state. Its value may be set to 40, 160, 256, etc. If the value is 160, it indicates that measurement is performed every 160 subframes.

Meanwhile, the measurement configuration IE includes an information element (IE) as shown in the following table.

TABLE 2

MeasConfig field description allowInterruptions
If its value is True, it indicates that interruption of transmission and reception with a serving cell is allowed when measurement of subcarriers of an Scell in a non-active state is performed using MeasCycleScell.
measGapConfig
It indicates configuration or cancelation of a measurement gap.

The "measGapConfig" is used to configure or cancel a measurement gap (MG). The MG is a period for cell identification and RSRP measurement on an inter frequency different from that of a serving cell.

TABLE 3

MeasGapConfig field description gapOffset
Any one of gp0 and gp1 may be set as a value of gapOffset. gp0 corresponds to a gapoffset of pattern ID "0" having MGRP = 40 ms.
gp1 corresponds to a gapoffset of pattern ID "1" having MGRP = 80 ms.

TABLE 4

| Gap pattern Id | Measurement Gap Length (MGL) | Measurement Gap Repetition Period (MGRP) | Minimum available time for inter-frequency and inter-RAT measurements during 480 ms period |
| --- | --- | --- | --- |
| 0 | 6 ms | 40 ms | 60 ms |
| 1 | 6 ms | 80 ms | 30 ms |

When the UE requires a measurement gap to identify and measure a cell at an inter-frequency and inter-RAT, the E-UTRAN (i.e., the base station) may provide a single measurement gap (MG) pattern with a predetermined gap period to the UE. Without transmitting or receiving any data from the serving cell for the measurement gap period, the UE retunes its RF chain to be adapted to the inter-frequency and then performs measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB). Also, an eNodeB for the PCell or gNB for the PCell may be referred to as a master node (MN). An eNodeB for the Scell or gNB for the Scell may be referred to as a secondary node (SN).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Next-Generation Mobile Communication Network>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 3A:
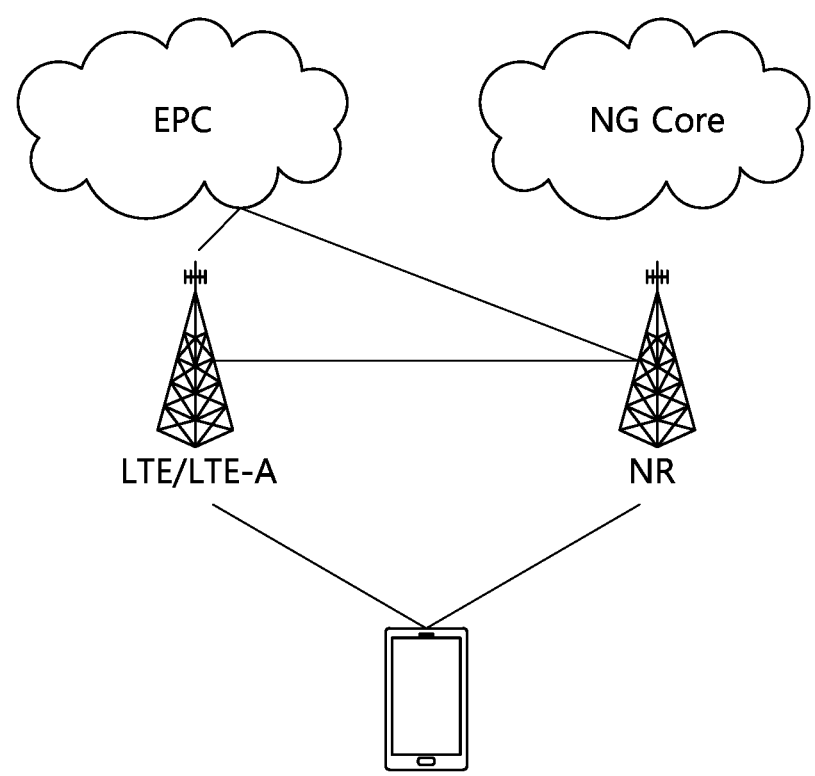
FIGS. 3A to 3C are diagrams illustrating exemplary architecture for a next-generation mobile communication service.
Figure 3B:
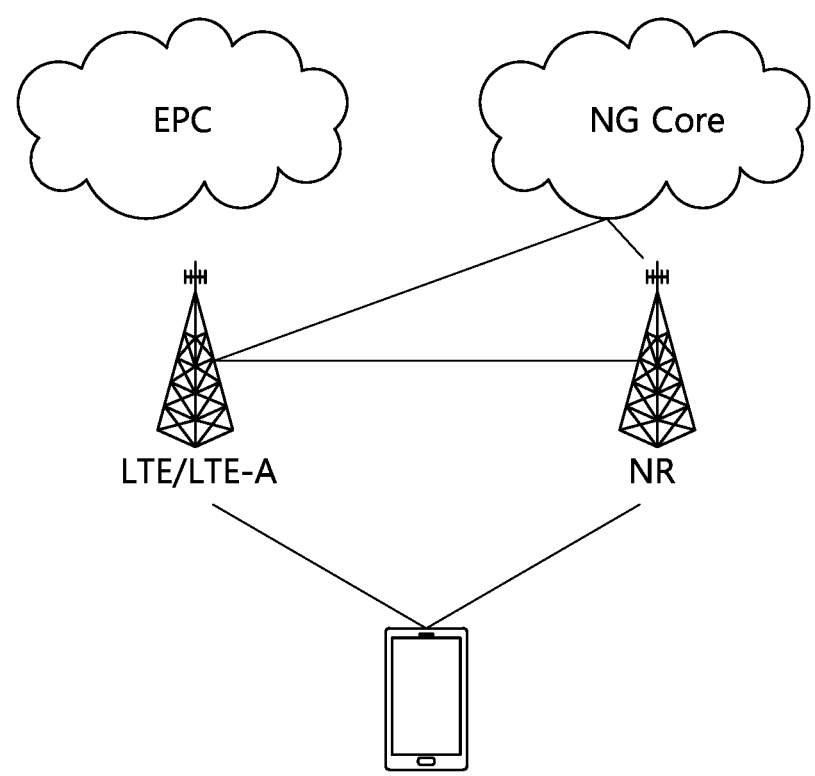
Figure 3C:
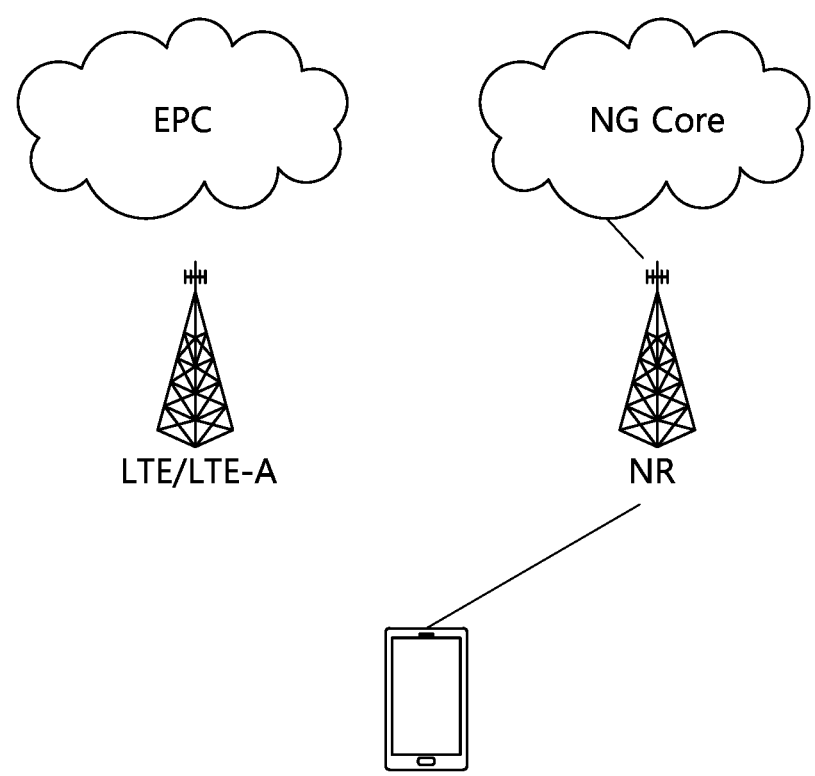

FIGS. 3A to 3C are Diagrams Illustrating Exemplary Architecture for a Next-Generation Mobile Communication Service.

Referring to FIG. 3A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 3B, the LTE/LTE-A cell is connected with a core network for 5th generation mobile communication, that is, a Next Generation (NG) core network, unlike the example in FIG. 3A.

A service based on the architecture shown in FIGS. 3A and 3B is referred to as a non-standalone (NSA) service.

Referring to FIG. 3C, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 4A:
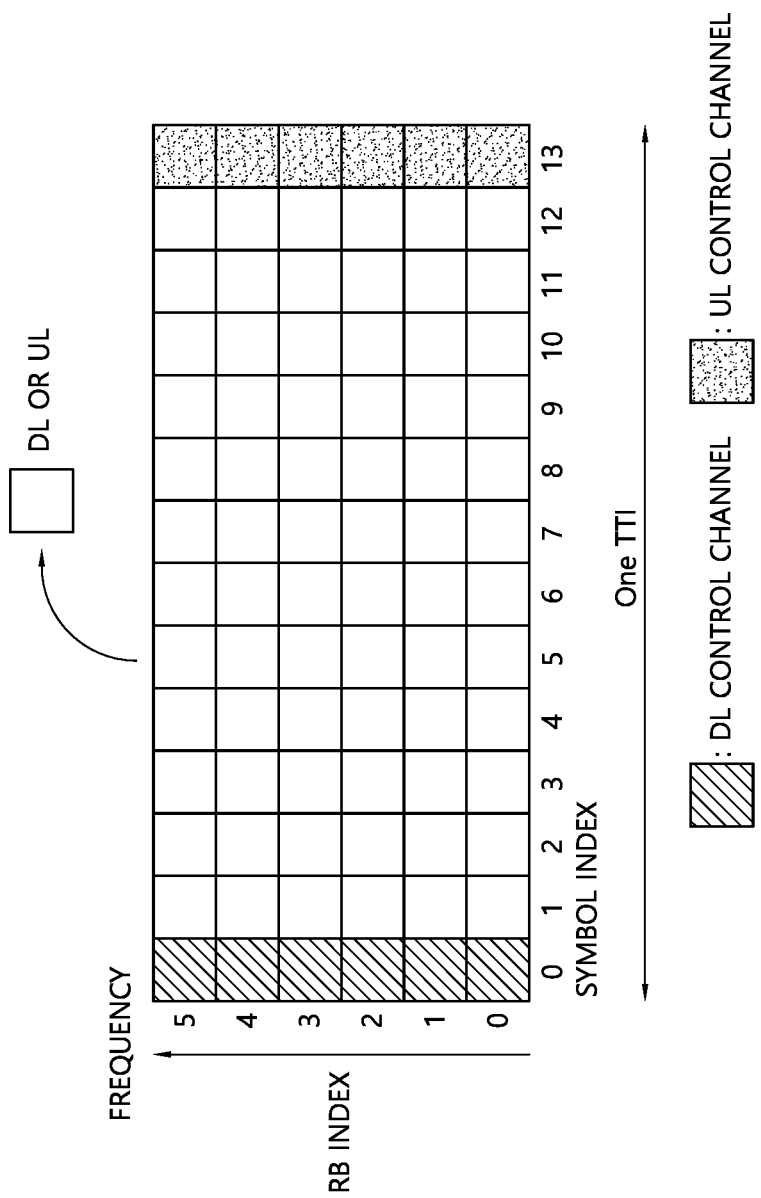
FIG. 4A shows an example of a subframe type in NR.
Figure 4B:
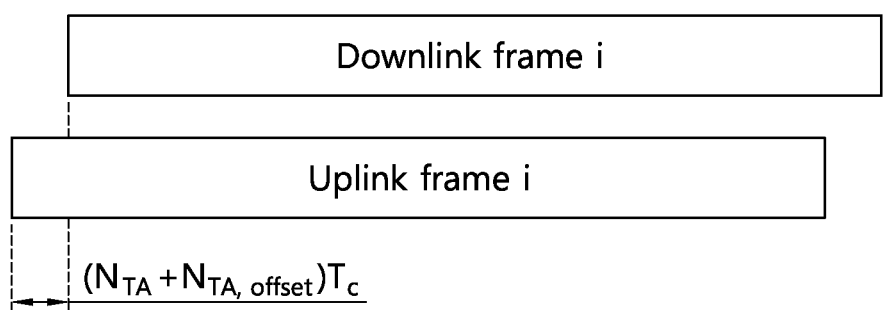
FIG. 4B shows an example of uplink-downlink timing relation in NR.

FIG. 4A Shows an Example of Subframe Type in NR.
FIG. 4B Shows an Example of Uplink-Downlink Timing Relation in NR.

A transmission time interval (TTI) shown in FIG. 4A may be called a subframe or slot for NR (or new RAT). The subframe (or slot) in FIG. 4A may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

As shown in FIG. 4B, there is one set of frames in the uplink and one set of frames in the downlink on a carrier.

Transmission of uplink frame number i from the UE shall start $T_{TA}=(N_{TA}+N_{TA,offset})T_c$ before the start of the corresponding downlink frame at the UE where $N_{TA,offset}$ depends on the frequency band. $N_{TA}$ is a value related to timing advance. $N_{TA}$ is received from the serving cell by RAR (Random Access Response) or by MAC-CE (MAC Control Element). $N_{TA,offset}$ is a offset value related to the timing advance. The UE identifies $N_{TA,offset}$ by receiving information related to $N_{TA,offset}$ from the serving cell. For example, $N_{TA,offset}$ may be 25600 (for example, for FR1 FDD band without LTE-NR coexistence case, for FR1 TDD band without LTE-NR coexistence case, or for default case when the UE does not receive information related to $N_{TA,offset}$ from the serving cell), 0 (for example, for FR1 FDD band with LTE-NR coexistence case), 39936 or 25600 (for example, for FR1 TDD band with LTE-NR coexistence case), or 13792 (for example, for FR2 case). $T_{TA}$ is a timing advance value. $T_c$ is 0.509 ns. A timing advance is used to control UL timing with reference to DL timing.

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 5

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OFDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 6

| μ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |

TABLE 6-continued

| μ | $N_{symb}^{slot}$ | $N_{slot}^{frame,\mu}$ | $N_{slot}^{subframe,\mu}$ |
|---|---|---|---|
| 4 | 14 | 160 | 16 |
| 5 | 14 | 320 | 32 |

In the case of an extended CP, when an index of a numerology is represented by μ, the number of OFDM symbols per slot $N^{slot}_{symb}$, the number of slots per frame Nframe,μslot, and the number of slots per subframe Nsubframe,μslot are expressed as shown in the following table.

TABLE 7

| μ | $N_{symb}^{slot}$ | $N_{slot}^{frame,\mu}$ | $N_{slot}^{subframe,\mu}$ |
|---|---|---|---|
| 2 | 12 | 40 | 4 |

<Operating Band in NR>

Operating bands in NR are divided into FR 1 (Frequency Range 1) band and FR 2 band. FR 1 band includes a frequency band of 7.125 GHz or less, and FR 2 band includes a frequency band exceeding 7.125 GHz. FR 1 band and FR 2 band are shown in Table 8.

TABLE 8

| Frequency Range | Corresponding range of frequency |
|---|---|
| Frequency Range 1 (FR 1) | 410 MHz-7125 MHz |
| Frequency Range 2 (FR 2) | 24250 MHz-52600 MHz |

<SS Block in NR>

In 5G NR, the UE defines a physical block channel (PBCH) including information required to perform an initial access, that is, a master information block (MIB) and a synchronization signal SS (including PSS and SSS). SS block is SS(Synchronization Signal)/PBCH (Physical Broadcast Channel) Block (SSB). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 5:
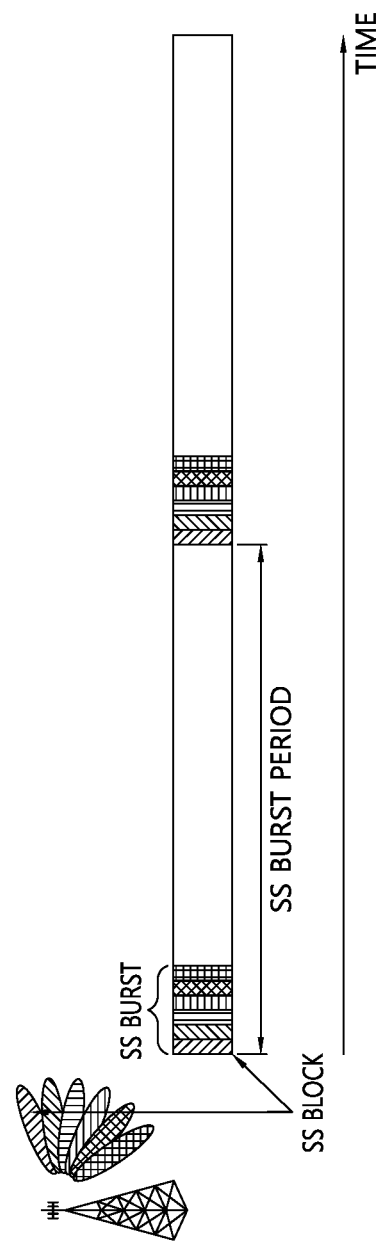
FIG. 5 is an exemplary diagram illustrating an example of an SS block in NR.

FIG. 5 is an exemplary diagram illustrating an example of an SS block in NR.

Referring to FIG. 5, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 6.

Figure 6:
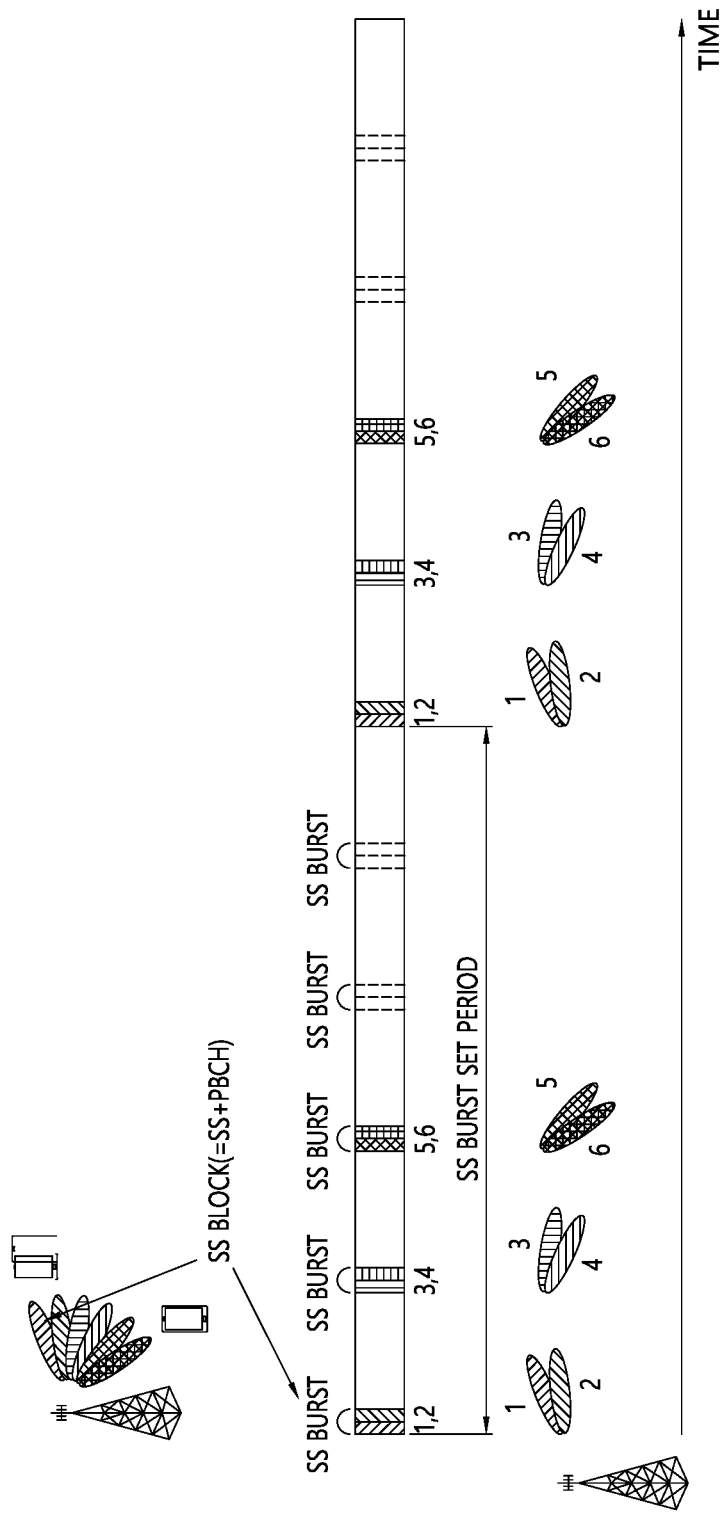
FIG. 6 is an exemplary diagram illustrating an example of beam sweeping in NR.

FIG. 6 is an exemplary diagram illustrating an example of beam sweeping in NR.

The base station transmits each SS block in the SS burst with beam sweeping over time. At this time, the SS blocks in the SS burst set are transmitted in order to support UEs existing in different directions. In FIG. 6, the SS burst set includes SS blocks 1 to 6, and each SS burst includes two SS blocks.

<RRM Measurement>

The purpose of Radio Resource Management (RRM) measurement is to ensure UE mobility by comparing the measurement result for the serving cell with the measurement result for the neighboring cell. The UE can measure RSRP, RSRQ, or SINR, etc. based on the signal received from the serving cell and the signal received from the neighboring cell, and report the measurement result to the serving cell. Then, the serving cell compares the measurement result of the serving cell with the measurement result of the neighboring cell, determines a procedure (for example, a handover procedure) related to the UE mobility, and performs the procedure to ensure mobility of the UE.

The UE may perform RRM measurement (SSB based RRM measurement) based on the SSB transmitted by the serving cell and the SSB transmitted by the neighboring cell. The UE may perform RRM measurement (CSI-RS based RRM measurement) based on the CSI-RS transmitted by the serving cell and the CSI-RS transmitted by the neighboring cell.

<Synchronization Signal (SS) Reference Signal Received Power (SS-RSRP)>

SS-RSRP is an example of RRM measurement. SS reference signal received power (SS-RSRP) is defined as the linear average over the power contributions (in of the resource elements that carry secondary synchronization signals. The measurement time resource(s) for SS-RSRP are confined within SS/PBCH Block Measurement Time Configuration (SMTC) window duration. If SS-RSRP is used for L1-RSRP as configured by reporting configurations, the measurement time resources(s) restriction by SMTC window duration is not applicable.

For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal shall be measured by linear averaging over the power contributions of the resource elements that carry corresponding reference signals taking into account power scaling for the reference signals. If SS-RSRP is not used for L1-RSRP, the additional use of CSI reference signals for SS-RSRP determination is not applicable.

SS-RSRP shall be measured only among the reference signals corresponding to SS/PBCH blocks with the same SS/PBCH block index and the same physical-layer cell identity.

If SS-RSRP is not used for L1-RSRP and higher-layers indicate certain SS/PBCH blocks for performing SS-RSRP measurements, then SS-RSRP is measured only from the indicated set of SS/PBCH block(s).

For frequency range 1, the reference point for the SS-RSRP shall be the antenna connector of the UE. For frequency range 2, SS-RSRP shall be measured based on the combined signal from antenna elements corresponding to a given receiver branch. For frequency range 1 and 2, if receiver diversity is in use by the UE, the reported SS-RSRP value shall not be lower than the corresponding SS-RSRP of any of the individual receiver branches.

<SS Reference Signal Received Quality (SS-RSRQ)>

SS-RSRP is also an example of RRM measurement. Secondary synchronization signal reference signal received quality (SS-RSRQ) is defined as the ratio of N×SS-RSRP/NR carrier RSSI, where N is the number of resource blocks in the NR carrier RSSI measurement bandwidth. The measurements in the numerator and denominator shall be made over the same set of resource blocks.

NR carrier Received Signal Strength Indicator (NR carrier RSSI), comprises the linear average of the total received power (in [W]) observed only in certain OFDM symbols of measurement time resource(s), in the measurement bandwidth, over N number of resource blocks from all sources, including co-channel serving and non-serving cells, adjacent channel interference, thermal noise etc. For cell selection the measurement time resources(s) for NR Carrier RSSI are not constrained. Otherwise, the measurement time resource(s) for NR Carrier RSSI are confined within SS/PBCH Block Measurement Time Configuration (SMTC) window duration.

TABLE 9

| OFDM signal indication endSymbol | Symbol indexes |
|---|---|
| 0 | {0, 1} |
| 1 | {0, 1, 2, . . . , 10, 11} |
| 2 | {0, 1, 2, . . . , 5} |
| 3 | {0, 1, 2, . . . , 7} |

If indicated by higher-layers, if measurement gap is not used, the NR Carrier RSSI is measured in slots within the SMTC window duration that are indicated by the higher layer parameter measurementSlots and in OFDM symbols given by Table 2 and, if measurement gap is used, the NR Carrier RSSI is measured in slots within the SMTC window duration that are indicated by the higher layer parameter measurementSlots and in OFDM symbols given by Table 2 that are overlapped with the measurement gap.

For intra-frequency measurements, NR Carrier RSSI is measured with timing reference corresponding to the serving cell in the frequency layer For inter-frequency measurements, NR Carrier RSSI is measured with timing reference corresponding to any cell in the target frequency layer Otherwise not indicated by higher-layers, if measurement gap is not used, NR Carrier RSSI is measured from OFDM symbols within SMTC window duration and, if measurement gap is used, NR Carrier RSSI is measured from OFDM symbols corresponding to overlapped time span between SMTC window duration and the measurement gap.

If higher-layers indicate certain SS/PBCH blocks for performing SS-RSRQ measurements, then SS-RSRP is measured only from the indicated set of SS/PBCH block(s).

For frequency range 1, the reference point for the SS-RSRQ shall be the antenna connector of the UE. For frequency range 2, NR Carrier RSSI shall be measured based on the combined signal from antenna elements corresponding to a given receiver branch, where the combining for NR Carrier RSSI shall be the same as the one used for SS-RSRP measurements. For frequency range 1 and 2, if receiver diversity is in use by the UE, the reported SS-RSRQ value shall not be lower than the corresponding SS-RSRQ of any of the individual receiver branches.

Figure 7:
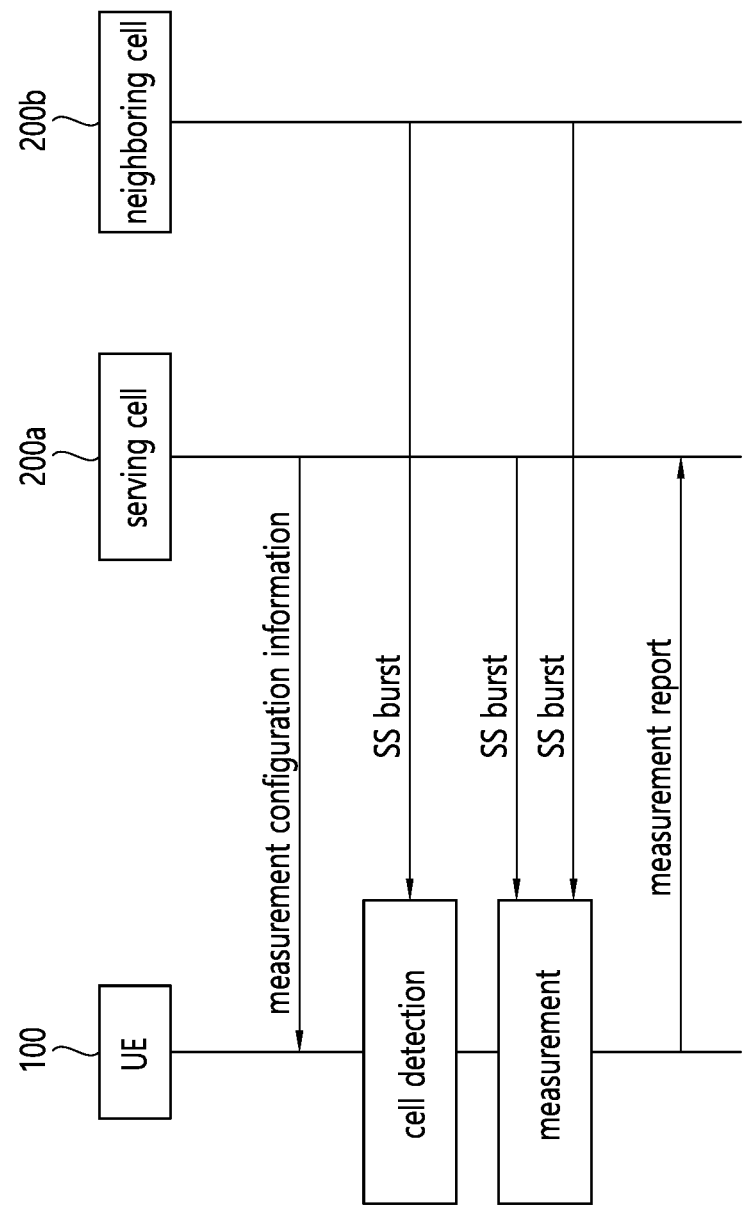
FIG. 7 shows measurement and measurement report procedure considering SS burst.

FIG. 7 Shows Measurement and Measurement Report Procedure Considering SS Burst.

As can be seen with reference to FIG. 7, the UE 100 may receive measurement configuration information from the serving cell 200a. The measurement configuration information may include information related to a first measurement gap, e.g., an intra frequency measurement gap or an inter frequency measurement gap. Also, the measurement configuration information may include information related to a second measurement gap, e.g., an intra frequency measurement gap for RSRP or an inter frequency measurement gap for RSRP.

The UE 100 may receive SS bursts from one or more neighboring cells 200b and perform cell detection.

The UE 100 may perform measurements based on SS bursts received from one or more neighboring cells 200b during the first measurement gap (e.g. an intra frequency measurement gap or an inter frequency measurement gap) indicated by the measurement configuration information. The UE may also perform measurements based on the SS burst received from the serving cell 200a.

Additionally, although not shown, the UE 100 may perform RSRP measurements based on the reference signal (RS) received from the one or more neighboring cells 200b during the second measurement gap.

The UE 100 may then perform a measurement report. The UE may reports a result of the measurements to the serving cell 200a.

Figure 8:
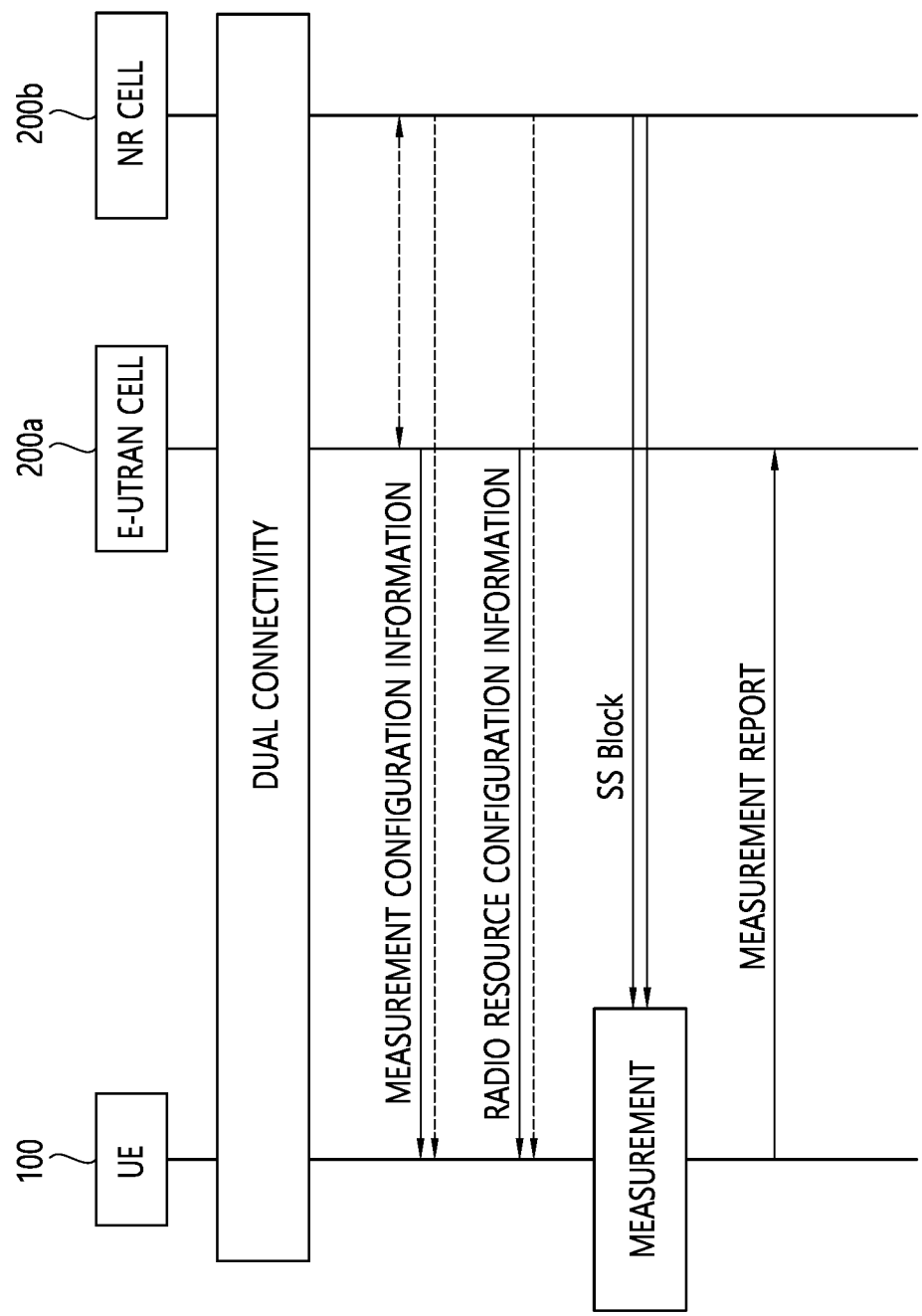
FIG. 8 shows an example of performing measurement in EN (E-UTRA and NR) DC case.

FIG. 8 Shows an Example of Performing Measurement in EN (E-UTRA and NR) DC Case.

Referring to FIG. 8, the UE 100 are connected in EN-DC with an E-UTRA (that is, LTE/LTE-A) cell. Here, a PCell in EN-DC may be an E-UTRA (that is, LTE/LTE-A) cell, and a PSCell in EN-DC may be an NR cell.

The UE 100 may receive measurement configuration (or "measconfig") information element (IE) of the E-UTRA (that is, LTE/LTE-A) cell. The measurement configuration (or "measconfig") IE received from the E-UTRA (that is, LTE/LTE-A) cell may further include fields shown in the following table, in addition to the fields shown in Table 10.

TABLE 10

| MeasConfig field description |
|---|
| fr1-Gap |
| This field exists when a UE is configured with EN-DC. This field indicates whether a gap is applied to perform measurement on FR1 band. |
| mgta |
| It indicates whether to apply a timing advance (TA) of 0.5 ms for a measurement gap configuration provided by the E-UTRAN. |

The measurement configuration (or "measconfig") IE may further include a measGapConfig field for setting a measurement gap (MG), as shown in Table 11. A gapoffset field within the measGapConfig field may further include gp4, gp5, . . . , gp11 for EN-DC, in addition to the example shown in Table 3.

Meanwhile, the UE 100 may receive a measurement configuration ("measconfig") IE of an NR cell, which is a PSCell, directly from the NR cell or through the E-UTRA cell which is a PCell.

Meanwhile, the measurement configuration ("measconfig") IE of the NR cell may include fields as shown in the following table.

TABLE 11

| MeasConfig field description |
|---|
| measGapConfig| |
| It indicates configuration or cancelation of a measurement gap| |
| s-MeasureConfig| |
| It indicates a threshold value for measurement of NR SpCell RSRP when a UE needs to perform measurement on a non-serving cell. |

The above measGapConfig may further include fields as shown in the following table.

TABLE 12

MeasGapConfig field description
gapFR1
It indicates a measurement gap configuration applicable for FR1.
gapFR2
It indicates a measurement gap configuration applicable for FR2.
gapUE
It indicates a measurement gap configuration applicable for all frequencies (FR1 and FR2).
gapOffset
It indicates a gap offset of a gap pattern with an MGRR
mgl
It indicates a measurement gap length by ms. There may be 3 ms, 4 ms, 6 ms, etc.
mgrp
It indicates a measurement gap repetition period by ms.
mgta
It indicates whether to apply a timing advance (TA) of 0.5 ms for a measurement gap configuration.
refServCellIndicator
It indicates Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG.

Meanwhile, as shown in the drawing, the UE 100 receives a radio resource configuration information element (IE) of the E-UTRA (that is, LTE/LTE-A) cell which is a PCell. In addition, the UE may receive a radio resource configuration IE of an NR cell, which is a PSCell, from the NR cell or through the E-UTRA cell which is a PCell. The radio resource configuration IE includes subframe pattern information.

The UE 100 performs measurement and reports a measurement result. Specifically, the UE 100 interrupts data transmission and reception with the E-UTRA (that is, LTE/LTE-A) cell during the measurement gap, retunes its own RF chain, and performs measurement based on receipt of an SS block from an NR cell.

In FIG. 8, only the measurement in the EN-DC case is shown. However, the UE may perform measurement in MR-DC (Multi-RAT Dual Connectivity) cases (for example, EN-DC case, New Radio Dual Connectivity (NR-DC) case, NGEN-DC(NG-RAN—E-UTRA Dual Connectivity) case and NE-DC (NR—E-UTRA Dual Connectivity) case) in the same manner as the UE operation described above with reference to FIG. 8.

<Disclosure of the Present Specification>

The present specification describes UE's operation related to applying MGTA for using MG. For example, the present specification describes UE's operation related to determining a starting timing of the MG based on the MGTA.

Also, the present specification describes data transmission and reception standard for a time resource unit (for example, NR slot) before or after a measurement gap when performing measurement (for example, RRM measurement) using a measurement gap in 5G NR.

<Measurement Gap>

If the UE requires measurement gaps to identify and measure intra-frequency cells and/or inter-frequency cells and/or inter-RAT E-UTRAN cells, and the UE does not support independent measurement gap patterns for different frequency ranges, network must provide a single per-UE measurement gap pattern for concurrent monitoring of all frequency layers.

If the UE requires measurement gaps to identify and measure intra-frequency cells and/or inter-frequency cells and/or inter-RAT E-UTRAN cells, and the UE supports independent measurement gap patterns for different frequency ranges, the network must provide either per-FR measurement gap patterns for frequency range where UE requires per-FR measurement gap for concurrent monitoring of all frequency layers of each frequency range independently, or a single per-UE measurement gap pattern for concurrent monitoring of all frequency layers of all frequency ranges.

The UE supports measurement gap patterns in Table 13 based on the applicability specified in Table 14 and Table 15. The UE may determines measurement gap timing based on gap offset configuration and measurement gap timing advance configuration provided by higher layer signaling.

TABLE 13

| Gap pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

Table 13 shows an example of Gap Pattern Configurations. For example, if Gap Pattern Id 0 is applied to the UE, MGL is 6 ms and MGRP is 40 ms. That is, the measurement gap lasts for 6 ms and the measurement gap repeats in every 40 ms.

TABLE 14

| Measurement gap pattern configuration | Serving cell | Measurement Purpose | Applicable Gap Pattern Id |
|---|---|---|---|
| Per-UE measurement gap | E-UTRA + FR1, or E-UTRA + FR2 or E-UTRA + FR1 + FR2, | non-NR RAT (Note 1, 2 applied) FR1 and/or FR2 non-NR RAT(Note 1, 2 applied) and FR1 and/or FR2 | 0, 1, 2, 3 0-11 0, 1, 2, 3, 4, 6, 7, 8, 10 |
| Per FR measurement gap | E-UTRA and, FR1 if configured FR2 if configured | non-NRRAT (Note 1, 2 applied) | 0, 1, 2, 3 No gap |
| | E-UTRA and, FR1 if configured FR2 if configured | FR1 only | 0-11 No gap |
| | E-UTRA and, FR1 if configured FR2 if configured | FR2 only | No gap 12-23 |
| | E-UTRA and, FR1 if configured FR2 if configured | non-NR RAT(Note 1, 2 applied) and FR1 | 0, 1, 2, 3, 4, 6, 7, 8, 10 No gap |
| | E-UTRA and, FR1 if configured FR2 if configured | FR1 and FR2 | 0-11 12-23 |
| | E-UTRA and, FR1 if configured FR2 if configured | non-NR RAT(Note 1, 2 applied) and FR2 | 0, 1, 2, 3, 4, 6, 7, 8, 10 12-23 |
| | E-UTRA and, FR1 if configured FR2 if configured | non-NR RAT(Note 1, 2 applied) and FR1 and FR2 | 0, 1, 2, 3, 4, 6, 7, 8, 10 12-23 |

Note 0:
In E-UTRA-NR dual connectivity mode, if GSM or UTRA TDD or UTRA FDD inter-RAT frequency layer is configured to be monitored, only measurement gap pattern #0 and #1 can be used for per-FR gap in E-UTRA and FR1 if configured, or for per-UE gap.
NOTE 1:
In E-UTRA-NR dual connectivity mode, non-NR RAT includes E-UTRA, UTRA and/or GSM. In NR-E-UTRA dual connectivity mode, non-NR RAT means E-UTRA.
NOTE 2:
In E-UTRA-NR dual connectivity mode, the gap patterns with short MGL (gap pattern #2, 3, 6, 7, 8, 10) are supported by UEs which support shortMeasurementGap-rl4. In NR-E-UTRA dual connectivity mode, the measurement gap pattern #2, 3, 6, 7, 8, 10 are supported by the UEs which indicate the capability signaling of supportedGapPattern to network.
NOTE 3:
When E-UTRA inter-frequency RSTD measurements are configured and the UE requires measurement gaps for performing such measurements, only Gap Pattern #0 can be used.

Table 14 shows an example of Applicability for Gap Pattern Configurations supported by the E-UTRA-NR dual connectivity UE or NR-E-UTRA dual connectivity UE. For example, if (i) per-UE measurement gap is used for the UE, (ii) serving cells are E-UTRA cell and FR1 NR cell and (iii) measurement purpose is non-NR RAT, Gap Pattern Id 0-3 of Table 13 is applicable for the UE.

TABLE 15

| Measurement gappattern configuration | Serving cell | Measurement Purpose (NOTE 2 applied) | Applicable Gap Pattern Id |
|---|---|---|---|
| Per-UE measurement gap | FR1 (NOTE 4 applied), or FR1 + FR2 | E-UTRA only (NOTE 3 applied) FR1 and/or FR2 E-UTRAN and FR1 and/or FR2 NOTE 3 | 0, 1, 2, 3 0-11 0, 1, 2, 3, 4, 6, 7, 8, 10 |
| | FR2 (NOTE4 applied) | E-UTRA only (NOTE 3 applied) FR1 only FR1 and FR2 | 0, 1, 2, 3 0-11 0-11 |

TABLE 15-continued

| Measurement gappattern configuration | Serving cell | Measurement Purpose (NOTE 2 applied) | Applicable Gap Pattern Id |
|---|---|---|---|
| | | E-UTRAN and FR1 and/or FR2 (NOTE 3 applied) FR2 only | 0, 1, 2, 3, 4, 6, 7, 8, 10 12-23 |
| PerFR measurement gap | FR1 if configured FR2 if configured | E-UTRA only (NOTE 3 applied) | 0, 1, 2, 3 No gap |
| | FR1 if configured FR2 if configured | FR1 only | 0-11 No gap |
| | FR1 if configured FR2 if configured | FR2 only | No gap 12-23 |
| | FR1 if configured FR2 if configured | E-UTRA and FR1 (NOTE3 applied) | 0, 1, 2, 3, 4, 6, 7, 8, 10 No gap |
| | FR1 if configured FR2 if configured | FR1 and FR2 | 0-11 12-23 |
| | FR1 if configured FR2 if configured | E-UTRA and FR2 (NOTE 3 applied) | 0, 1, 2, 3, 4, 6, 7, 8, 10 12-23 |
| | FR1 if configured FR2 if configured | E-UTRA and FR1 and FR2 (NOTE 3 applied) | 0, 1, 2, 3, 4, 6, 7, 8, 10 12-23 |

NOTE 1:
When E-UTRA inter-RAT(Radio Access Technology) RSTD(Reference signal time difference) measurements are configured and the UE requires measurement gaps for performing such measurements, only Gap Pattern #0 can be used.
NOTE 2:
Measurement purpose which includes E-UTRA measurements includes also inter-RAT E-UTRA RSRP and RSRQ measurements for E-CID(Enhanced cell ID)
NOTE 3:
The measurement gap pattern #2, 3, 6, 7, 8, 10 are supported by the UEs which indicate the capability signaling of supportedGapPattern to network.
NOTE 4:
NR-DC in Rel-15 only includes the scenarios where all serving cells in MCG in FR1 and all serving cells in SCG in FR2.

Table 15 shows an example of Applicability for Gap Pattern Configurations supported by the UE with NR standalone operation (with single carrier, NR CA and NR-DC configuration).

Figure 9:
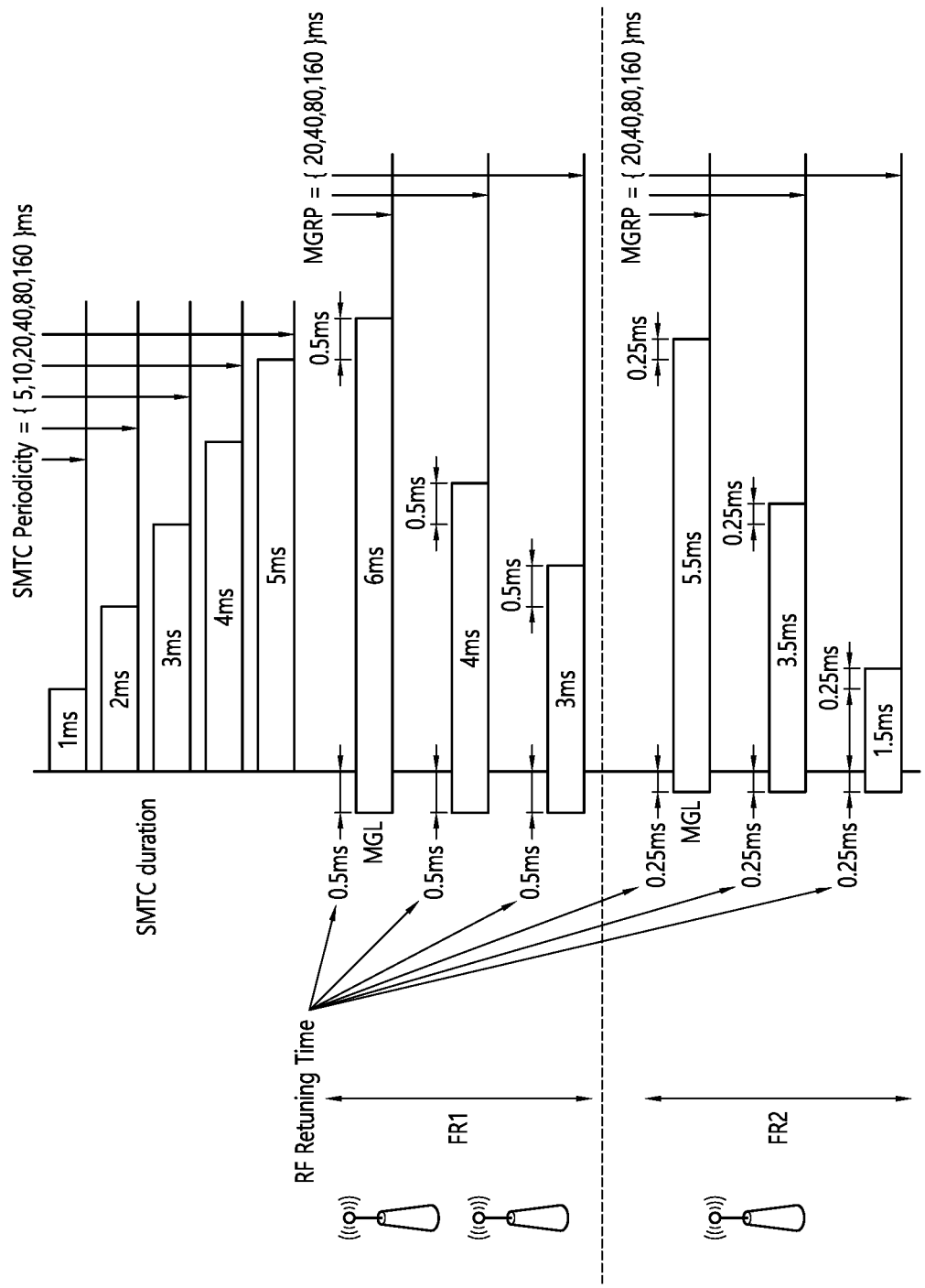
FIG. 9 shows examples of measurement gap and SMTC.

FIG. 9 Shows Examples of Measurement Gap and SMTC.

FIG. 9 shows examples of SMTC window durations based on the SMTC window length (1 ms, 2 ms, 3 ms, 4 ms and 5 ms) and SMTC periodicity (5 ms, 10 ms, 20 ms, 40 ms, 80 ms, 160 ms).

Examples of measurement gaps based on MGRP (20 ms, 40 ms, 80 ms, 160 ms), MGL (6 ms, 4 ms, 3 ms in FR1 and 5.5 ms, 3.5 ms, 1.5 ms in FR2), RF re-tuning time and a starting time of SMTC window duration are described in FIG. 9. In FIG. 9, a starting time of measurement gaps are configured based on a reference time, which is equal to the starting time of the SMTC window duration, and RF re-tuning time (0.5 ms in FR 1, 0.25 ms in FR 2).

In LTE, UE behavior for the uplink subframe occurring immediately after measurement gap was specified for TDD case based on the following table.

TABLE 16

In the uplink subframe occurring immediately after the measurement gap,
if the following conditions are met then it is up to UE implementation whether or not the
UE can transmit data:
1) all the serving cells belong to E-UTRAN TDD;
2) if the subframe occurring immediately before the measurement gap is an uplink
subframe.
Otherwise the UE shall not transmit any data.
In determining the above UE behavior for the uplink subframe occurring immediately after
the measurement gap, the UE shall treat a special subframe as an uplink subframe if the
special subframe occurs immediately before the measurement gap According to Table 16, if 1) all the serving cells belong to E-UTRAN TDD and 2) if the subframe occurring immediately before the measurement gap is an uplink subframe, the UE may transmit or may not transmit data in the uplink subframe occurring immediately after the measurement gap based on the UE implementation. Otherwise, the UE shall not transmit any data in the uplink subframe occurring immediately after the measurement gap. However, for NR, other aspects should be considered for determining UE behavior in the slot occurring immediately before or after measurement gap. The other aspects are as follows.

- UE measurement time and re-tuning time (RF re-tuning time between different frequency bands) if UE transmits UL data after gap
- NR measurement is performed based on SMTC window
- MGTA (measurement gap timing advance) in NR
- Flexible UL/DL assignment of symbols in NR
- NR symbol length depending on SCS
- UL-DL and DL-UL switching time in NR For defining deterministic UE behavior for UL transmission after measurement gap, the difference between NR and LTE may be considered as described in the following Table 17.

TABLE 17

|  | NR | LTE |
|---|---|---|
| TDD UL-DL configuration | Symbol-based | Subframe-based |
| SCS (data) | 15kH, 30 kHz, 60 kHz,15 kHz 120 kHz |  |
| MG timing advance | 0 ms, 0.25 ms, 0.5 ms | not defined |
| RF re-tuning time | 0.5 ms(FR1). 0.25 ms(FR2) | 0.5 ms |

Table 17 shows differences between NR and LTE. In NR, TDD UL-DL configuration is configured based on symbol. In LTE, TDD UL-DL configuration is configured based on subframe. SCSs for transmitting/receiving data are different in NR and LTE. MG timing advance (MGTA) is introduced and discussed in NR. In LTE, MGTA was not defined. RF re-tuning time is different in NR and LTE. In NR, RF re-tuning time is 0.5 ms for FR 1 and 0.25 ms for FR 2. In LTE TDD, it is up to UE implementation whether or not the UE can transmit data in the uplink subframe occurring immediately after the measurement gap if the subframe occurring immediately before the measurement gap is an uplink subframe. Otherwise, the UE shall not transmit any data. The condition, which the subframe occurring immediately before the measurement gap is an uplink subframe, is related to which time point is used as a basis for configuring a starting time of the measurement gap.

Figure 10:
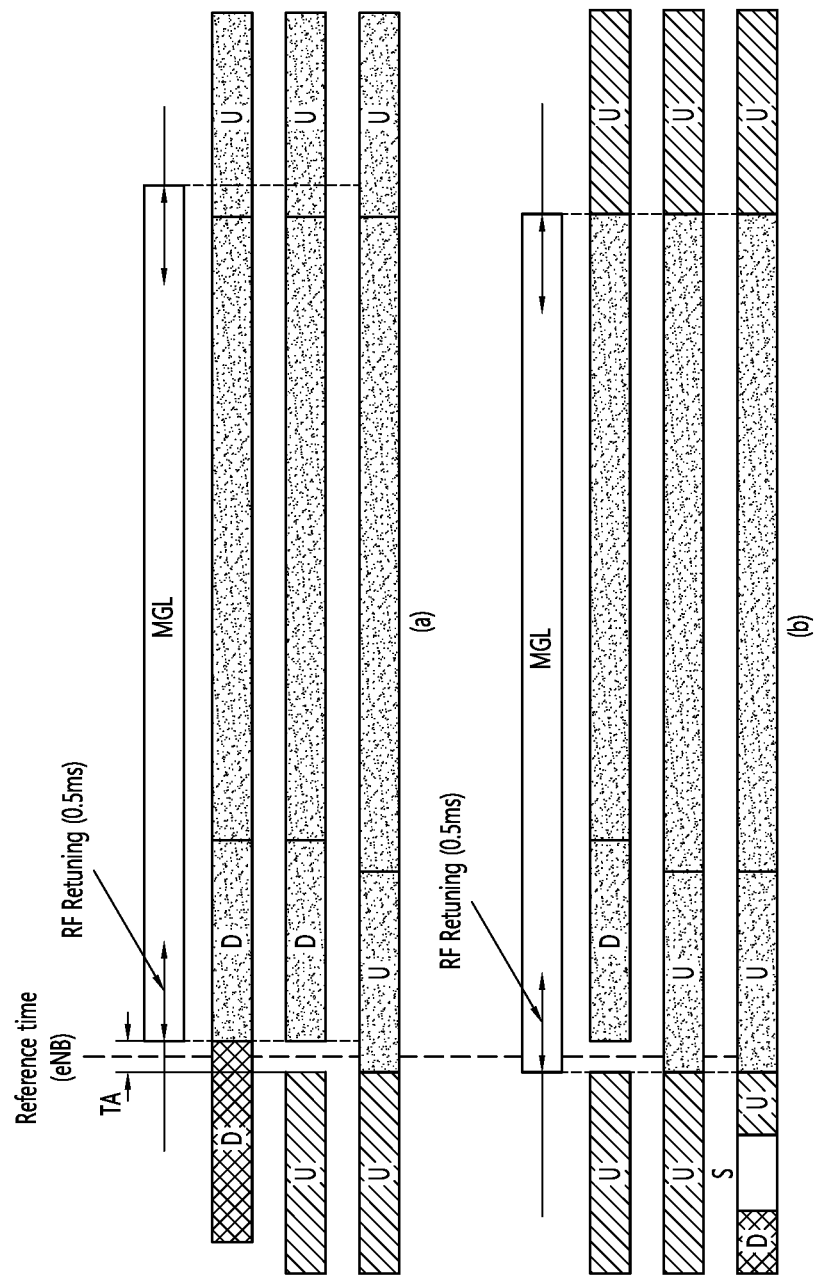
FIG. 10 shows an example of UL transmission of UE after MG in LTE TDD.

FIG. 10 shows an example of the starting time of the measurement gap in LTE TDD.

FIG. 10 Shows an Example of UL Transmission of UE after MG in LTE TDD.

Figure 11:
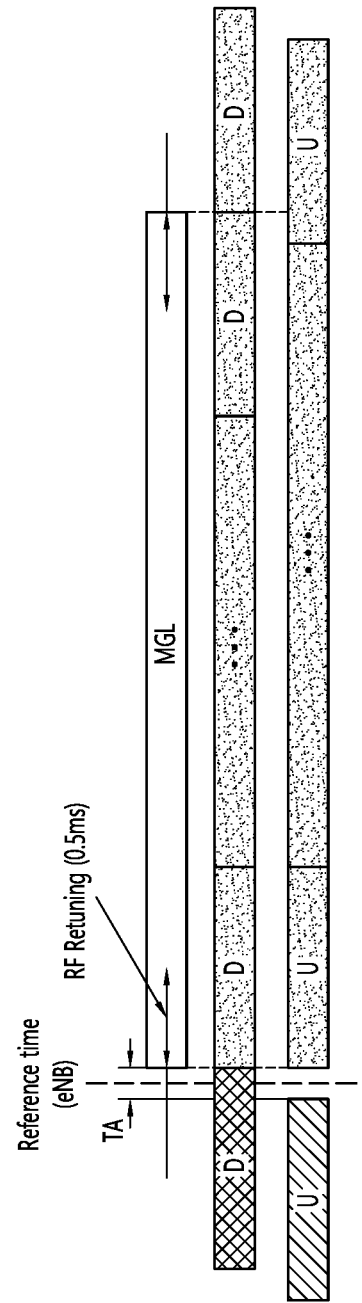
FIG. 11 shows an example of UL transmission of UE after MG in LTE FDD

In (a) of FIG. 10, the starting time of the MG is configured based on DL timing. In (b) of FIG. 10, the starting time of the MG is configured based on UL timing. TA is a timing advance. A starting timing of UL subframe is earlier than a starting timing of DL subframe by a value of the timing advance. Reference time (eNB) in FIG. 10 and FIG. 11 is starting time of DL transmission at eNB. The UE receives DL subframe at a time point which after propagation delay (Td) from the reference time (eNB).

In case of measurement gap configured based on UL timing as seen FIG. 10 (b), the UE can transmit data in the uplink subframe occurring immediately after the measurement gap if the condition of Table 16 is met.

In case of measurement gap based on DL time as seen FIG. 10 (a), the UE shall not transmit any data in the uplink subframe occurring immediately after the measurement gap. It is because the uplink subframe occurring immediately after the measurement gap overlaps with the MG.

FIG. 11 shows an example of the starting time of the measurement gap in LTE FDD.

FIG. 11 Shows an Example of UL Transmission of UE after MG in LTE FDD

In LTE FDD, the starting time of the MG is configured based on DL timing. Thus, in LTE FDD, the UE shall not transmit any data in the uplink subframe occurring immediately after the measurement gap. It is because the uplink subframe occurring immediately after the measurement gap overlaps with the MG.

Based on explanation related to FIG. 10 and FIG. 11, the following considerations related to starting time of measurement gap in LTE are observed:

Consideration 1: For LTE TDD, whether configuring starting time of measurement gap based on DL timing or UL timing is up to UE implementation.

Consideration 2: For LTE FDD, starting time of measurement gap is configured based on DL timing.

Consideration 1 and Consideration 2 may be considered for measurement gap in NR. Additionally, MGTA (measurement gap timing advance) which is new NR parameter is also considered for the measurement gap in NR.

<NR TDD>

In NR TDD, 56 slot formats (0~55) are specified based on symbol-based UL-DL configuration. Table 18 shows the slot formats for normal cyclic prefix for NR TDD.

TABLE 18

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |

TABLE 18-continued

| Format | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | F | F | F | F | F | F | U |
| 44 | D | D | D | D | D | F | F | F | F | F | F | U | U | U |
| 45 | D | D | D | D | D | F | F | U | U | U | U | U | U | U |
| 46 | D | D | D | D | D | F | D | D | D | D | D | D | D | F |
| 47 | D | D | D | D | F | F | D | D | D | D | D | F | F | F |
| 48 | D | D | F | F | F | F | D | D | F | F | F | F | F | F |
| 49 | D | F | F | F | F | F | D | F | F | F | F | F | F | F |
| 50 | F | U | U | U | U | U | F | U | U | U | U | U | U | U |
| 51 | F | F | U | U | U | U | F | F | U | U | U | U | U | U |
| 52 | F | F | F | U | U | U | F | F | F | U | U | U | U | U |
| 53 | F | F | F | F | U | U | F | F | F | F | U | U | U | U |
| 54 | D | D | D | D | F | U | D | D | D | D | D | F | U | U |
| 55 | D | D | F | U | U | U | D | F | U | U | U | U | U | U |
| 56 | D | F | U | U | U | U | D | F | U | U | U | U | U | U |
| 57 | D | D | D | F | F | U | D | D | D | F | F | U | U | U |
| 58 | D | D | F | F | U | U | D | D | F | F | U | U | U | U |
| 59 | D | F | F | U | U | U | D | F | F | U | U | U | U | U |
| 60 | D | F | F | F | F | U | D | F | F | F | F | F | F | U |
| 61 | D | D | F | F | F | U | D | D | F | F | F | F | F | U |
| 62-255 | | | | | | reserved | | | | | | | | |

The UE determines the slot format for the slot based on information, which is received from a serving cell, related to TDD UL-DL configuration (for example, tdd-UL-DL-ConfigurationCommon, tdd-UL-DL-ConfigurationCommon2, or tdd-UL-DL-ConfigDedicated) or based on any information related to the slot format on detected DCI formats. In Table 18, uplink is indicated by U, and downlink is indicated by D. In the following table, F indicates a symbol that can be flexibly used for uplink or downlink.

I. First Example of Disclosure of the Present Specification

Figure 12A:
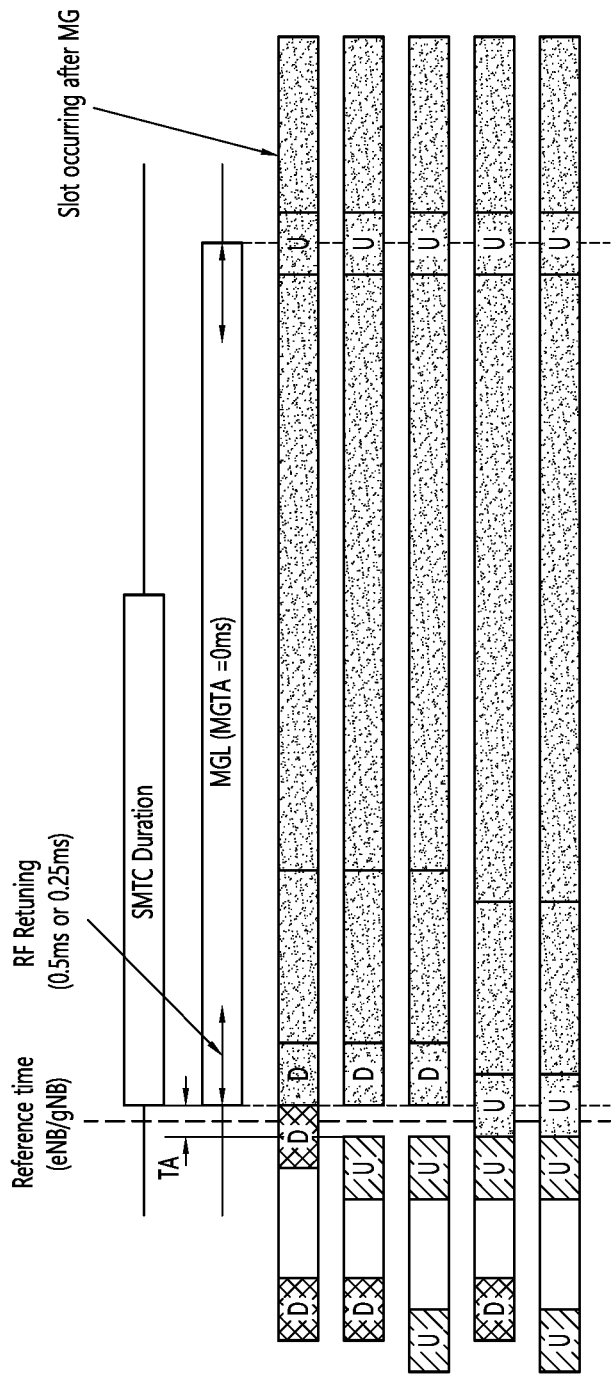
FIGS. 12A to 12C shows an example of UL transmission of UE after MG with starting time based on MGTA and DL timing in NR TDD.
Figure 12B:
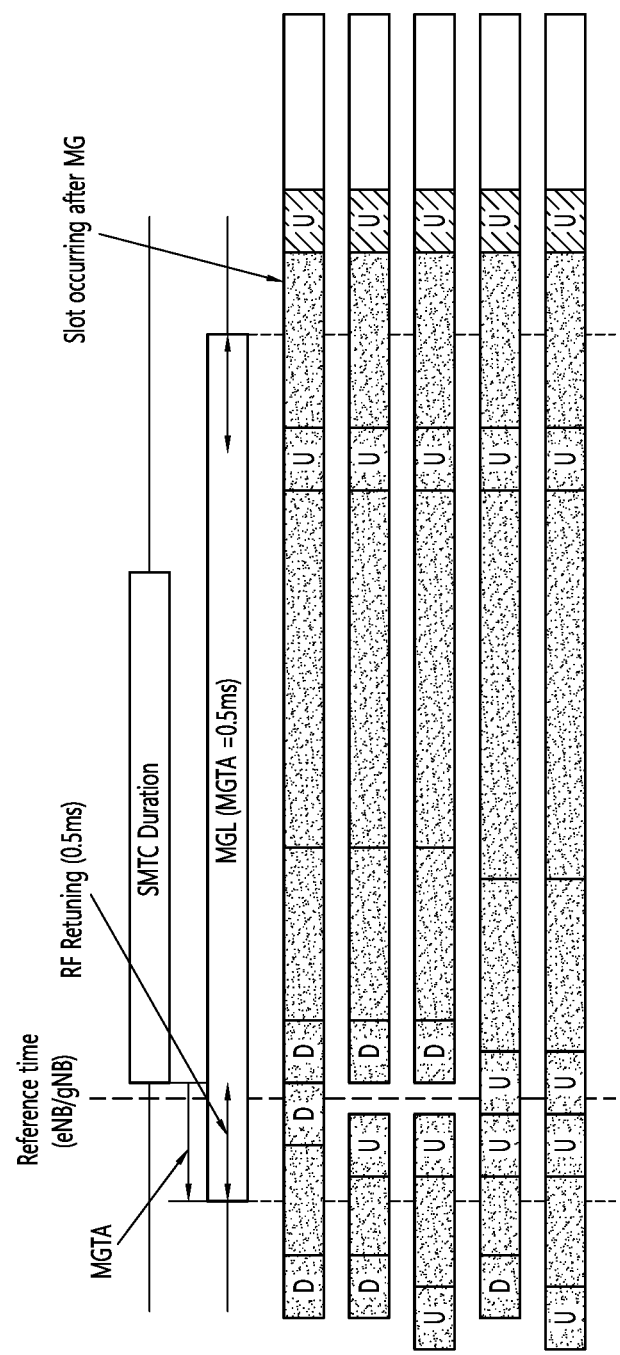
Figure 12C:
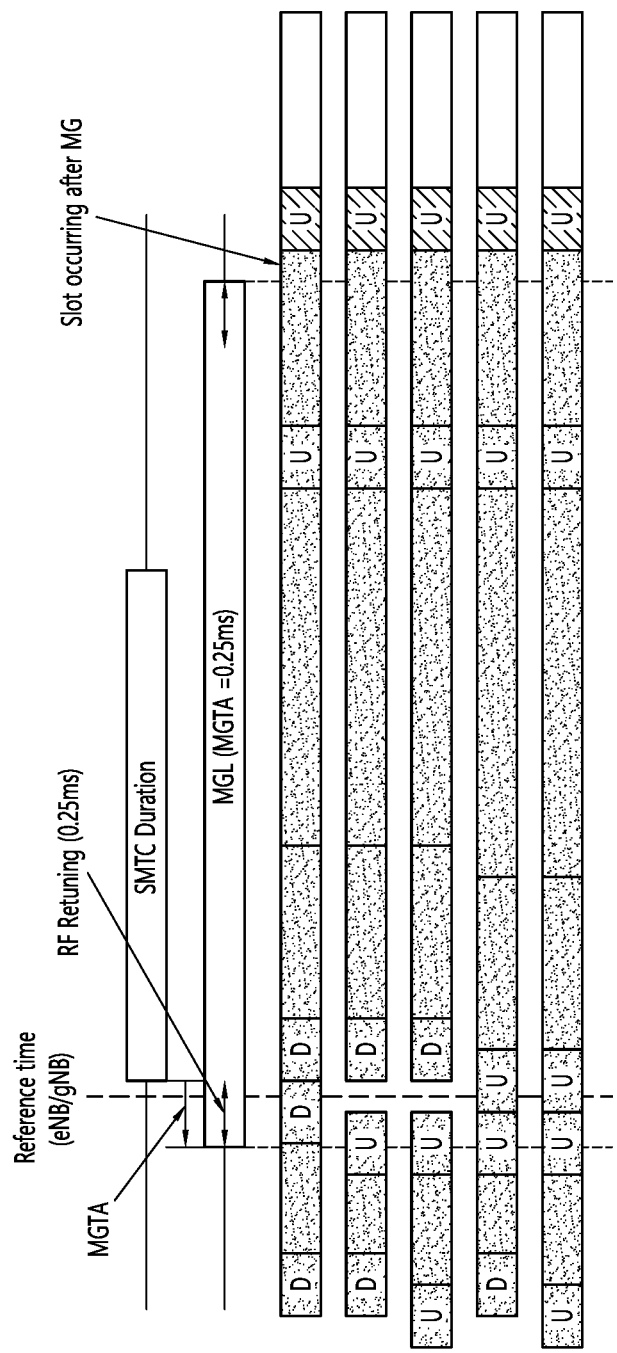

FIGS. 12A to 12C Shows an Example of UL Transmission of UE after MG with Starting Time Based on MGTA and DL Timing in NR TDD.

FIGS. 12A to 12C shows the example of UE UL transmission after MG which has starting time based on DL timing and 3 different MGTA such as 0 ms, 0.5 ms and 0.25 ms in NR TDD. Reference time (eNB/gNB) in FIG. 12A to 12C and FIG. 13A to 13C is starting time of DL transmission at eNB or gNB. The UE receives DL slot at a time point which after propagation delay (Td) from the reference time (eNB/gNB).

In FIGS. 12A to 12C, there are three types of slot formats exist before the MG. First one (first example from the top) is a slot format (for example, slot format 0 of Table 18) that has a downlink symbol at a start of the symbol and a downlink symbol at an end of the symbol. Second one (second and fourth example from the top) is a slot format (for example, slot format 19 to 45 of Table 18) that has a downlink symbol at a start of the symbol and a uplink symbol at an end of the symbol. Third one (third and fifth example from the top) is a slot format (for example, slot format 1 of Table 18) that has a uplink symbol at a start of the symbol and a uplink symbol at an end of the symbol.

From FIGS. 12A to 12C, we can see the following UE behavior for measurement gap without adapting TA to the SMTC duration with reference to the MG.

According to FIG. 12A, which is an example that MGTA is not applied to the MG (MGTA=0 ms), the UE cannot transmit data in the slot occurring immediately after the measurement gap regardless of MGTA considering slot-based schedule.

According to FIGS. 12B and 12C, which are examples that MGTA is applied to the MG (0.5 ms in FIG. 12B and 0.25 ms in FIG. 12C), depending on the configured value of MGTA, the slots overlapped with the measurement gap are different but the total slot number overlapped with the measurement is same.

Figure 13A:
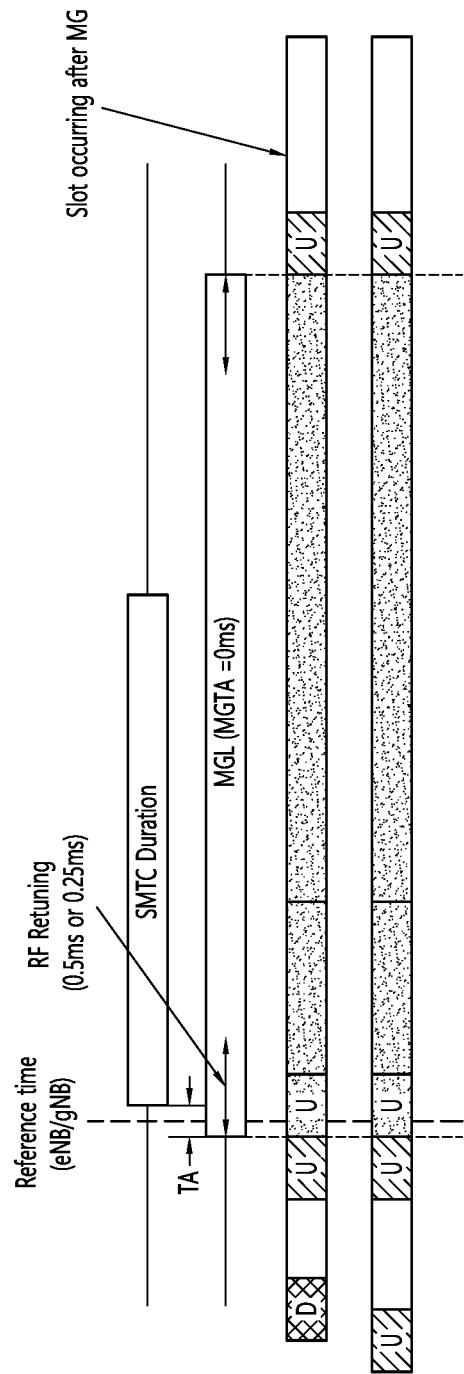
FIGS. 13A to 13C shows an example of UL transmission of UE after MG with starting time based on MGTA and UL timing in NR TDD.
Figure 13B:
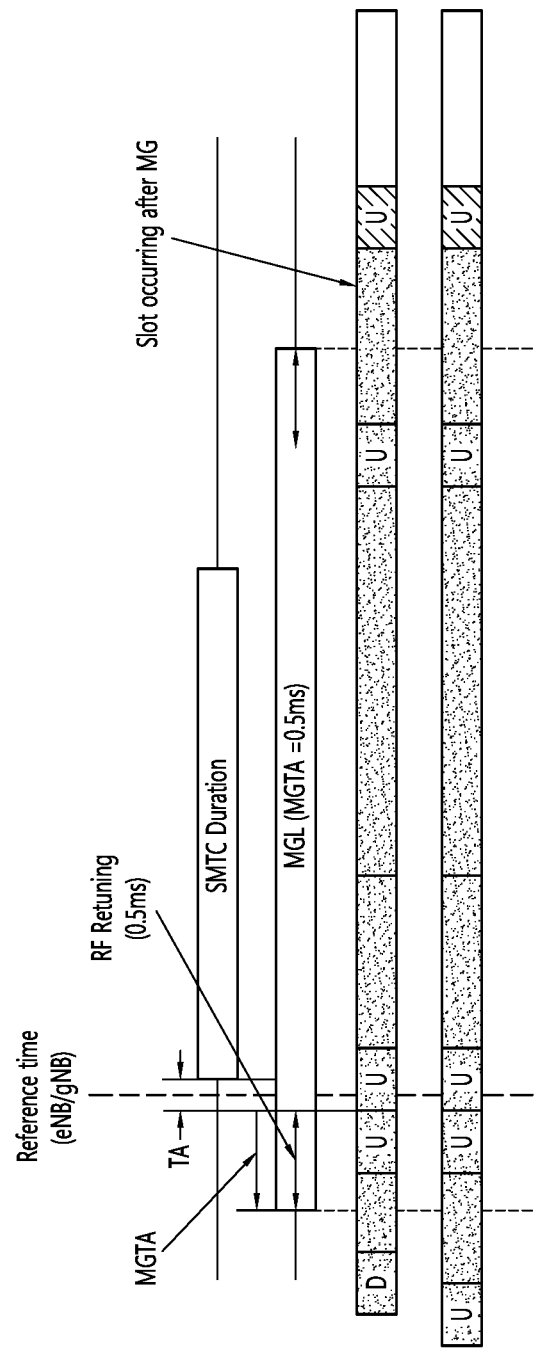
Figure 13C:
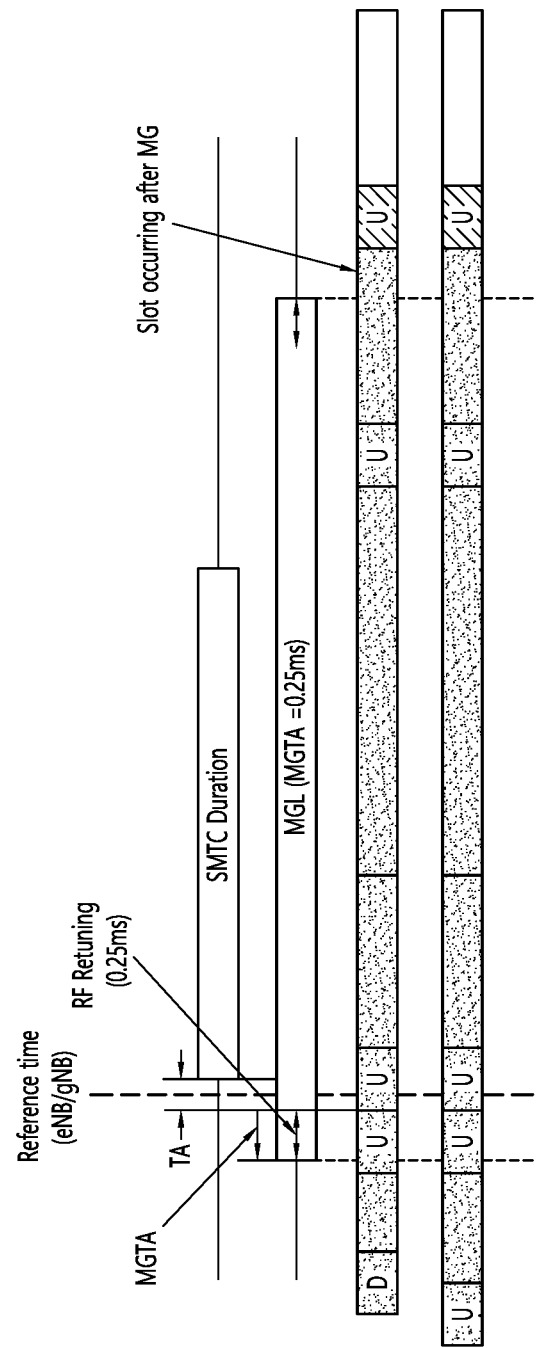

FIGS. 13A to 13C Shows an Example of UL Transmission of UE after MG with Starting Time Based on MGTA and UL Timing in NR TDD.

FIGS. 13A to 13C shows the example of UE UL transmission after MG which has starting time based on DL timing and 3 different MGTA such as 0 ms, 0.5 ms and 0.25 ms in NR TDD.

In FIGS. 13A to 13C, there are two types of slot formats exist before the MG. First one (first example from the top) is a slot format (for example, slot format 19 to 45 of Table 18) that has a downlink symbol at a start of the symbol and a uplink symbol at an end of the symbol. Second one (second example from the top) is a slot format (for example, slot format 1 of Table 18) that has a uplink symbol at a start of the symbol and a uplink symbol at an end of the symbol.

From FIGS. 13A to 13C, we can see the following UE behavior for measurement gap adapting TA to the SMTC duration with reference to the MG. That is, difference between the start timing of the SMTC duration and the start timing of the MG is equal to the TA value.

According to FIG. 13A, which is an example that MGTA is not applied to the MG (MGTA=0 ms), the UE can transmit data in the slot occurring immediately after the measurement gap for MGTA of 0 ms.

According to FIGS. 13B and 13C which are examples that MGTA is applied to the MG (0.5 ms in FIG. 13B and 0.25 ms in FIG. 13C), the UE cannot transmit data in the slot occurring immediately after the measurement gap for MGTA of 0.5 ms or 0.25 ms considering slot-based schedule.

According to FIGS. 13A to 13C, comparing the total slot number overlapped with the measurement gap, the MGTA of 0.5 ms or 0.25 ms (FIG. 13B or 13C) has 1 slot more than the MGTA of 0 ms (FIG. 13A).

Here, not transmitting UL data in slot occurring immediately after the MG is inefficient in scheduling point of view. Because, it seems possible to transmit UL data if first UL symbol in the slot occurring immediately after the measurement gap by considering different slot formats for NR TDD seen in Table 18. For receiving DL data, it also seems possible if last DL symbol in the slot occurring immediately is before the measurement gap.

Table 19 shows the slot length, symbol length, DL-UL/UL-DL switching time and RF-retuning time for NR.

TABLE 19

|  | SCS(data) (kHz) | Slot length (us) | Symbol length (us) | CP length (us) | DL-UL/ UL-DL switching time(us) | RF-retuning time(us) |
|---|---|---|---|---|---|---|
| FR1 | 15 | 1000 | 66.67 | 4.69 | 10 | 500 |
|  | 30 | 500 | 33.33 | 2.34 | 10 | 500 |
|  | 60 | 250 | 16.67 | 1.17 | 10 | 500 |
| FR2 | 60 | 250 | 16.67 | 1.17 | 5 | 250 |
|  | 120 | 125 | 8.33 | 0.57 | 5 | 250 |

According to Table 19, DL-UL/UL-DL switching time is assumed to be 10 us for FR1 and 5 us for FR2 based on RF requirement of transient time. The transient time (or transient period) is time period during which the transmitter of the UE is changing from the OFF period to the ON period or vice versa. From Table 19, the followings may be derived:
  DL-UL or UL-DL switching time is smaller than one symbol duration.
  DL-UL or UL-DL switching time can be ignored because that it is very small comparing with RF re-tuning time.

When considering cell radius of 9 km, TA of 60 us is calculated from propagation delay of 30 us because TA is calculated to be a value equal to 2*propagation delay. For example of SCS 120 kHz, TA of 60 us is about half of slot duration for SCS of 120 kHz because the slot length for SCS 120 kHz is 125 us. So, in case of the measurement gap adapting MGTA of 0 ms and TA of 60 us, UE can transmit the UL data in the slot corresponding slot format number 19~33, 43~45 in Table 18 in which UL data symbol is located in later half slot. That is, in slot format number 19~33, 43~45 in Table 18, the first UL symbol is located after the former half slot.

Figure 14A:
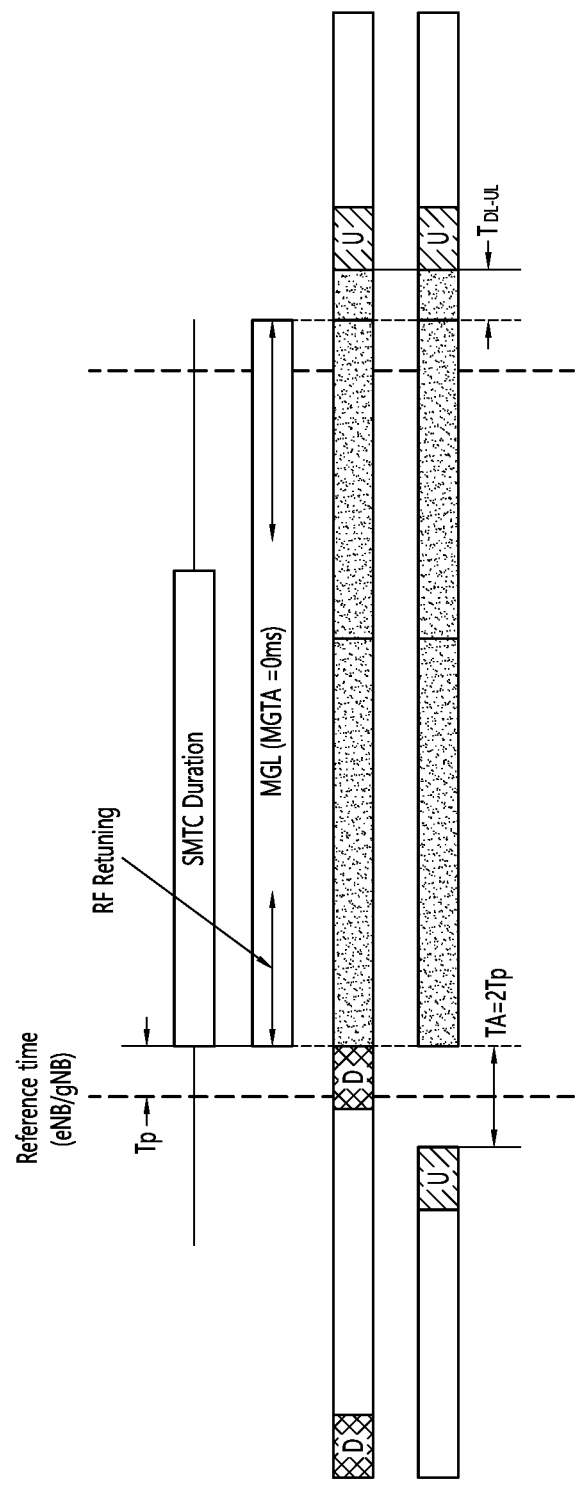
FIGS. 14A and 14B shows an example of UL transmission of UE after MG with starting time based on MGTA, DL timing and UL-DL switching time in NR TDD.
Figure 14B:
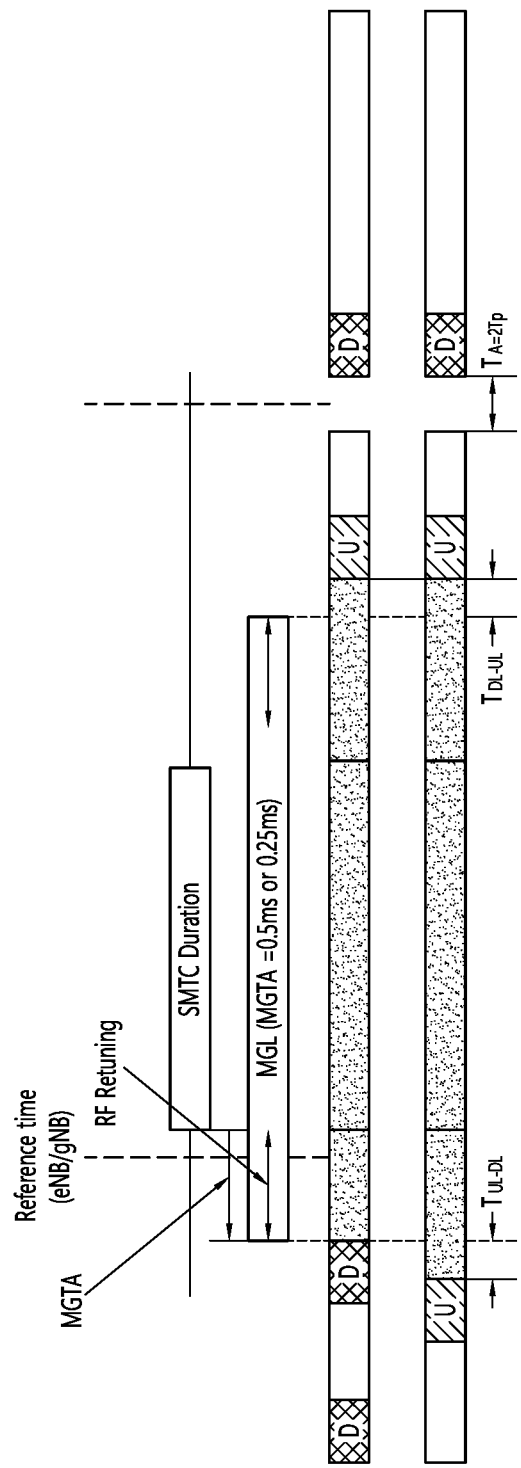

FIGS. 14A and 14B Shows an Example of UL Transmission of UE after MG with Starting Time Based on MGTA, DL Timing and UL-DL Switching Time in NR TDD.

$T_{UL-DL}$ is UL-DL switching time and $T_{DL-UL}$ is DL-UL switching time. $T_P$ is a propagation delay. TA is Timing Advance. TA is approximately equal to $2T_P$.

FIGS. 14A and 14B show the following UE behavior for measurement gap adapting MGTA without considering TA.
  a) The UE can receive DL data in the slot occurring immediately before the measurement gap with adapting MGTA if the last DL symbol in the slot is not overlapped with the measurement gap.
  b) The UE can transmit UL data in the slot occurring immediately before the measurement gap with adapting MGTA, if one of the following condition is satisfied:
    if the last UL symbol after adapting TA in the slot is not overlapped with the measurement gap; or
    if the last UL symbol after adapting TA in the slot is UL-DL switching time away from the start of the measurement gap
  c) The UE can transmit UL data in the slot occurring immediately after the measurement gap with adapting MGTA, if one of the following condition is satisfied:
    if the first UL symbol after adapting TA in the slot is not overlapped with the measurement gap or
    if the first UL symbol after adapting TA in the slot is DL-UL switching time away from the end of the measurement gap.

Figure 15A:
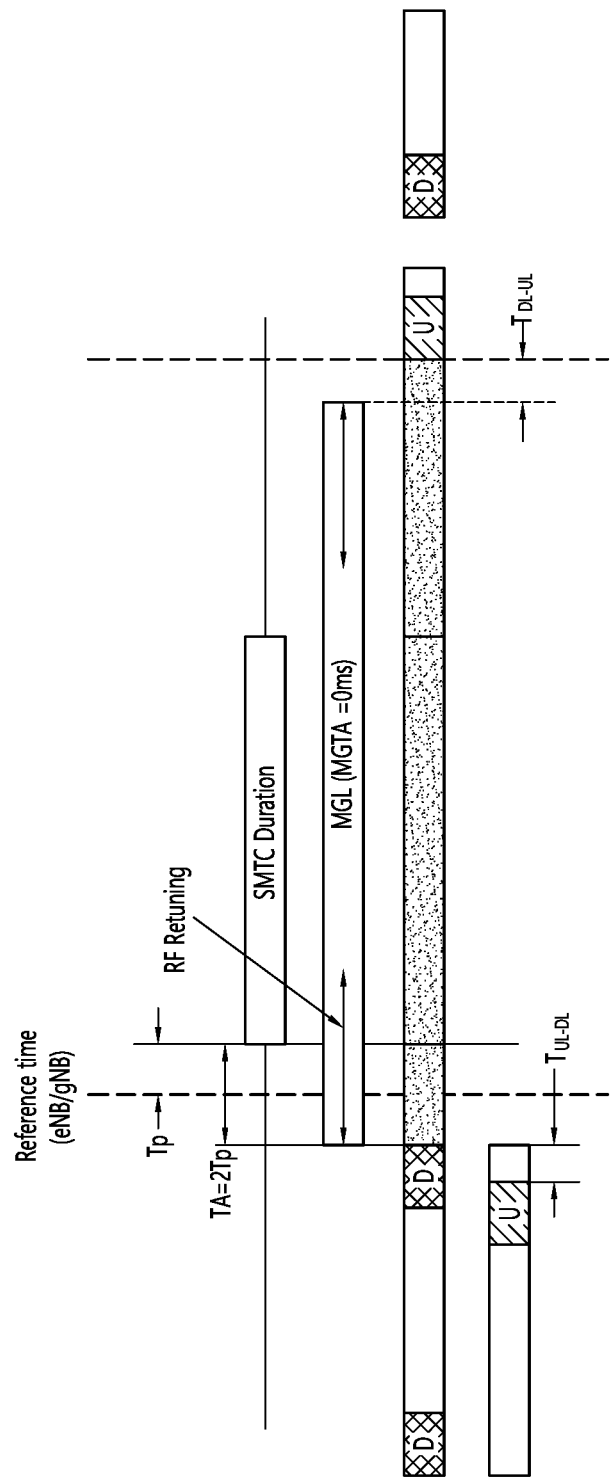
FIGS. 15A and 15B shows an example of UL transmission of UE after MG with starting time based on MGTA, UL timing and UL-DL switching time in NR TDD.
Figure 15B:
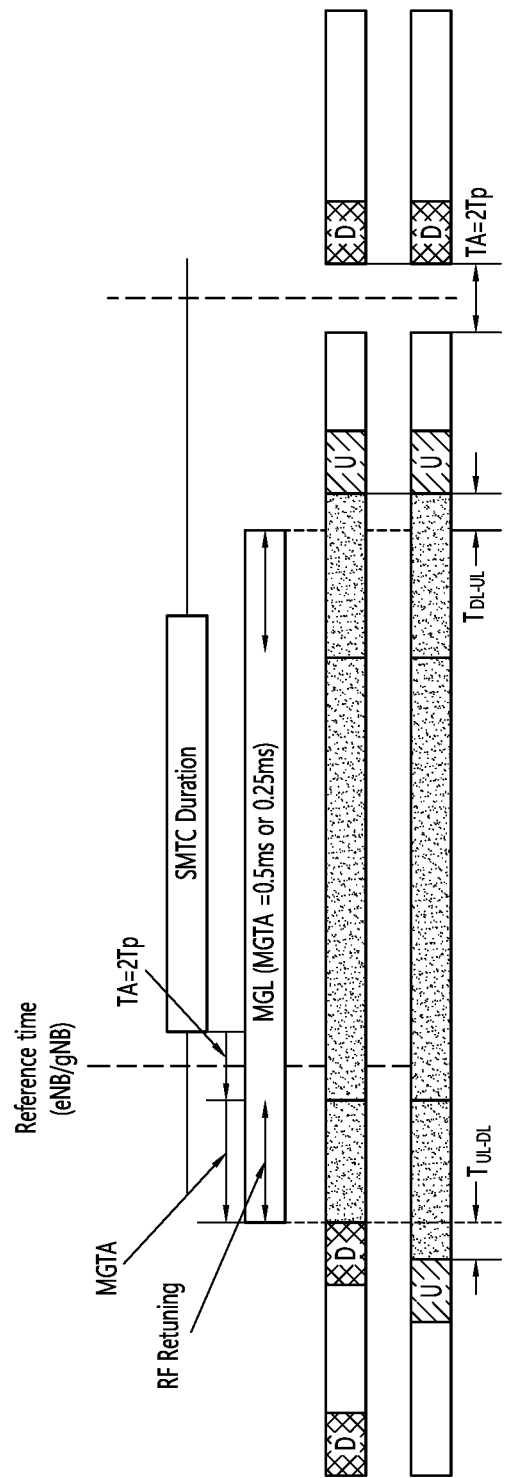

FIGS. 15A and 15B Shows an Example of UL Transmission of UE after MG with Starting Time Based on MGTA, UL Timing and UL-DL Switching Time in NR TDD.

FIGS. 15A and 15B show another example with measurement gap based on UL timing considering DL-UL switching time.

FIGS. 15A and 15B show the following UE behavior for measurement gap which MGTA and TA are applied to:
  a) The UE can receive DL data in the slot occurring immediately before the measurement gap, which MGTA and TA are applied to, if the last DL symbol in the slot is not overlapped with the measurement gap.
  b) The UE can transmit UL data in the slot occurring immediately before the measurement gap, which MGTA and TA are applied to, if one of the following condition is satisfied:
    if the last UL symbol in the slot, to which TA is applied, occurring immediately before the MG is not overlapped with the measurement gap; or
    if the last UL symbol in the slot, to which TA is applied, occurring immediately before the MG is UL-DL switching time away from the start of the measurement gap
  c) UE can transmit UL data in the slot occurring immediately after the measurement gap, which MGTA and TA are applied to, if one of the following condition is satisfied:
    if the first UL symbol after adapting TA in the slot is not overlapped with the measurement gap; or
    if the first UL symbol after adapting TA in the slot is DL-UL switching time away from the end of the measurement gap.

<NR FDD>

Figure 16A:
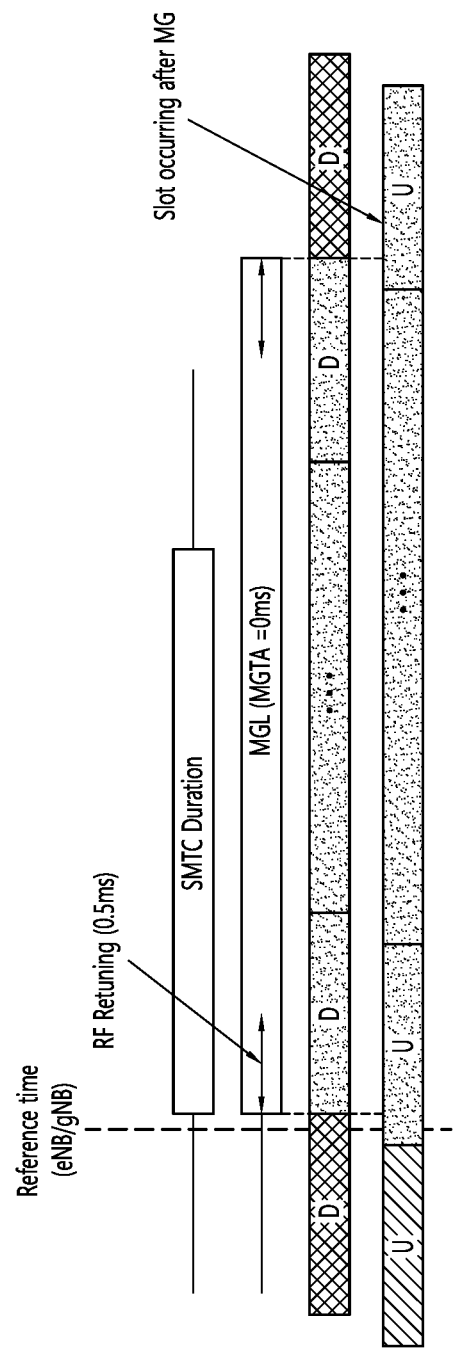
FIGS. 16A and 16B shows an example of UL transmission of UE after MG with starting time based on MGTA and DL timing in NR FDD.
Figure 16B:
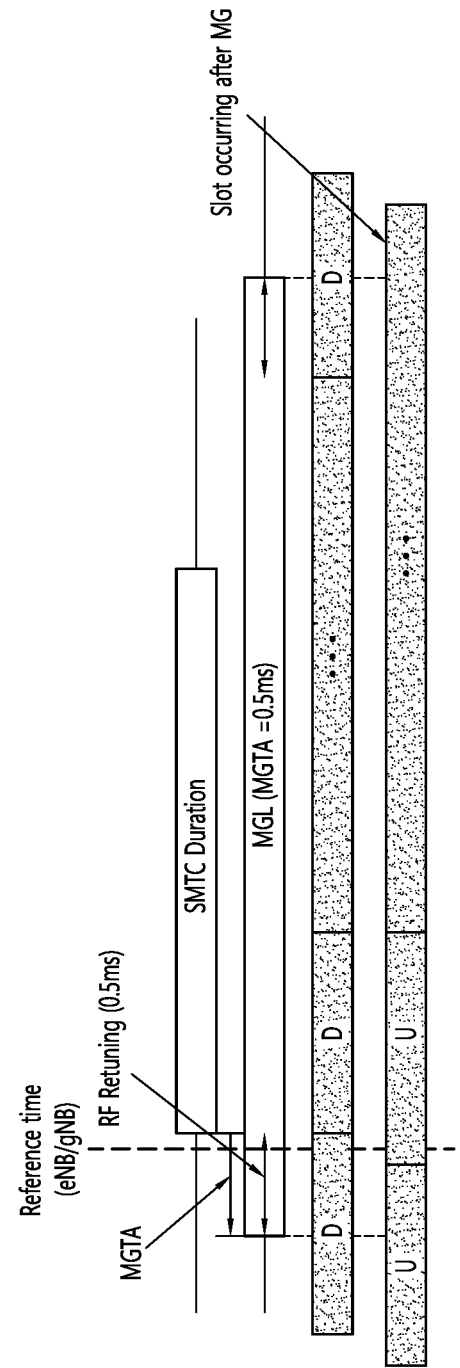

FIGS. 16A and 16B Shows an Example of UL Transmission of UE after MG with Starting Time Based on MGTA and DL Timing in NR FDD.

FIGS. 16A and 16B show the example of UL transmission of after MG which has starting time configured based on DL timing and 2 different MGTA such as 0 ms and 0.5 ms for NR FDD. MGTA of 0.25 ms is not considered because NR FDD is defined in FRE FIGS. 16A and 16B show the following UE behavior:
  UE cannot transmit any data in the uplink slot after measurement gap as LTE FDD.

Based on explanation mentioned above in NR TDD case and NR FDD case, the following considerations are observed:
  Consideration 3: In NR TDD, symbol based UL-DL configuration is used unlike UL-DL configuration in LTE TDD, which has subframe based UL-DL configuration.
  Consideration 4: When there is a slot partially overlapped with the measurement gap, not transmitting all UL symbol in the slot immediately after the measurement gap is inefficient for all slot formats in NR TDD.

Consideration 5: When a slot is partially overlapped with measurement gap, not receiving all DL symbol in the slot immediately before the measurement gap is inefficient for all slot formats in NR TDD.

Consideration 6: DL-UL switching time or UL-DL switching time can be ignored because DL-UL switching time and UL-DL switching time are very small comparing to RF re-tuning time.

Consideration 7: The symbol number which can be transmitted or received is impacted by the UE implementation of measurement gap whether applying TA or not. It means that possible slot format number (for example, slot format number of Table 18) for UL transmission or DL reception can be different due to UE implementation of the measurement gap.

Based on Observation 1 to Observation 7, the following behaviors may be considered for UE behavior of UL transmission and DL reception related to the measurement gap in NR:

1) For NR TDD, symbol based UL-DL configuration should be considered for UE behavior in the slot immediately before/after the measurement gap.

2) Whether TA is applied to the measurement gap or not is up to UE implementation.

3) When only MGTA is applied to the measurement gap or both MGTA and TA are applied to the measurement gap at UE, the following UE behavior in the slot immediately before/after the measurement gap should be specified for NR TDD.

The UE may receive DL data in the slot occurring immediately before the measurement gap if the last DL symbol in the slot is not overlapped with the measurement gap.

The UE may transmit UL data in the slot occurring immediately before the measurement gap if the last UL symbol in the slot is not overlapped with the measurement gap.

The UE may transmit UL data in the slot occurring immediately after the measurement gap if the first UL symbol in the slot is not overlapped with the measurement gap.

4) If UL-DL RF switching time or DL-UL RF switching time is not ignored, when only MGTA is applied to the measurement gap or both MGTA and TA are applied to the measurement gap at UE, the following UE behavior in the slot immediately before/after the measurement gap should be specified for NR TDD.

The UE may receive DL data in the slot occurring immediately before the measurement gap if the last DL symbol in the slot is not overlapped with the measurement gap.

The UE may transmit UL data in the slot occurring immediately before the measurement gap if the last UL symbol in the slot is UL-DL RF switching time away from the start of the measurement gap.

The UE may transmit UL data in the slot occurring immediately after the measurement gap if the first UL symbol in the slot is DL-UL RF switching time away from the end of the measurement gap.

Based on the above mentioned 4 UE behaviors, the followings may be considered in 3GPP Technical Specification related to requirements for support of radio resource management:

When the UE determines measurement gap timing based on gap offset configuration and measurement gap timing advance configuration provided by higher layer signaling, additionally whether considering TA or not for the determination of the measurement gap timing is up to UE implementation for NR TDD.

In the slot occurring immediately before the measurement gap,

UL transmission
a) if the following conditions are met then the UE shall transmit data:
  i) all the serving cells belong to NR TDD;
  ii) if the last UL symbol in the slot is not overlapped with the measurement gap; or
  iii) if the last UL symbol in the slot is UL-DL switching time away from the start of the measurement gap
b) Otherwise the UE shall not transmit any data DL reception
a) if the following conditions are met then the UE is required to conduct reception of data:
  i) all the serving cells belong to NR TDD;
  ii) if the last DL symbol in the slot is not overlapped with the measurement gap
b) Otherwise the UE is not required to conduct reception of any data In the slot occurring immediately after the measurement gap, UL transmission
a) if the following conditions are met then the UE shall transmit data:
  i) all the serving cells belong to NR TDD;
  ii) if the first UL symbol in the slot is not overlapped with the measurement gap; or
  iii) if the first UL symbol in the slot is DL-UL switching time away from the end of the measurement gap
b) Otherwise the UE shall not transmit any data II. Second Example of Disclosure of the Present Specification The following agreements in Table 20 has been discussed.

TABLE 20

When only MGTA is applied to measurement gap or both MGTA and TA are applied to measurement gap at UE in addition to measurement gap offset, the following UE behavior in the slot immediately before/after measurement gap should be specified for NR TDD.
i)UE is required to conduct reception of DL data in the slot occurring immediately before the measurement gap if the last DL symbol in the slot is not overlapped with the measurement gap.
ii)UE shall transmit UL data in the slot occurring immediately before the measurement gap if the last UL symbol in the slot is not overlapped with the measurement gap.
iii)UE shall transmit UL data in the slot occurring immediately after the measurement gap if the first UL symbol in the slot is not overlapped with the measurement gap.
Definition of starting point of MG
i)For EN-DC (LTE is the master cell, NR cells are not in MCG)
If per-UE MG is configured, If per-UE measurement gap is configured with MG timing advance of 0ms, a measurement gap starts at the end of the latest LTE TABLE 20-continued subframe occurring immediately before the measurement gap among MCG serving cells subframes.
If per-FR measurenet gap for FR1 is configured with MG timing advance of 0 ms, this measurement gap for FR1 starts at the end of the latest LTE subframe occurring immediately before the measurement gap among MCG serving cells subframes in FR1.
If per-FR measurenet gap for FR2 is configured with MG timing advance of 0 ms, this measurement gap for FR2 starts at [FFS(For Further Study)].
ii)FFS(For Further Study) for SA
iii)FFS when MGTA of 0.5 ms or 0.25 ms is applied for EN-DC and SA
UE behavior before and after measurement gap should be considered for following scenarios
i)When MGTA (0.5 ms for FR1 and 0.25 ms for FR2) is applied
NR TDD
NR FDD
NR CA
Different SCSs on different SCells
ii)When MGTA (0.5 ms for FR1 and 0.25 ms for FR2) is NOT applied
NR TDD
NR FDD
NR CA
Different SCSs on different SCells Note:
interruption requirements for measurement gap should also be taken into account Based on the agreements in Table 20, the starting time of the MG and UE behavior before/after the MG are proposed in Second Example of Disclosure of the Present Specification.

Table 21 shows the starting time of the MG.

TABLE 21

|  | Per-UE MG | | Per-FR MG | | | |
|  |  |  | FR1 | | FR2 | |
|  | MGTA = 0 ms | MGTA > 0 ms | MGTA = 0 ms | MGTA > 0 ms | MGTA = 0 ms | MGTA > 0 ms |
| --- | --- | --- | --- | --- | --- | --- |
| EN-DC | Defined | FFS (Not Defined) | Defined | FFS (Not Defined) | FFS (Not Defined) | FFS (Not Defined) |
| SA | FFS (Not Defined) | FFS (Not Defined) | FFS (Not Defined) | FFS (Not Defined) | FFS (Not Defined) | FFS (Not Defined) |
| NR CA | FFS (Not Defined) | FFS (Not Defined) | FFS (Not Defined) | FFS (Not Defined) | FFS (Not Defined) | FFS (Not Defined) |

For discussing UE behavior before or after MG, the definition of starting point of MG needs to be clarified for FFS for the above scenarios in Table 21. According to Table 21, the starting timing of the MG is defined only for some cases (per-UE MG with MGTA=0 ms in EN-DC, per-FR (FR1) MG with MGTA=0 ms in EN-DC). In general, the MG is configured with gapOffset (0~159 ms) together. It means the starting time of the MG is aligned with subframe boundary for MGTA=0 ms because the length of subframe is fixed with 1 ms for NR. Based on the gapOffset and the length of subframe for NR, the following consideration is observed.

Consideration 1: Starting time of MG is aligned with subframe boundary for MGTA=0 ms regardless of SCS The starting time of the MG and measurement gap configuration for EN-DC and SA may be described as the following Table 22.

TABLE 22

Measurement gap configuration
The UE shall:
1 > if gapFR1 is set to setup:
2 > if an FR1 measurement gap configuration is already setup, release the FR1 measurement gap configuration;
2 > setup the FR1 measurement gap configuration indicated by the measGapConfig in accordance with the received gapOffset, i.e., the first subframe of each gap occurs at an SFN (System Frame Number) and subframe meeting the following condition:
SFN mod T = FLOOR(gapOffset/10),
subframe = gap Offset mod 10;
with T = MGRP/10;
2 > if mgta is configured, apply the specified timing advance to the gap occurrences calculated above (i.e. the UE starts the measurement mgta ms before the gap subframe occurrences);

TABLE 22-continued

```
1 > else if gapFR1 is set to release:
2 > release the FR1 measurement gap configuration;
1 > if gapFR2 is set to setup:
2 > if an FR2 measurement gap configuration is already setup, release the FR2
measurement gap configuration;
2 > setup the FR2 measurement gap configuration indicated by the measGapConfig in
accordance with the received gapOffset, i.e., the first subframe of each gap occurs
at an SFN and subframe meeting the following condition:
SFN mod T = FLOOR(gapOffset/10);
subframe = gapOffset mod 10;
with T = MGRP/10;
2 > if mgta is configured, apply the specified timing advance to the gap occurrences
calculated above (i.e. the UE starts the measurement mgta ms before the gap
subframe occurrences);
1 > else if gapFR2 is set to release:
2 > release the FR2 measurement gap configuration;
1 > if gapUE is set to setup:
2 > if a per UE measurement gap configuration is already setup, release the per UE
measurement gap configuration;
2 > setup the per UE measurement gap configuration indicated by the measGapConfig
in accordance with the received gapOffset, i.e., the first subframe of each gap
occurs at an SFN and subframe meeting the following condition:
SFN mod T = FLOOR(gapOffset/10);
subframe = gapOffset mod 10;
with T = MGRP/10;
2 > if mgta is configured, apply the specified timing advance to the gap occurrences
calculated above (i.e. the UE starts the measurement mgta ms before the gap
subframe occurrences);
1 > else if gapUE is set to release:
2 > release the per UE measurement gap configuration.
```

NOTE 1:
For gapFR2 configuration, the SFN and subframe of a serving cell on FR2 frequency is used in the gap calculation NOTE 2:
For gapFR1 or gapUE configuration, the SFN and subframe of the PCell is used in the gap calculation The starting time of the MG for the following 5 cases are proposed.

1) For case of {EN-DC: per-FR MG: FR2: MGTA=0 ms} (That is, the UE is configured with EN-DC, per-FR MG, MG for FR2 and MGTA=0 ms) the starting time of the MG can be defined as follows.

For EN-DC (LTE is the master cell, NR cells are not in MCG): If per-FR measurement gap for FR2 is configured with MG timing advance of 0 ms, this measurement gap for FR2 starts at the end of the latest subframe of a serving cell on FR2 occurring immediately before the measurement gap.

2) For cases of {EN-DC:per-UE MG:MGTA=0 ms} and {EN-DC:per-FR MG:FR1:MGTA=0 ms}

For EN-DC (LTE is the master cell, NR cells are not in MCG):

i) If per-UE measurement gap is configured with MG timing advance of 0 ms, a measurement gap starts at the end of the latest subframe of E-UTRA PCell occurring immediately before the measurement gap.

ii) If per-FR measurement gap for FR1 is configured with MG timing advance of 0 ms, this measurement gap for FR1 starts at the end of the latest subframe of E-UTRA PCell occurring immediately before the measurement gap.

3) For case of {EN-DC:MGTA>0 ms}, the starting time of the MG can be defined as follows For EN-DC (LTE is the master cell, NR cells are not in MCG):

i) If per-UE measurement gap is configured with MG timing advance of 0.5 ms, a measurement gap starts at 0.5 ms before the end of the latest subframe of E-UTRA PCell occurring immediately before the measurement gap.

ii) If per-FR measurement gap for FR1 is configured with MG timing advance of 0.5 ms, this measurement gap for FR1 starts at 0.5 ms before the end of the latest subframe of E-UTRA PCell occurring immediately before the measurement gap.

iii) If per-FR measurement gap for FR2 is configured with MG timing advance of 0.25 ms, this measurement gap for FR2 starts at 0.25 ms before the end of the latest subframe of a serving cell on FR2 occurring immediately before the measurement gap.

4) For case of {SA}, the starting time of MG is similar to {EN-DC} with PCell instead of E-UTRA PCell.

For SA with MGTA=0 ms:

i) If per-UE measurement gap is configured with MG timing advance of 0 ms, a measurement gap starts at the end of the latest subframe of PCell occurring immediately before the measurement gap.

ii) If per-FR measurement gap for FR1 is configured with MG timing advance of 0 ms, this measurement gap for FR1 starts at the end of the latest subframe of PCell occurring immediately before the measurement gap.

iii) If per-FR measurement gap for FR2 is configured with MG timing advance of 0 ms, this measurement gap for FR2 starts at the end of the latest subframe of a serving cell on FR2 occurring immediately before the measurement gap.

For SA with MGTA>0 ms:

i) If per-UE measurement gap is configured with MG timing advance of 0.5 ms, a measurement gap starts at 0.5 ms before the end of the latest subframe of PCell occurring immediately before the measurement gap.

ii) If per-FR measurement gap for FR1 is configured with MG timing advance of 0.5 ms, this measurement gap for FR1 starts at 0.5 ms before the end of the latest subframe of PCell occurring immediately before the measurement gap.

iii) If per-FR measurement gap for FR2 is configured with MG timing advance of 0.25 ms, this measurement gap for FR2 starts at 0.25 ms before the end of the latest subframe of a serving cell on FR2 occurring immediately before the measurement gap.

5) For case of {NR CA}, the starting time of MG is same as the case of {SA} because there is no difference between the case of {NR CA} and the case of {SA} in aspect of measurement gap configuration (i.e. calculation).

Thus, the following is proposed for determining, by the UE, starting time of the MG when the MG timing advance is configured for the MG.

The measurement gap starts at time $T_{MG}$ (MG timing advance value) advanced to the end of the latest subframe occurring immediately before the configured measurement gap. That is, the UE determines the starting time of the MG based on the MG timing advance and the latest subframe occurring immediately before the configured measurement gap. The configured measurement gap may be a measurement gap configured based on gapoffset and MGRP.

In detail, 1) If the MG is configured with MGTA of 0 ms, the MG starts at the end of the latest subframe of corresponding serving Cell occurring immediately before the MG. 2) If the MG is configured with MGTA of 0.5 ms, the MG starts at 0.5 ms before the end of the latest subframe of corresponding serving Cell occurring immediately before the measurement gap. 3) If the MG is configured with MGTA of 0.25 ms, the MG starts at 0.25 ms before the end of the latest subframe of corresponding serving Cell occurring immediately before the measurement gap.

For example, in dual connectivity modes, the MG may be configured as the followings:

1) In E-UTRA-NR dual connectivity mode,
  if per-UE measurement gap is configured with MG timing advance of $T_{MG}$ ms, the measurement gap starts at time $T_{MG}$ ms advanced to the end of the latest E-UTRA subframe occurring immediately before the configured measurement gap among MCG serving cells subframes.
  if per-FR measurement gap for FR1 is configured with MG timing advance of $T_{MG}$ ms, the measurement gap for FR1 starts at time $T_{MG}$ ms advanced to the end of the latest E-UTRA subframe occurring immediately before the configured measurement gap among MCG serving cells subframes.
  if per-FR measurement gap for FR2 is configured with MG timing advance of $T_{MG}$ ms, the measurement gap for FR2 starts at time $T_{MG}$ ms advanced to the end of the latest NR subframe occurring immediately before the configured measurement gap among SCG serving cells subframes in FR2.

2) In NR-E-UTRA dual connectivity mode,
  if per-UE measurement gap is configured with MG timing advance of $T_{MG}$ ms, the measurement gap starts at time $T_{MG}$ ms advanced to the end of the latest NR subframe occurring immediately before the configured measurement gap among MCG serving cells subframes.
  if per-FR measurement gap for FR1 is configured with MG timing advance of $T_{MG}$ ms and UE has NR serving cell in FR1, the measurement gap for FR1 starts at time $T_{MG}$ ms advanced to the end of the latest NR subframe occurring immediately before the configured measurement gap among MCG serving cells subframes in FR1.
  if per-FR measurement gap for FR1 is configured with MG timing advance of $T_{MG}$ ms and UE doesn't have NR serving cell in FR1, the measurement gap for FR1 starts at time $T_{MG}$ ms advanced to the end of the latest E-UTRA subframe occurring immediately before the configured measurement gap among SCG serving cells subframes.
  if per-FR measurement gap for FR2 is configured with MG timing advance of $T_{MG}$ ms, the measurement gap for FR2 starts at time $T_{MG}$ ms advanced to the end of the latest NR subframe occurring immediately before the configured measurement gap among MCG serving cells subframes in FR2.

3) In NR-NR dual connectivity mode,
  If per-UE measurement gap is configured with MG timing advance of $T_{MG}$ ms, the measurement gap starts at time $T_{MG}$ ms advanced to the end of the latest MCG subframe occurring immediately before the configured measurement gap among MCG serving cells subframes.
  If per-FR measurement gap for FR1 is configured with MG timing advance of $T_{MG}$ ms, the measurement gap for FR1 starts at time $T_{MG}$ ms advanced to the end of the latest MCG subframe occurring immediately before the configured measurement gap among MCG serving cells subframes.
  If per-FR measurement gap for FR2 is configured with MG timing advance of $T_{MG}$ ms, the measurement gap for FR2 starts at time $T_{MG}$ ms advanced to the end of the latest SCG subframe occurring immediately before the configured measurement gap among SCG serving cells subframes in FR2.

In determining the measurement gap starting point (starting time), the UE shall use the DL timing of the latest E-UTRA or NR subframe occurring immediately before the configured measurement gap among E-UTRA or NR serving cells.

Figure 17:
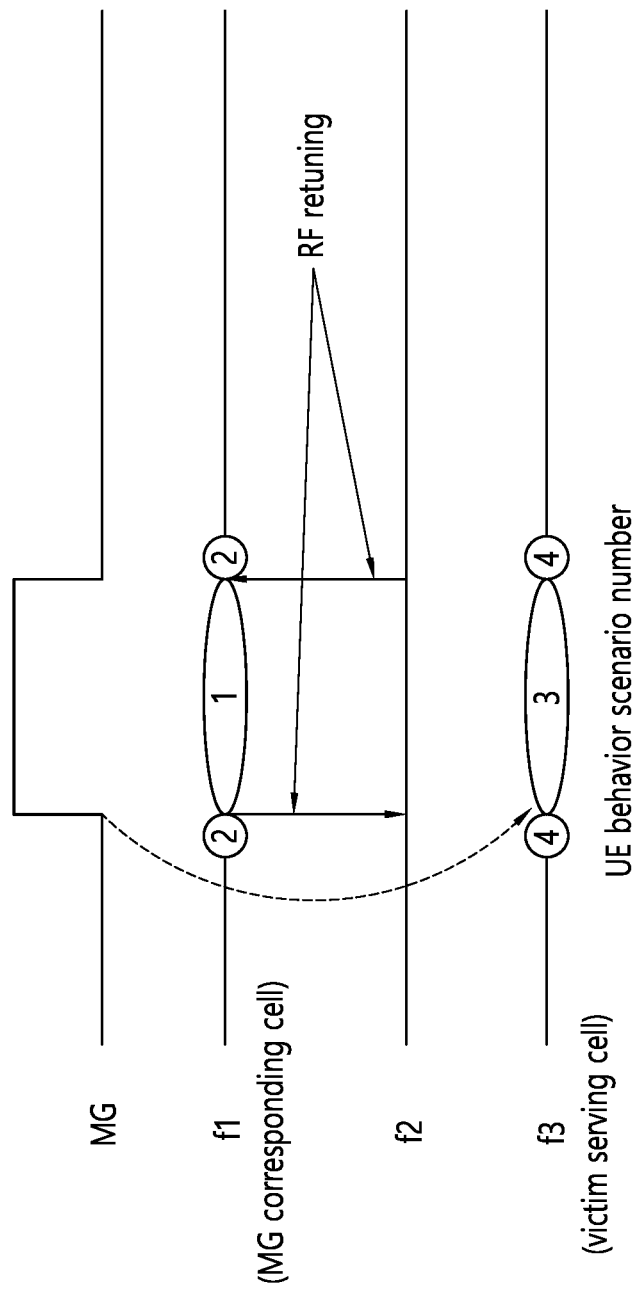
FIG. 17 shows an example of UE behavior scenarios related to MG.

UE behavior related to the MG can be classified into 4 scenarios in FIG. 17.

FIG. 17 Shows an Example of UE Behavior Scenarios Related to MG.

In FIG. 17, f1 cell and f3 cell are serving cells and the MG is configured at f1 cell to perform measurement of signal from the f2 cell. The f1 cell may be called MG corresponding cell and the f3 cell may be called victim serving cell.

For example, the UE performs measurement for the f2 cell during the MG. The UE may receive signal from the f1 cell or transmit signal from the f1 cell before/after the MG. The UE receive signal from the f3 cell or transmit signal form the f3 cell. The reception/transmission of signal with the f3 cell may be interrupted by the performing measurement during the MG.

According to FIG. 17, the following 4 scenarios are described:

$1^{st}$ scenario: UE behavior on corresponding Cell during the MG $2^{nd}$ scenario: UE behavior on corresponding Cell after/before the MG $3^{rd}$ scenario: UE behavior on other serving cells than corresponding Cell during the MG $4^{th}$ scenario: UE behavior on other serving cells than corresponding Cell after/before the MG According to current NR specification, the requirement of UE behavior for $1^{st}$, $3^{rd}$ and $4^{th}$ scenarios are specified. However, UE behavior for $2^{nd}$ scenario is not specified for NR. For LTE, all 4 scenarios are specified.

In detail, UE behavior for 1st scenario is specified as the following Table 23.

TABLE 23

During the per-UE measurement gaps, the UE:
is not required to conduct reception/transmission from/to the corresponding E-UTRAN PCell, E-UTRAN SCell(s) and NR serving cells for NSA except the reception of signals used for RRM measurement
is not required to conduct reception/transmission from/to the corresponding NR serving cells for SA except the reception of signals used for RRM measurement
During the per-FR measurement gaps the UE:
is not required to conduct reception/transmission from/to the corresponding E-UTRAN PCell, E-UTRAN SCell(s) and NR serving cells in the corresponding frequency range for NSA except the reception of signals used for RRM measurement
is not required to conduct reception/transmission from/to the corresponding NR serving cells in the corresponding frequency range for SA except the reception of signals used for RRM measurement UE behavior for 3rd and 4th scenarios is specified with requirement of interruption due to the MG as the following Table 24. Here, interrupted serving cells (for example, f3 cell of FIG. 17) are victim cells due to MG other than MG corresponding Cell.

TABLE 24

For E-UTRA-NR dual connectivity,
if UE is not capable of per-FR-gap, total interruption time on SCG during MGL is defined only when MGL(N) = 6 ms, 4 ms and 3 ms.
if UE is capable of per-FR-gap,
total interruption time on FR1 serving cells in SCG during MGL is defined only when MGL(N) = 6 ms, 4 ms and 3 ms, and
total interruption time on FR2 serving cells in SCG during MGL is defined only when MGL(N) = 5.5 ms, 3.5 ms and 1.5 ms, given that the reference time for per-FR gap in FR2 is based on an FR2 serving cell.
For NR standalone,
if UE is not capable of per-FR-gap,
total interruption time on a serving cell during MGL is defined only when MGL(N) = 6 ms, 4 ms and 3 ms.
if UE is capable of per-FR-gap,
total interruption time on FR1 serving cells during MGL is defined only when MGL(N) = 6 ms, 4 ms and 3 ms, and
total interruption time on FR2 serving cells during MGL is defined only when MGL(N) = 5.5 ms, 3.5 ms and 1.5 ms, given that the reference time for per-FR gap in FR2 is based on an FR2 serving cell.

Therefore, the requirement of UE behavior for $2^{nd}$ scenario should be specified. Thus, it is needed to specify the requirement for UE behavior on corresponding Cell after/before MG. For specifying the requirement of UE behavior for $2^{nd}$ scenario, the agreements in Table 20 and the starting point of the MG based on MGTA should be considered.

UE behavior for the $2^{nd}$ scenario is suggested in the second example of disclosure of the present specification based on NR TDD case and NR FDD case.

<NR TDD>

Figure 18:
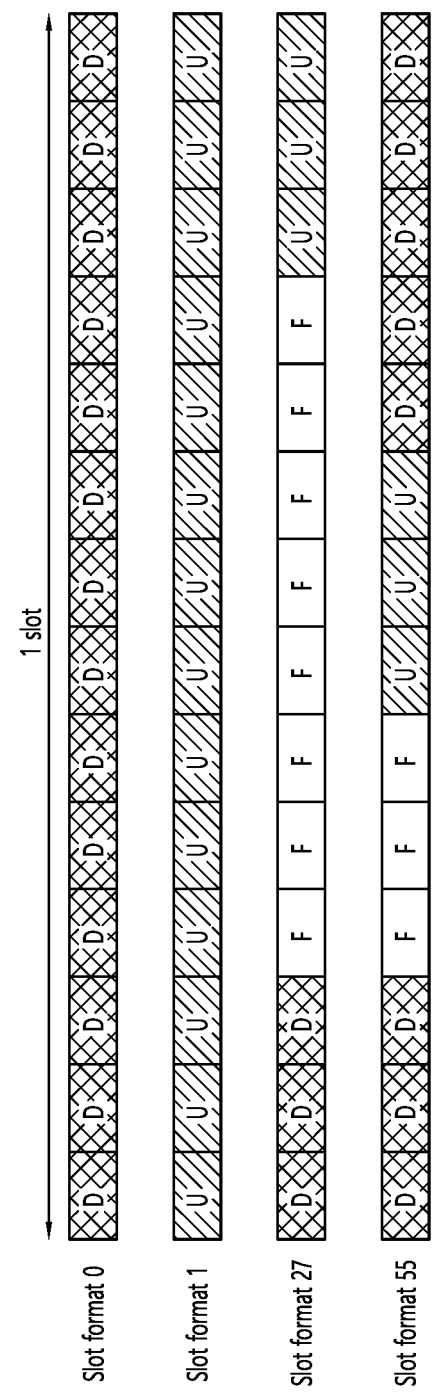
FIG. 18 shows an example of slot formats.

FIG. 18 Shows an Example of Slot Formats.

In NR TDD case, 4 different types of slot formats in FIG. 18 are considered for suggesting UE behavior for $2^{nd}$ scenario. The 4 different types of slot formats are first type (slot format including only DL symbols, such as slot format 0), second type (slot format including only UL symbols, such as slot format 1), third type (slot format including DL symbol, F symbol, UL symbol, such as slot format 27) and fourth type (slot format including DL symbol, F symbol, UL symbol, DL symbol, such as slot format 55).

FIGS. 19A to 19F Shows an Example of UE Behavior Before or after DL Timing Based MG with MGTA of 0 ms in NR TDD.

For MGTA of 0 ms, if MG starting time is configured based on DL timing, the MG starts at DL subframe boundary at UE and the MG ends at DL subframe boundary at UE. FIGS. 19A to 19F shows an examples based on 4 different SCSs (15 kHz, 30 kHz, 60 kHz, 120 kHz).

Figure 19A:
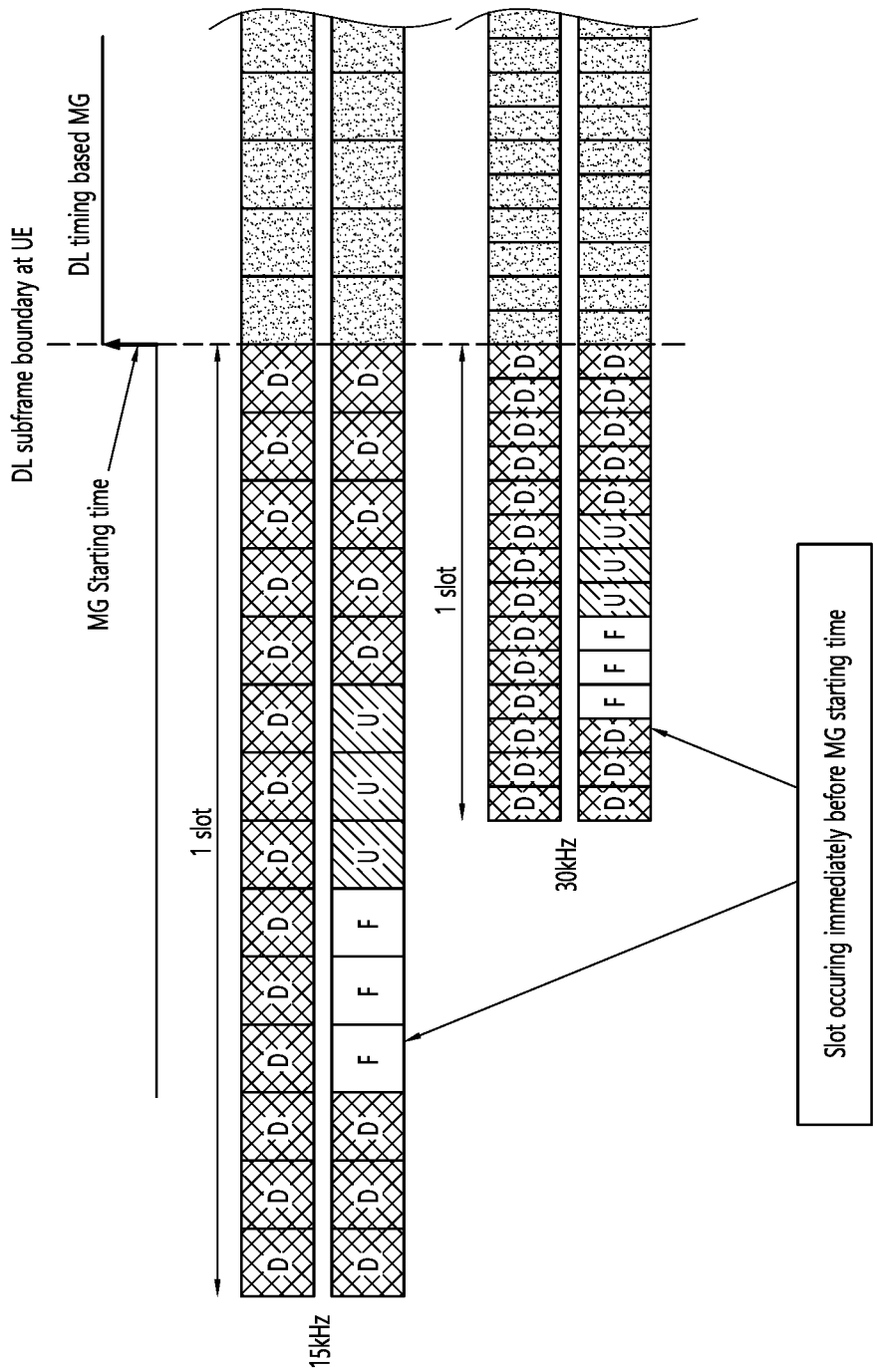
FIGS. 19A to 19F shows an example of UE behavior before or after DL timing based MG with MGTA of 0 ms in NR TDD.
Figure 19B:
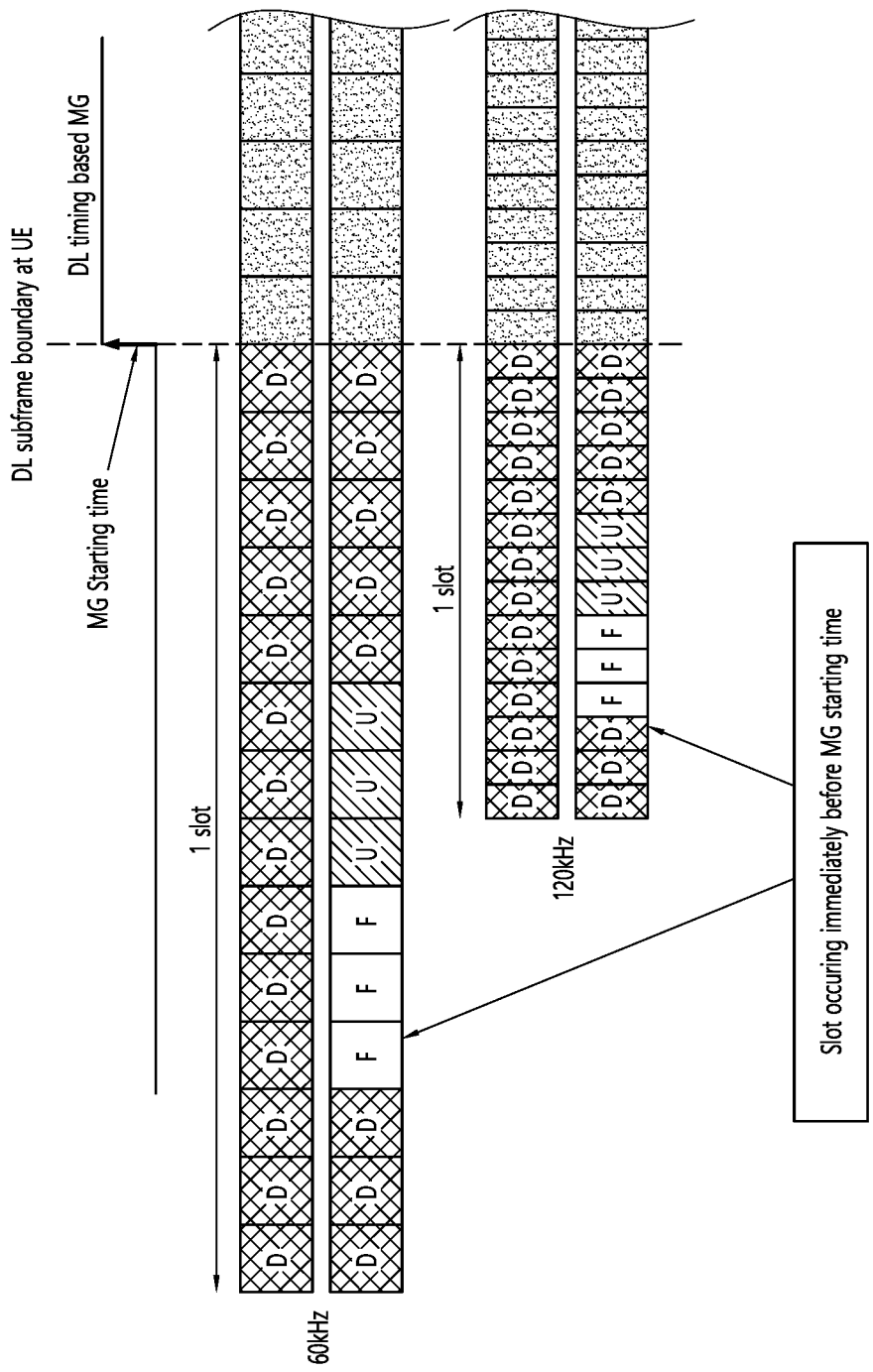
Figure 19C:
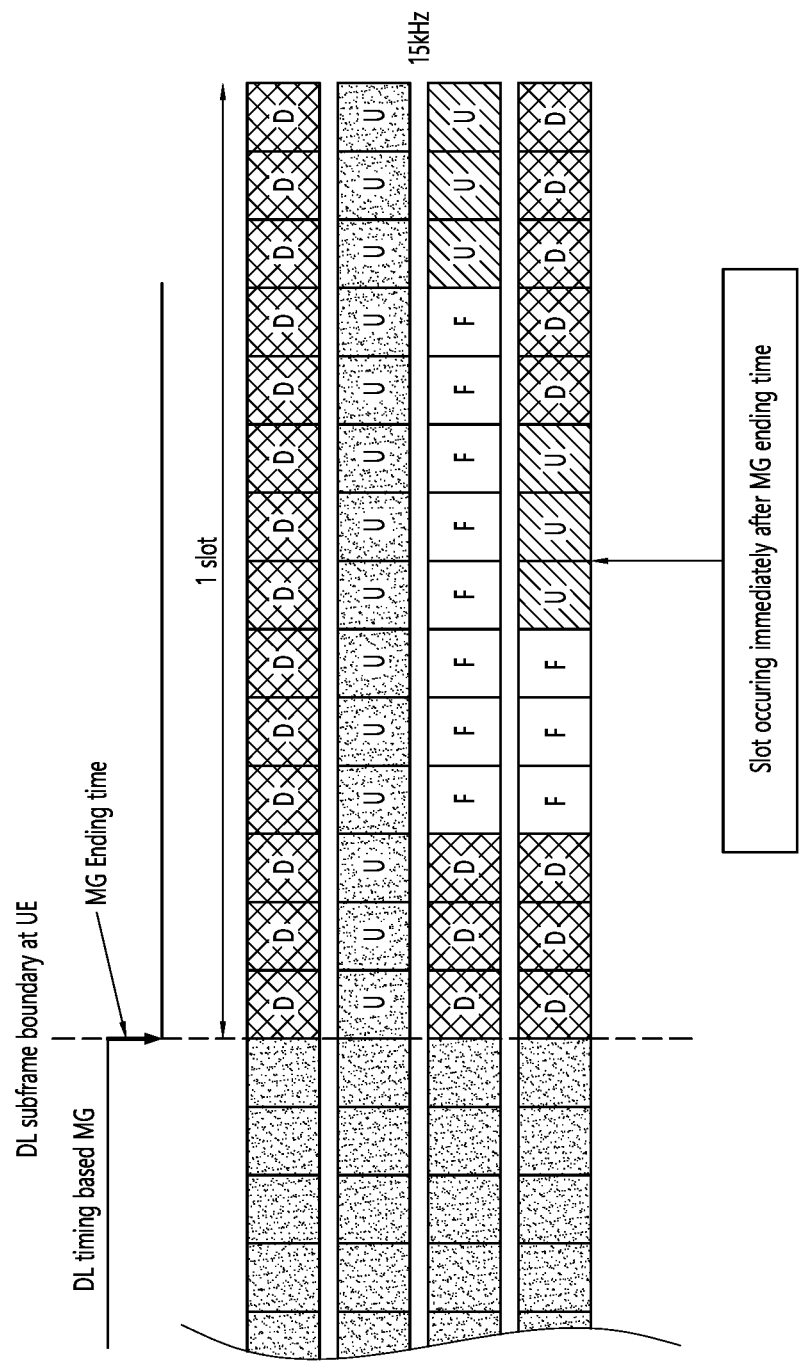
Figure 19D:
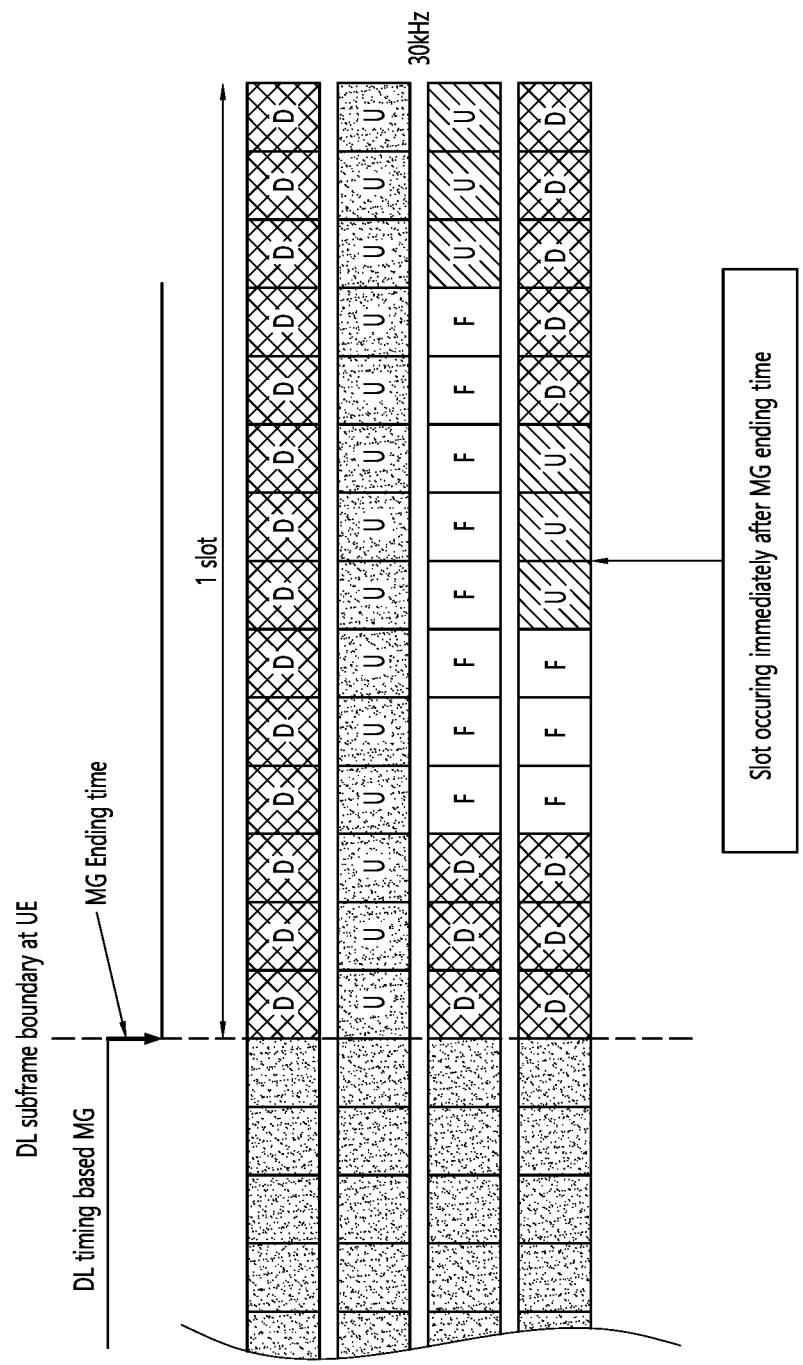
Figure 19E:
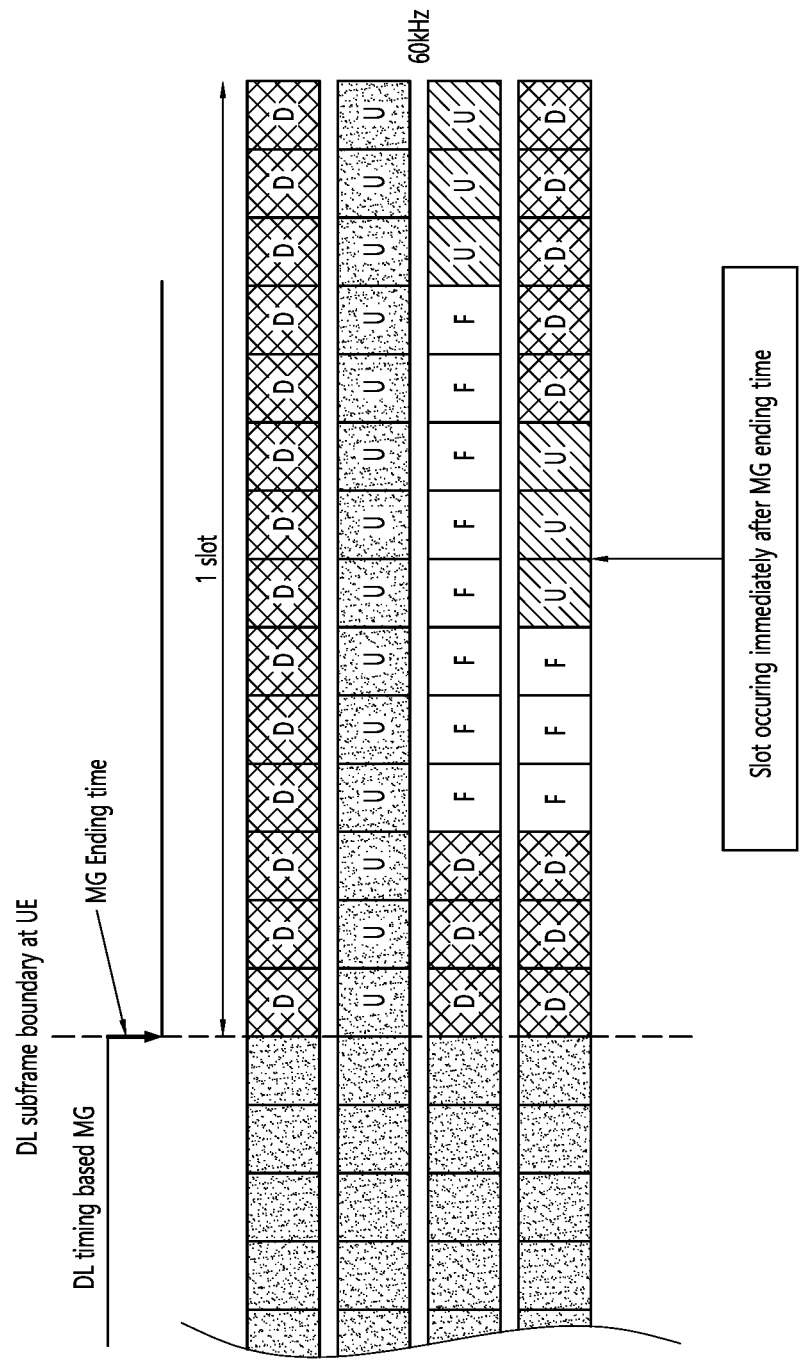
Figure 19F:
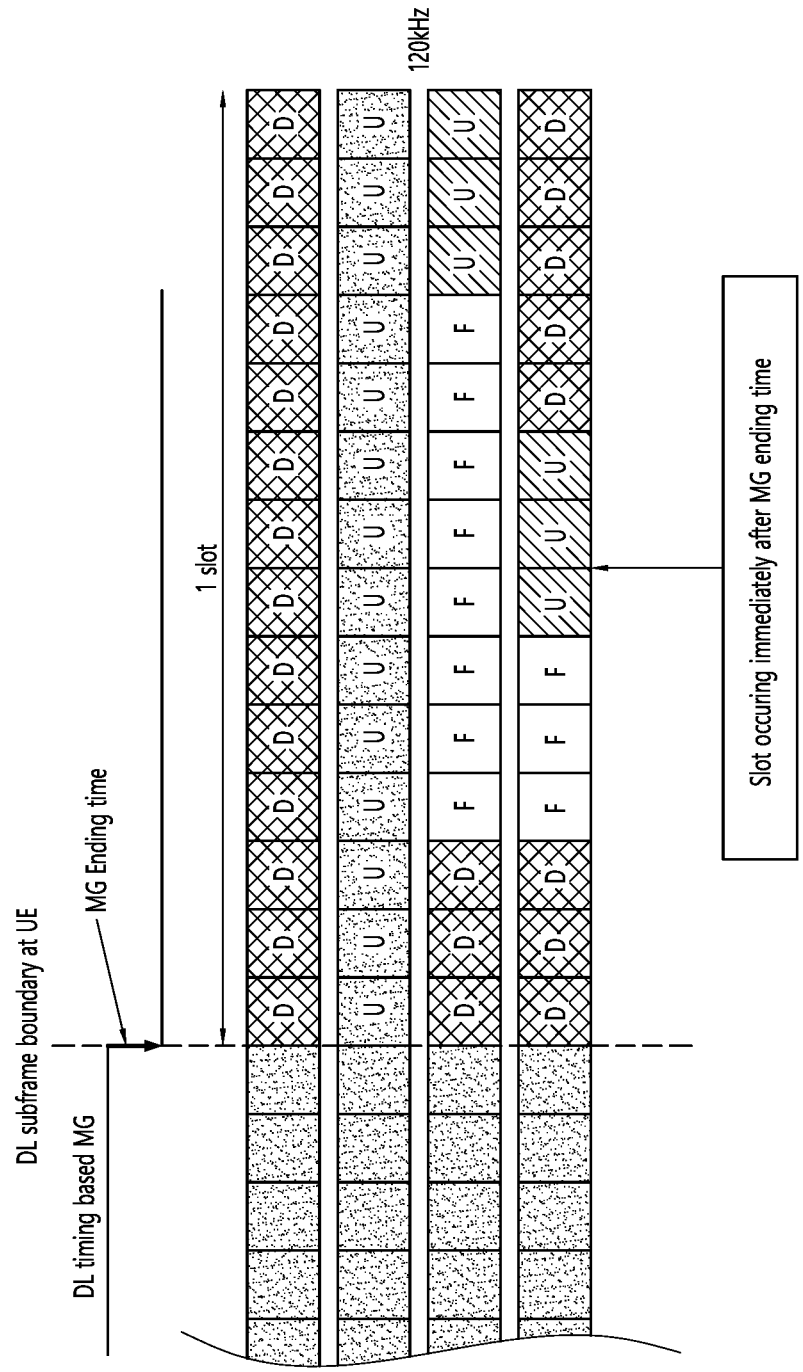
Figure 20A:
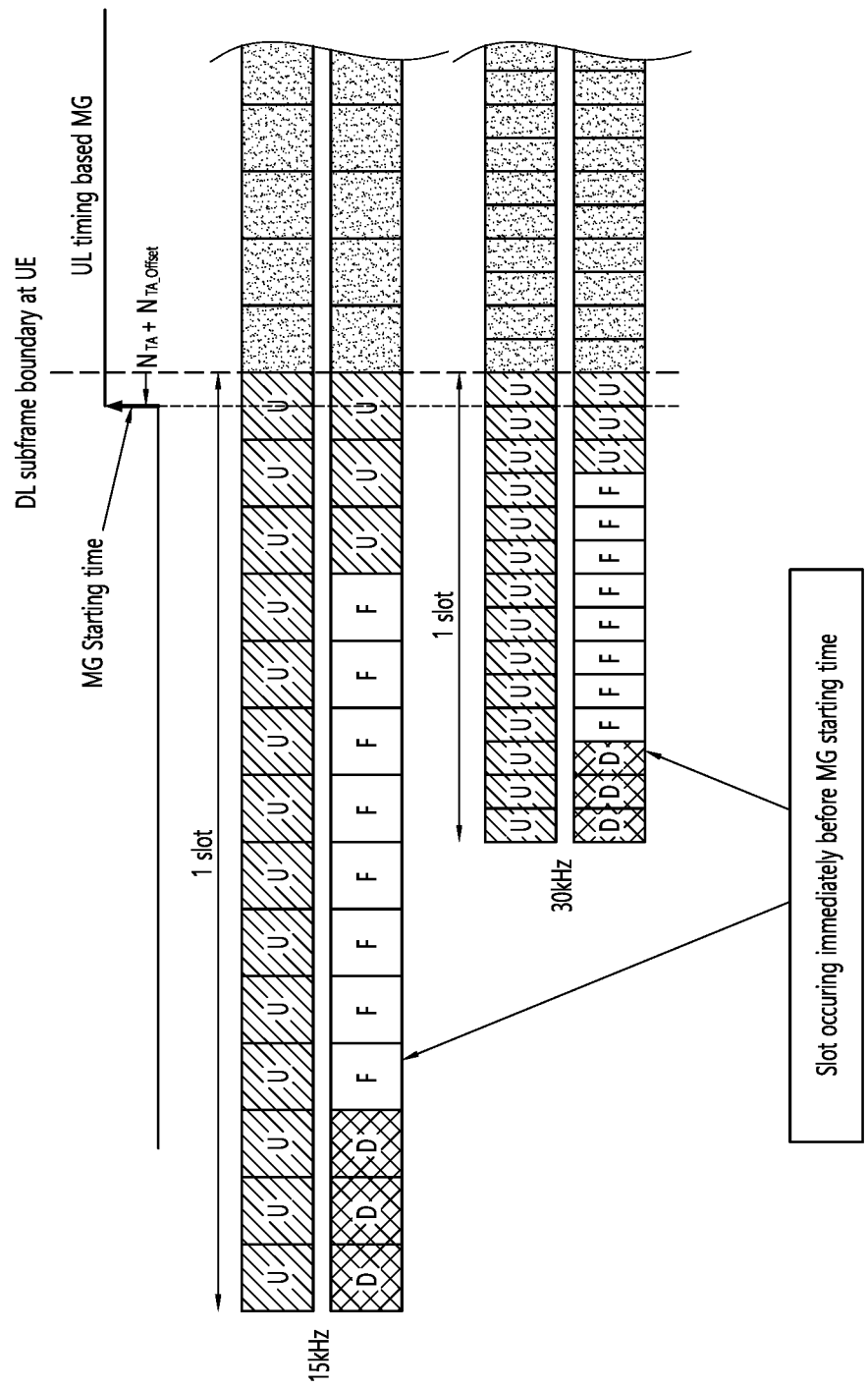
FIGS. 20A to 20F shows an example of UE behavior before or after UL timing based MG with MGTA of 0 ms in NR TDD.
Figure 20B:
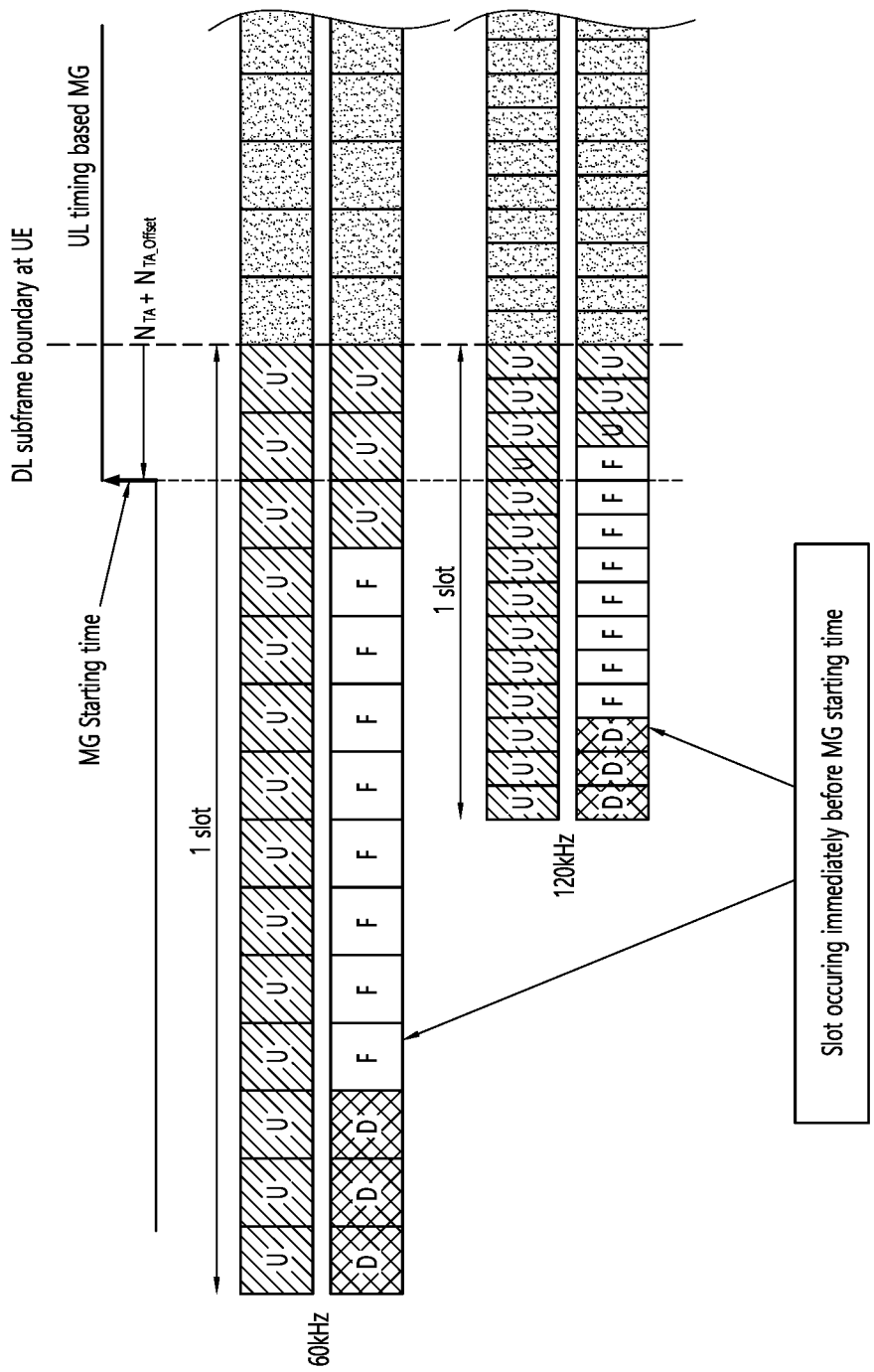
Figure 20C:
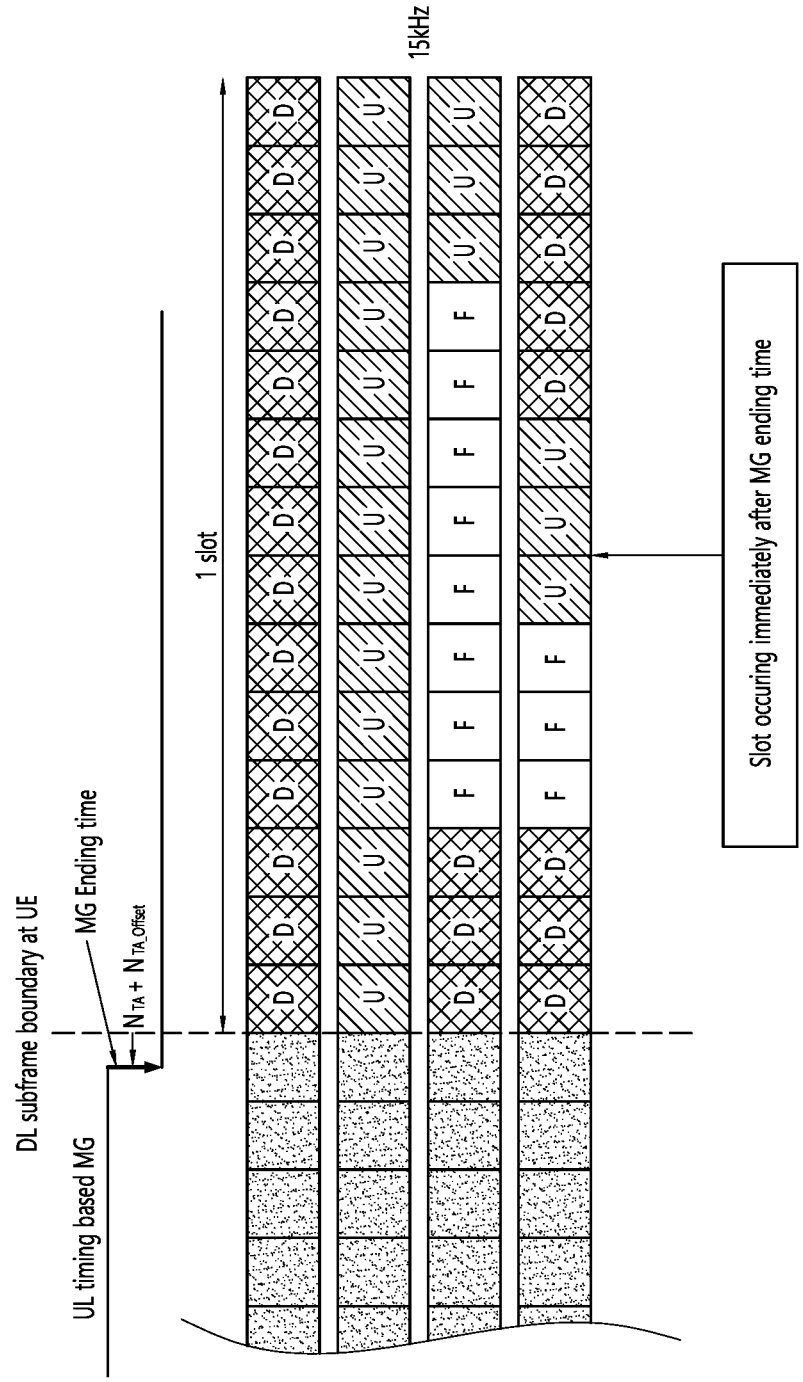
Figure 20D:
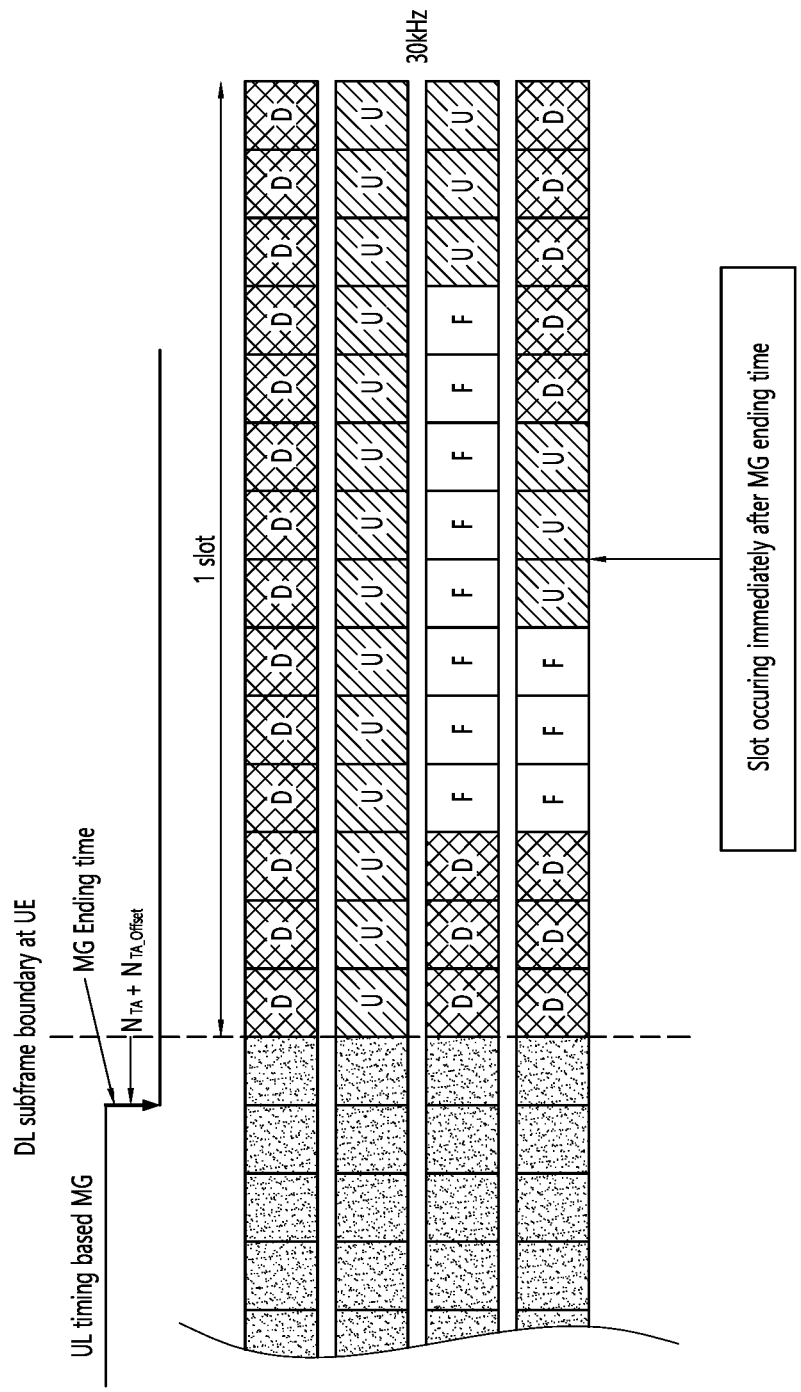
Figure 20E:
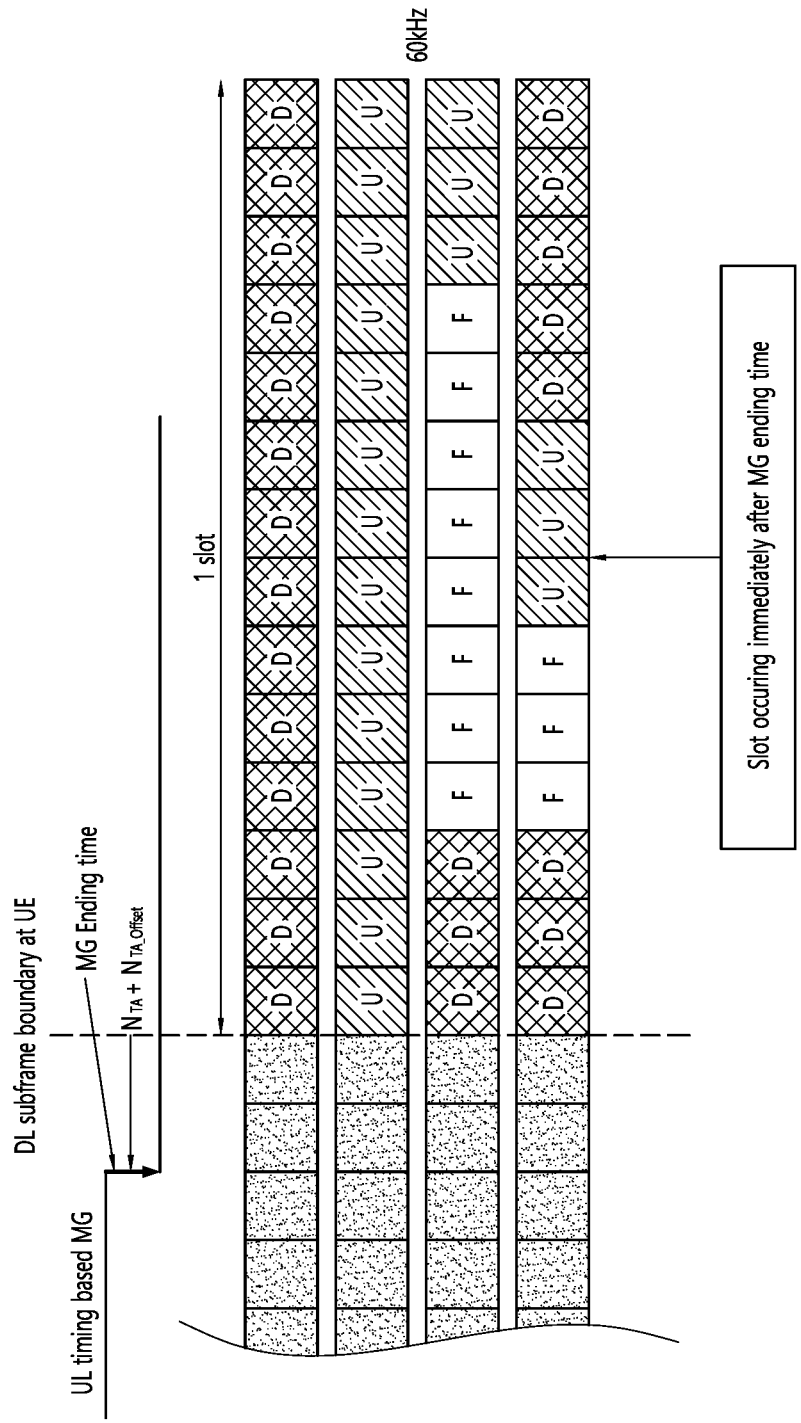
Figure 20F:
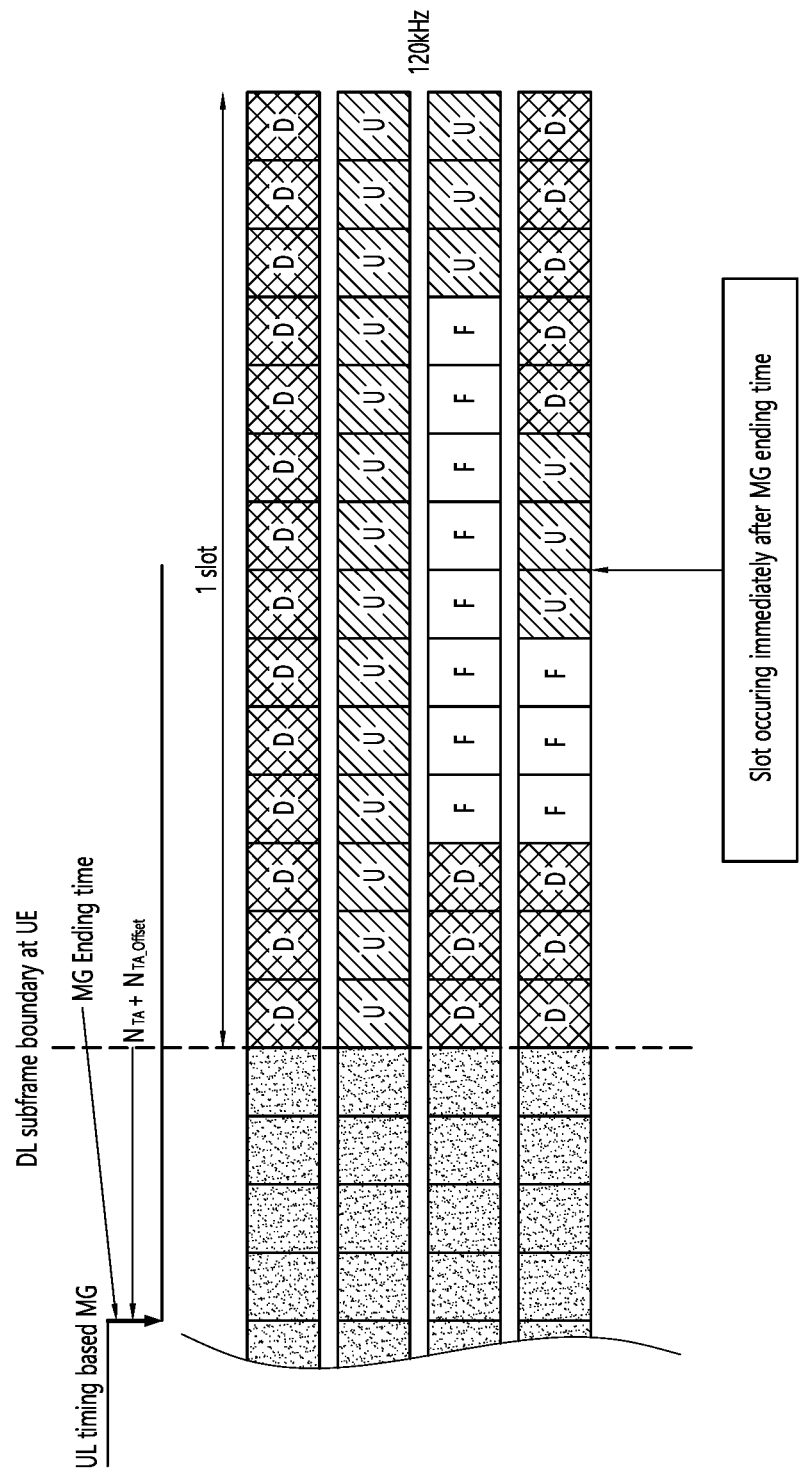
Figure 21A:
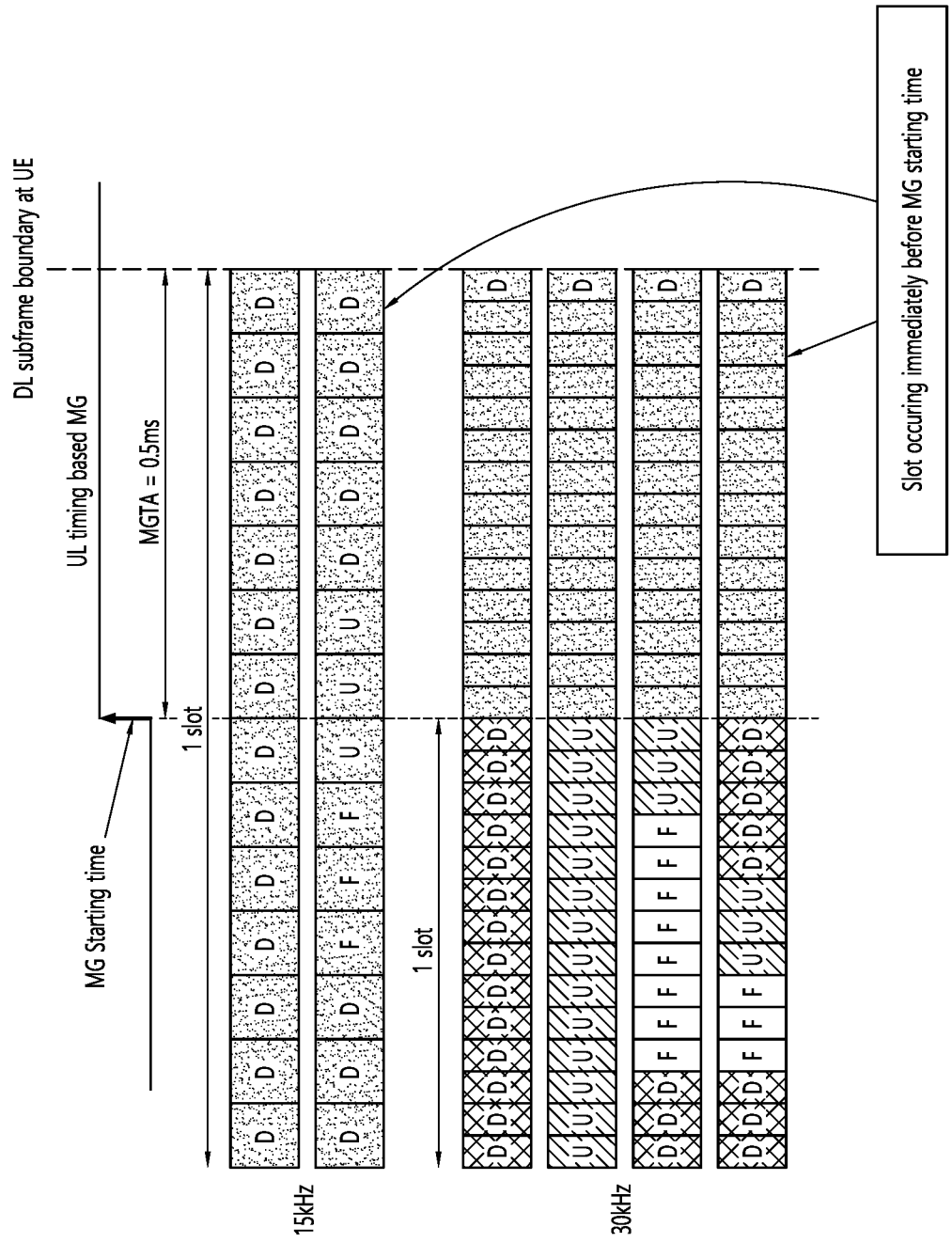
FIGS. 21A to 21I shows an example of UE behavior before or after DL timing based MG with MGTA of 0.5 ms or 0.25 ms in NR TDD.
Figure 21B:
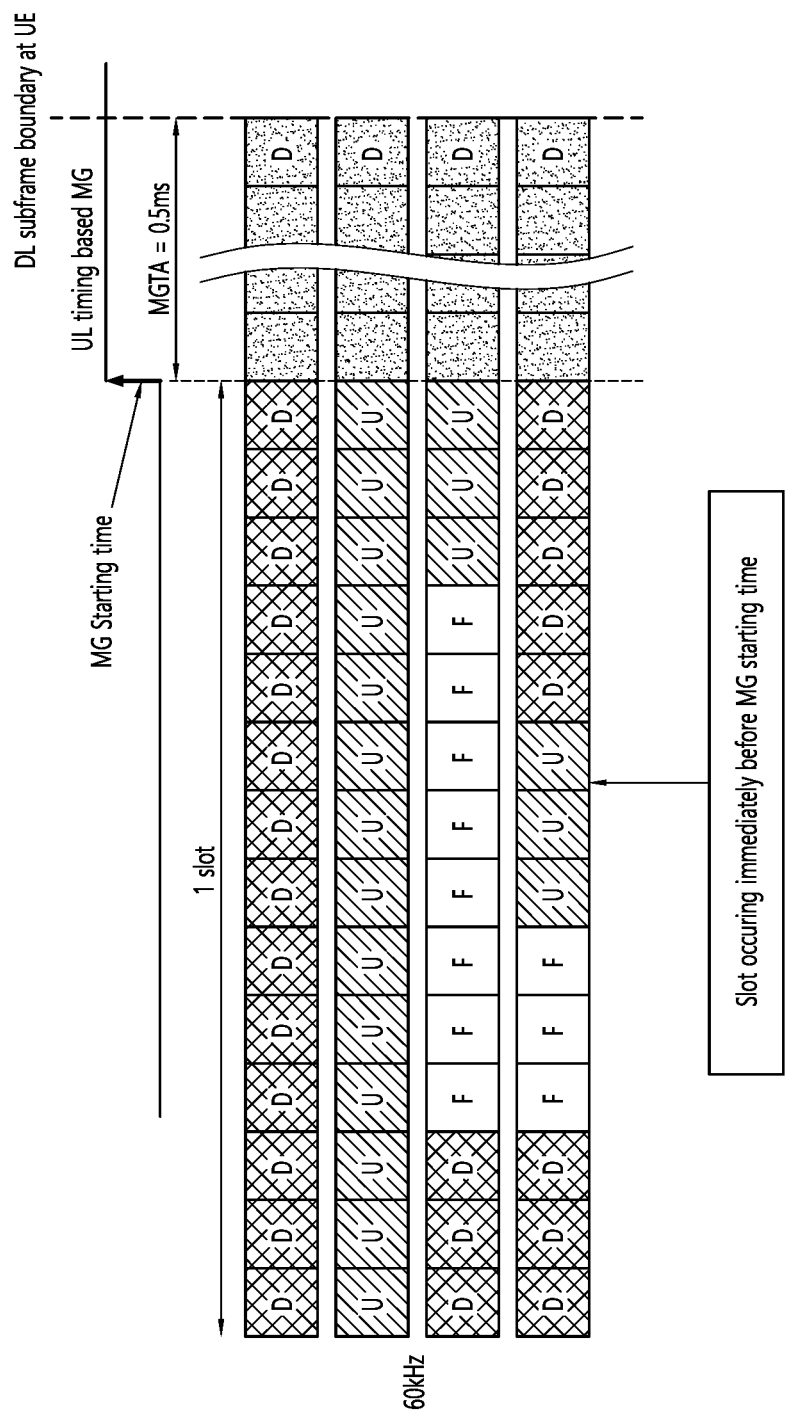
Figure 21C:
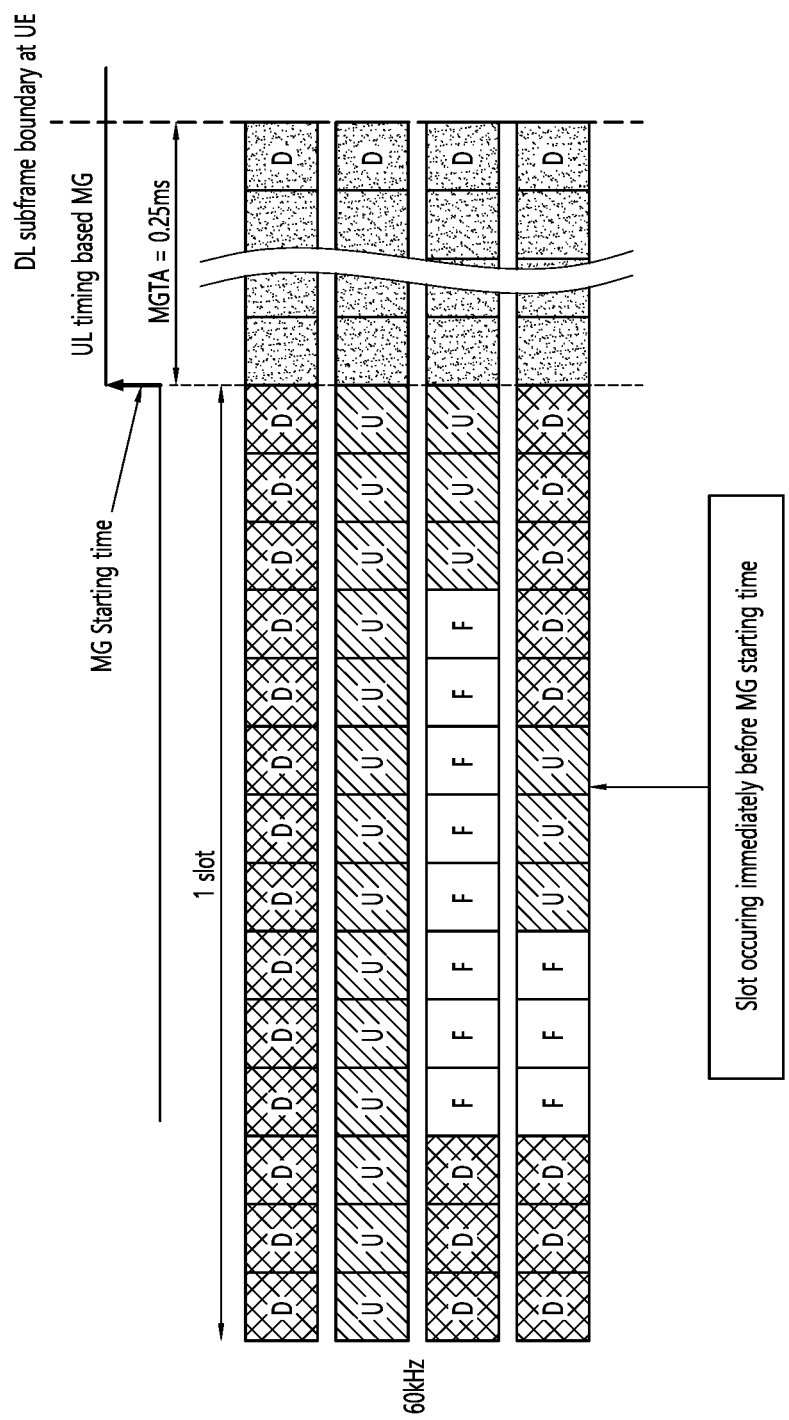
Figure 21D:
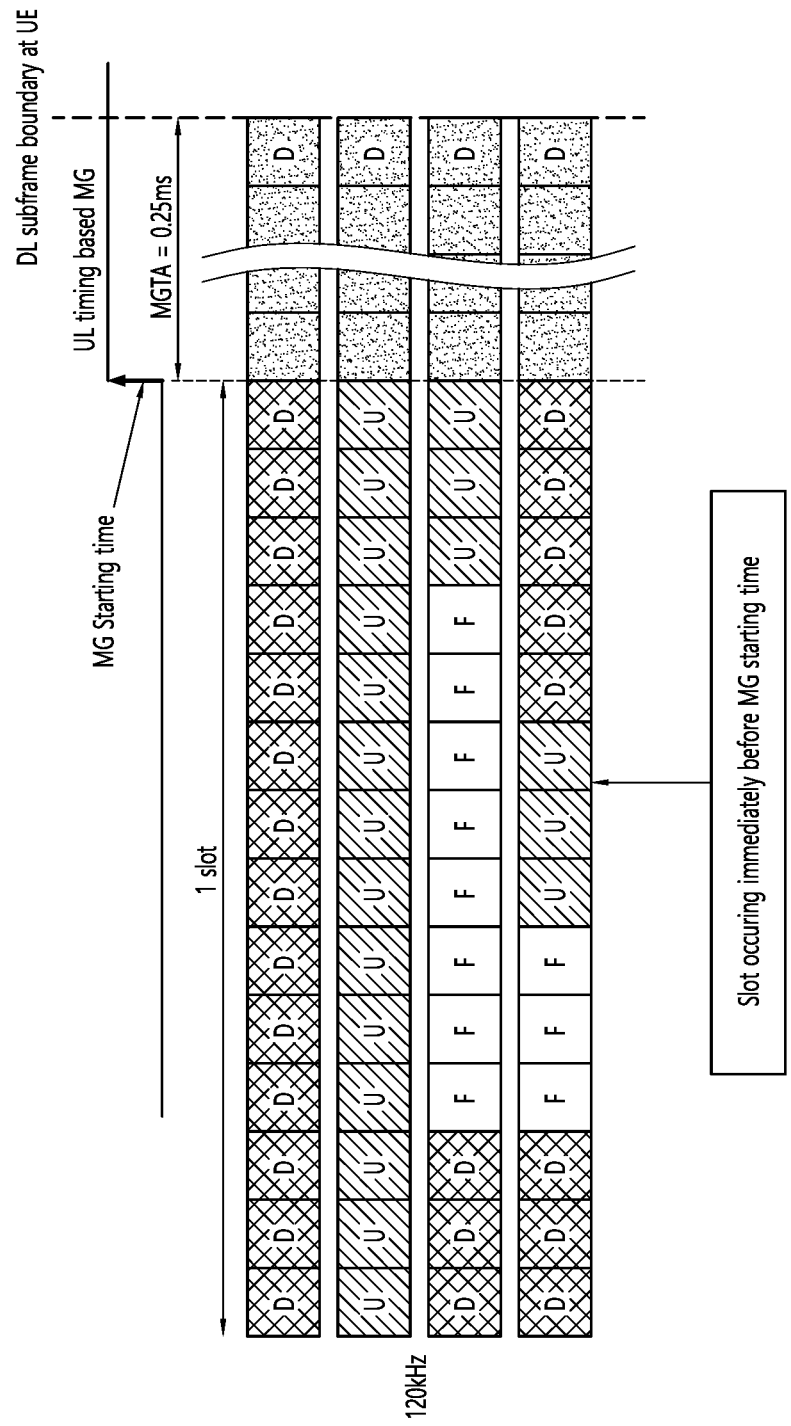
Figure 21E:
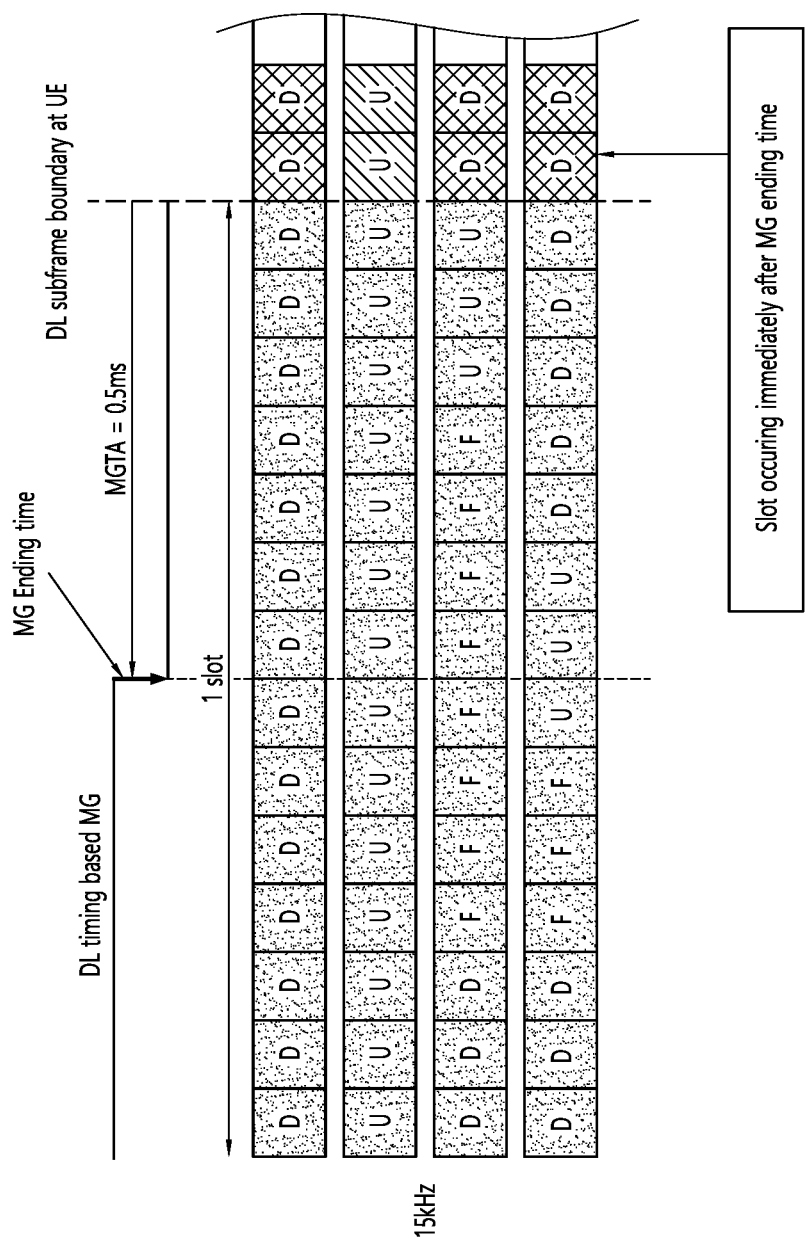
Figure 21F:
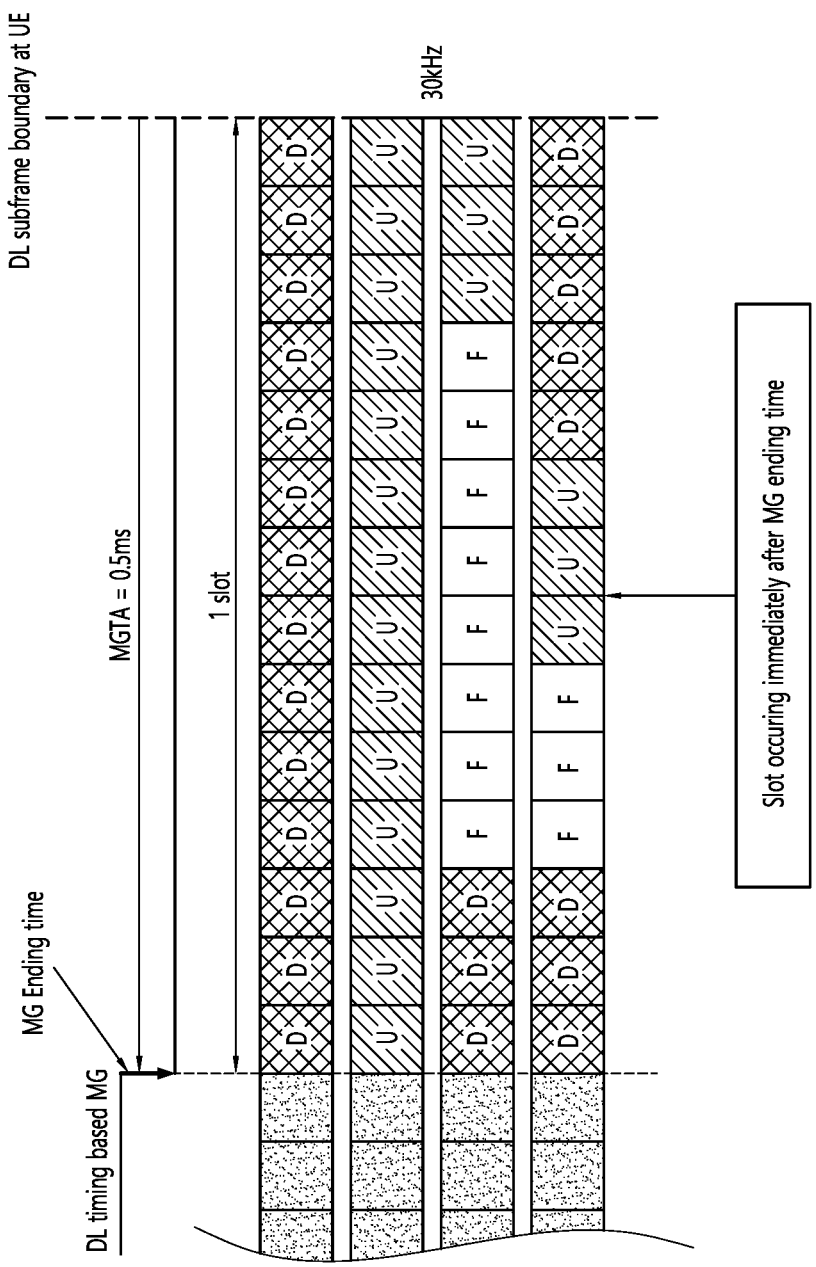
Figure 21G:
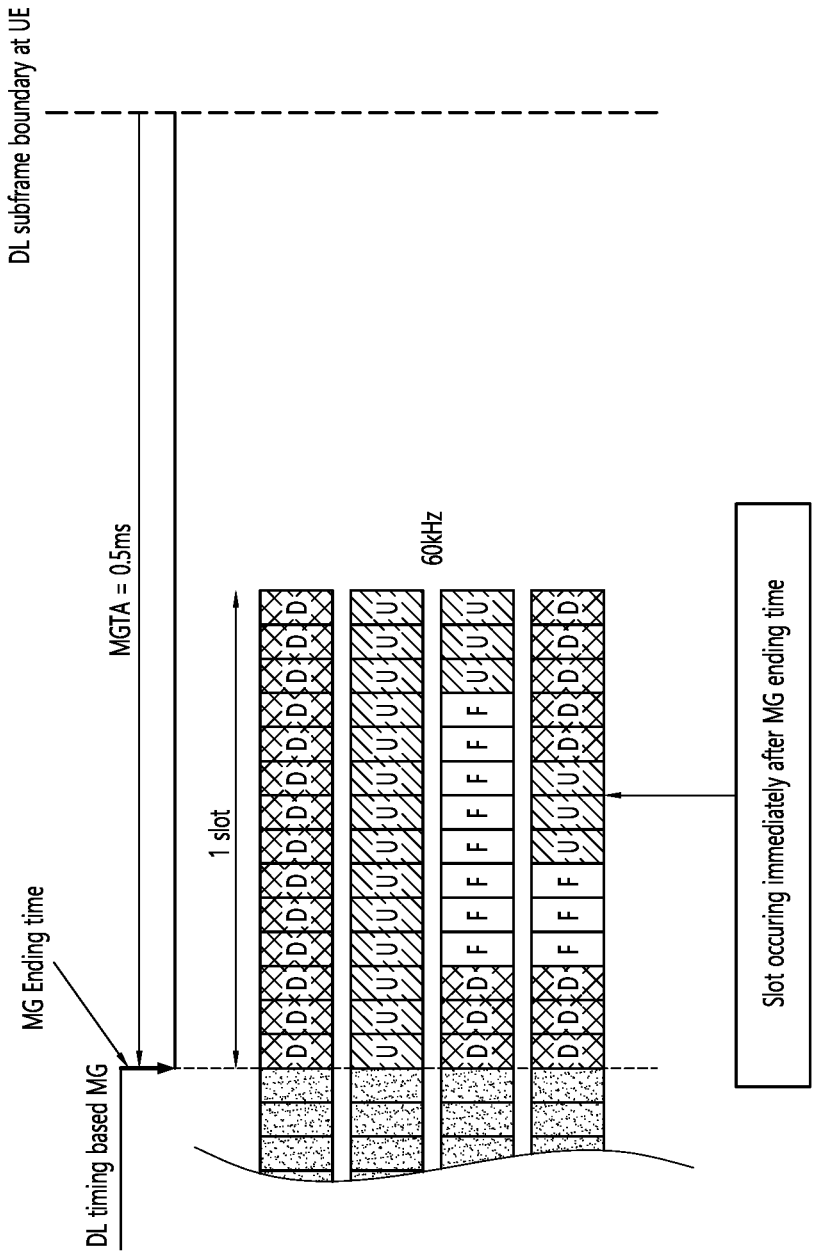
Figure 21H:
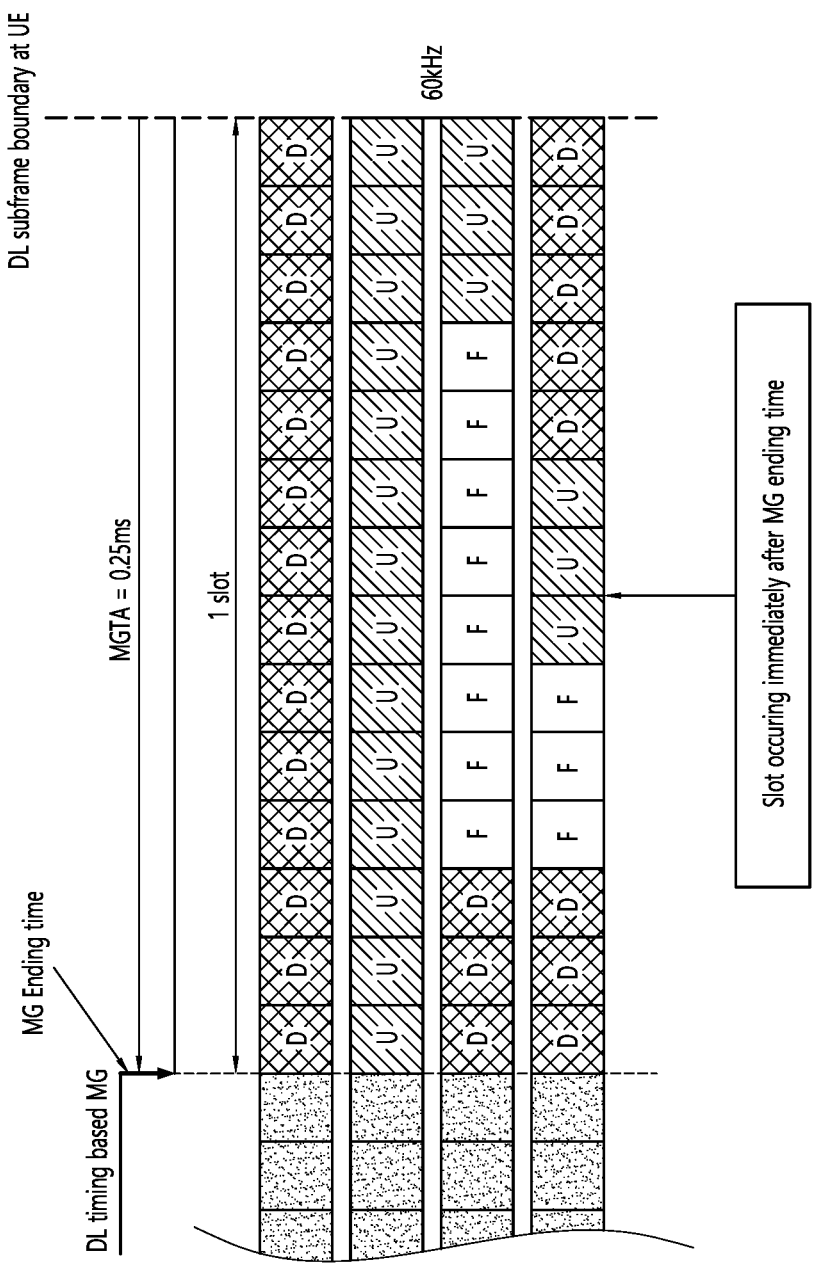
Figure 21I:
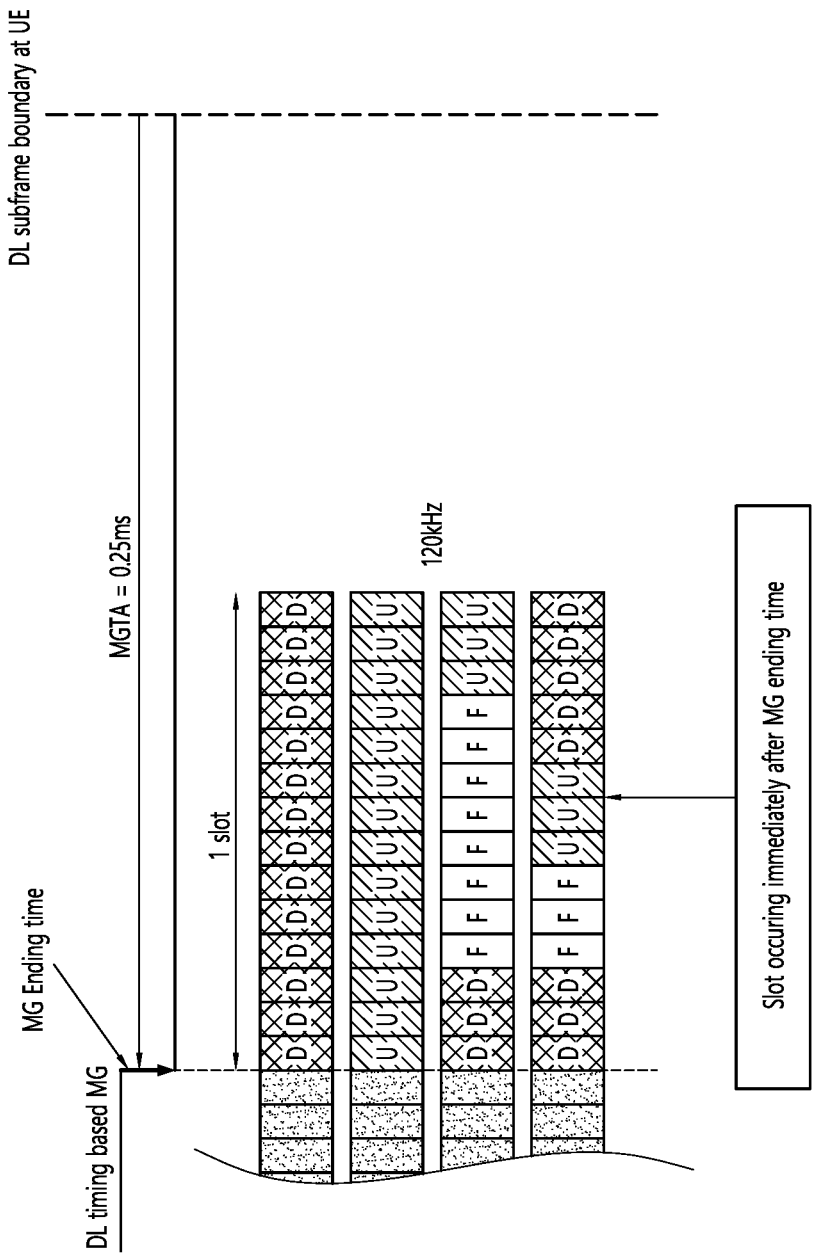
Figure 22A:
FIGS. 22A to 22I shows an example of UE behavior before or after UL timing based MG with MGTA of 0.5 ms or 0.25 ms in NR TDD.
Figure 22B:
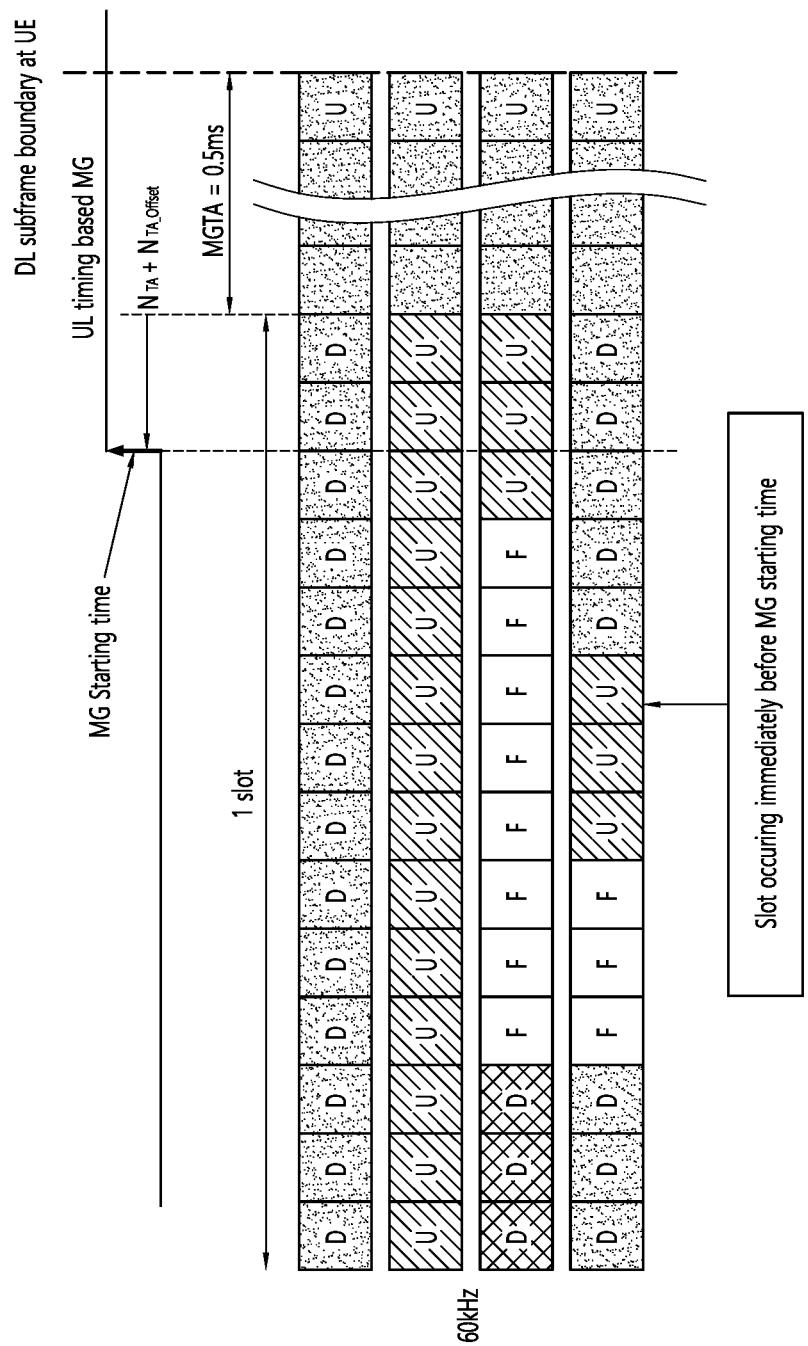
Figure 22C:
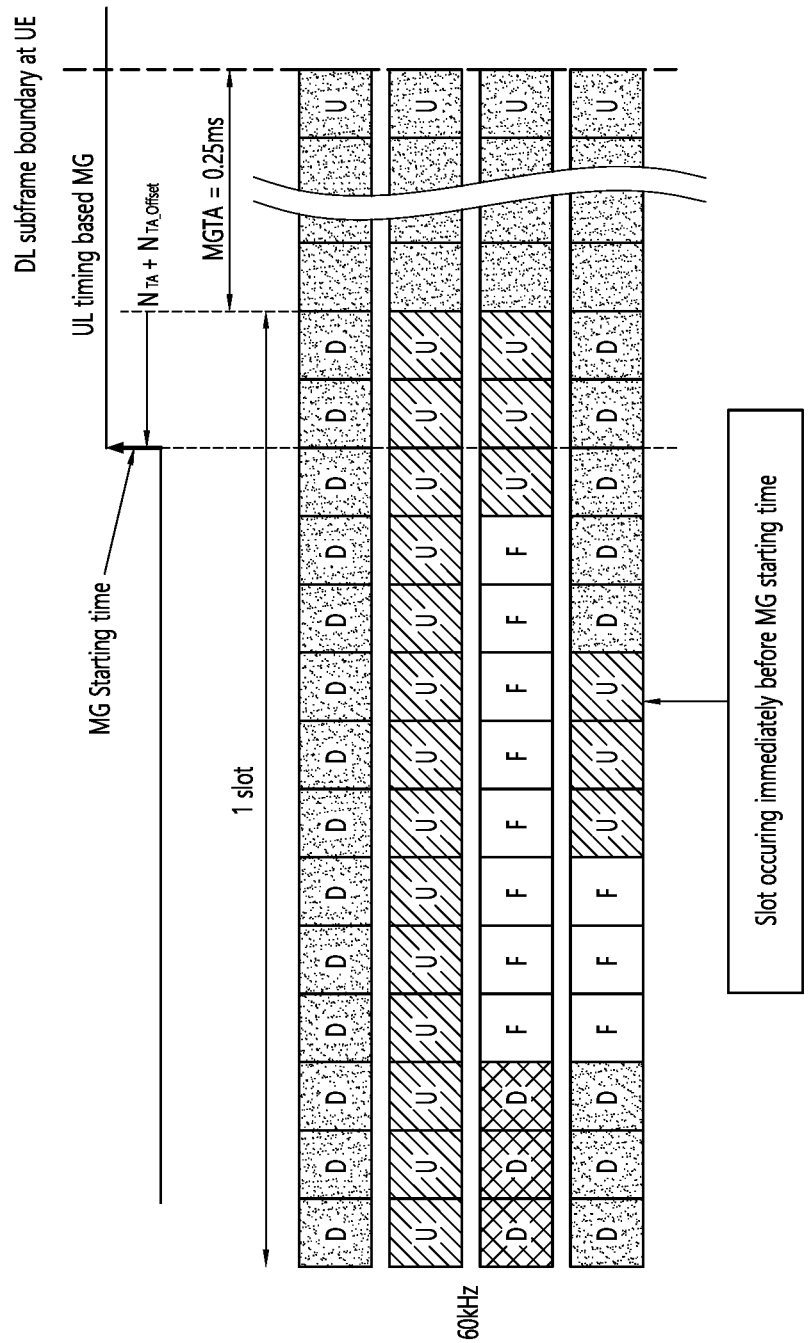
Figure 22D:
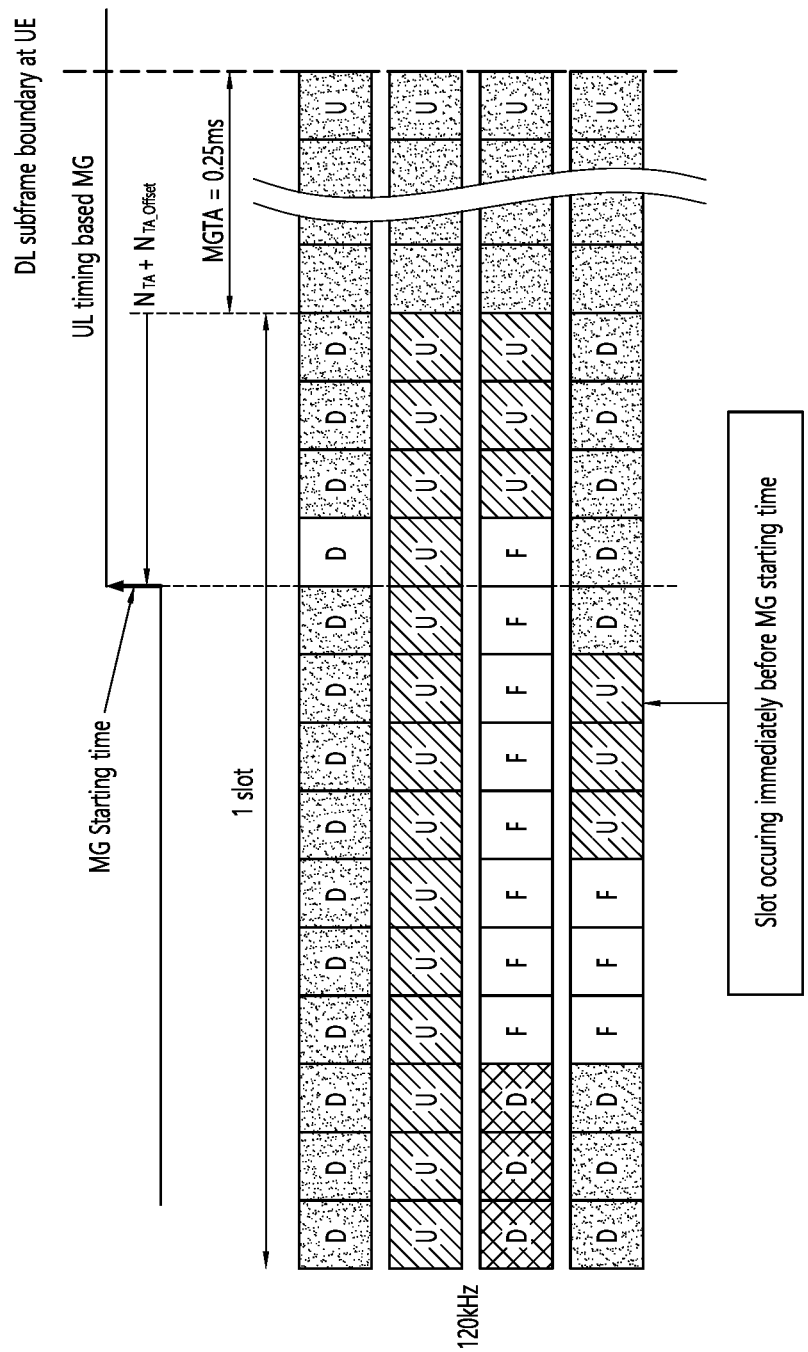
Figure 22E:
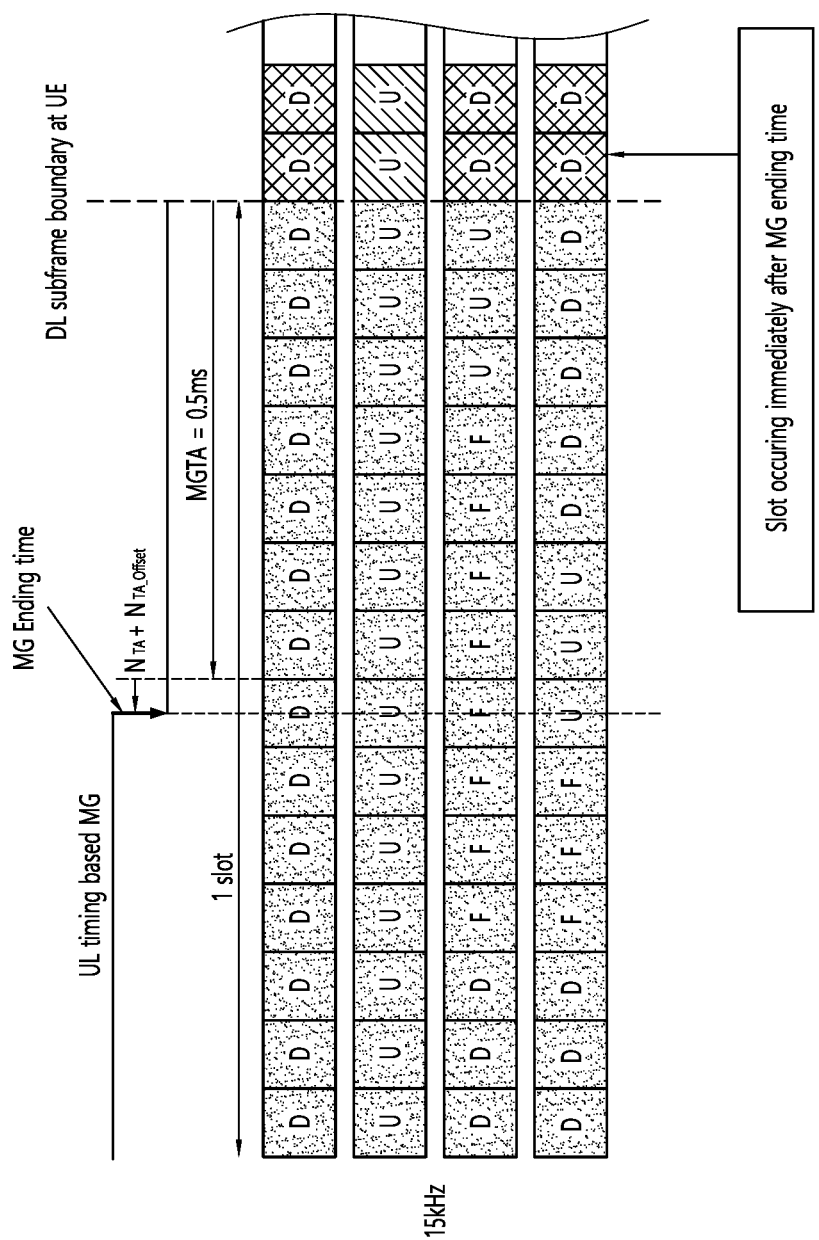
Figure 22F:
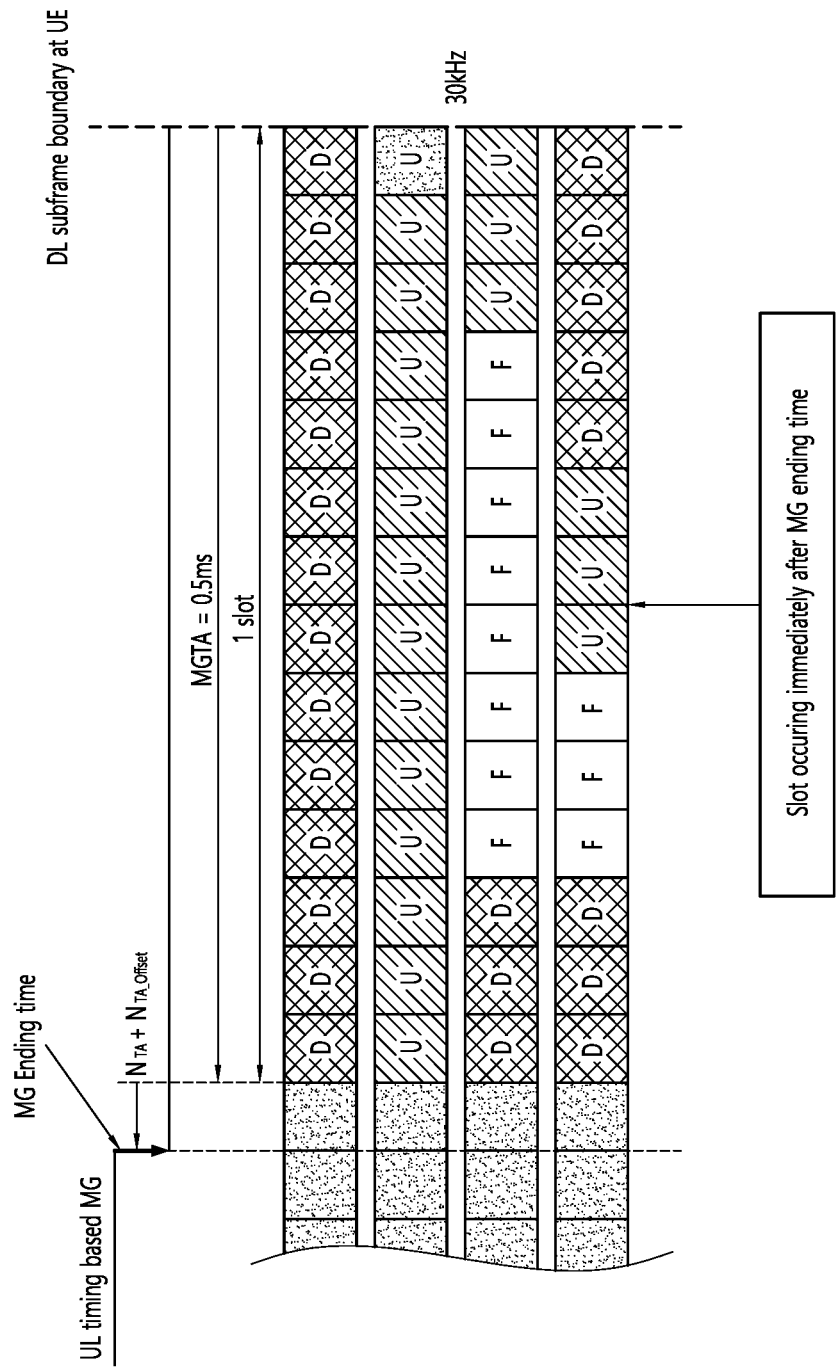
Figure 22G:
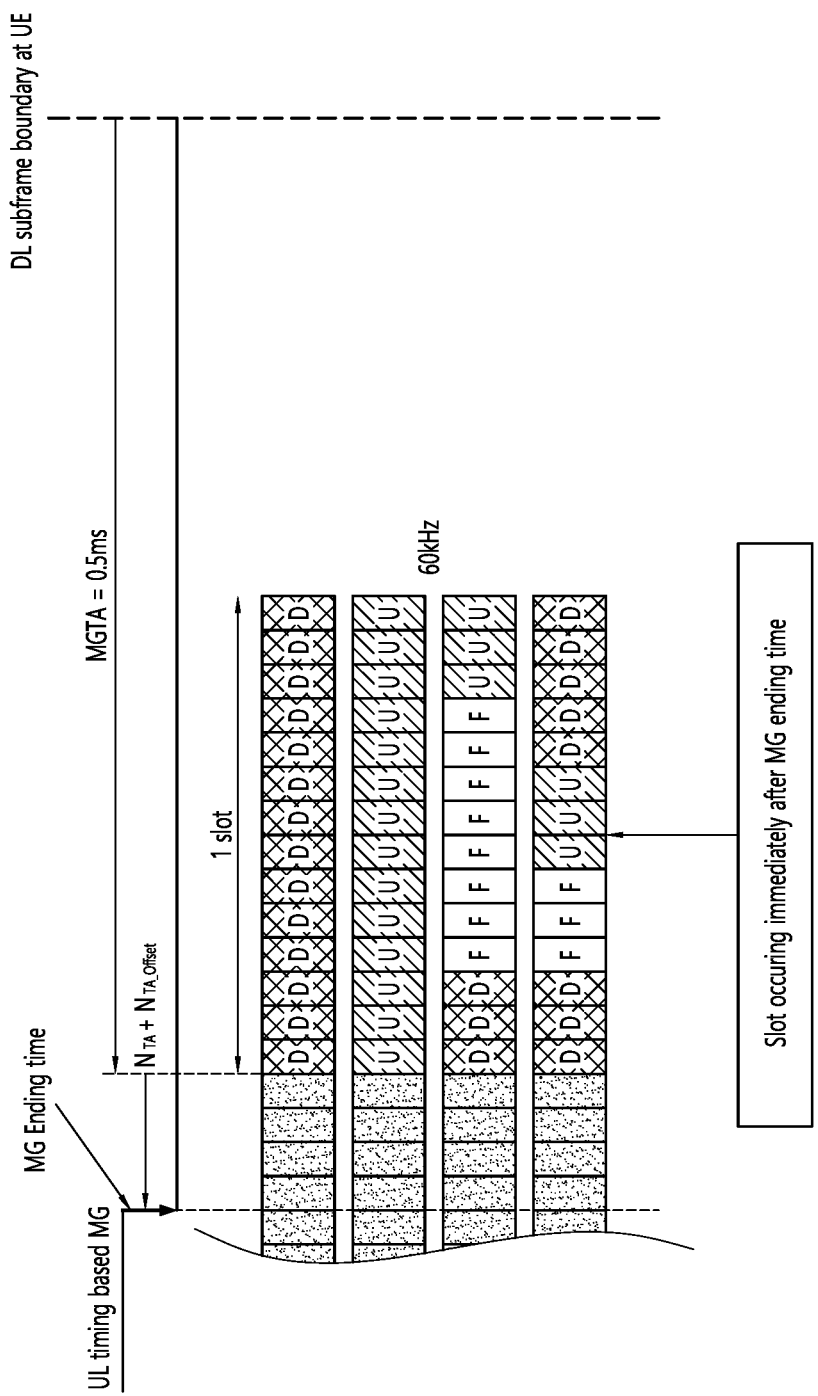
Figure 22H:
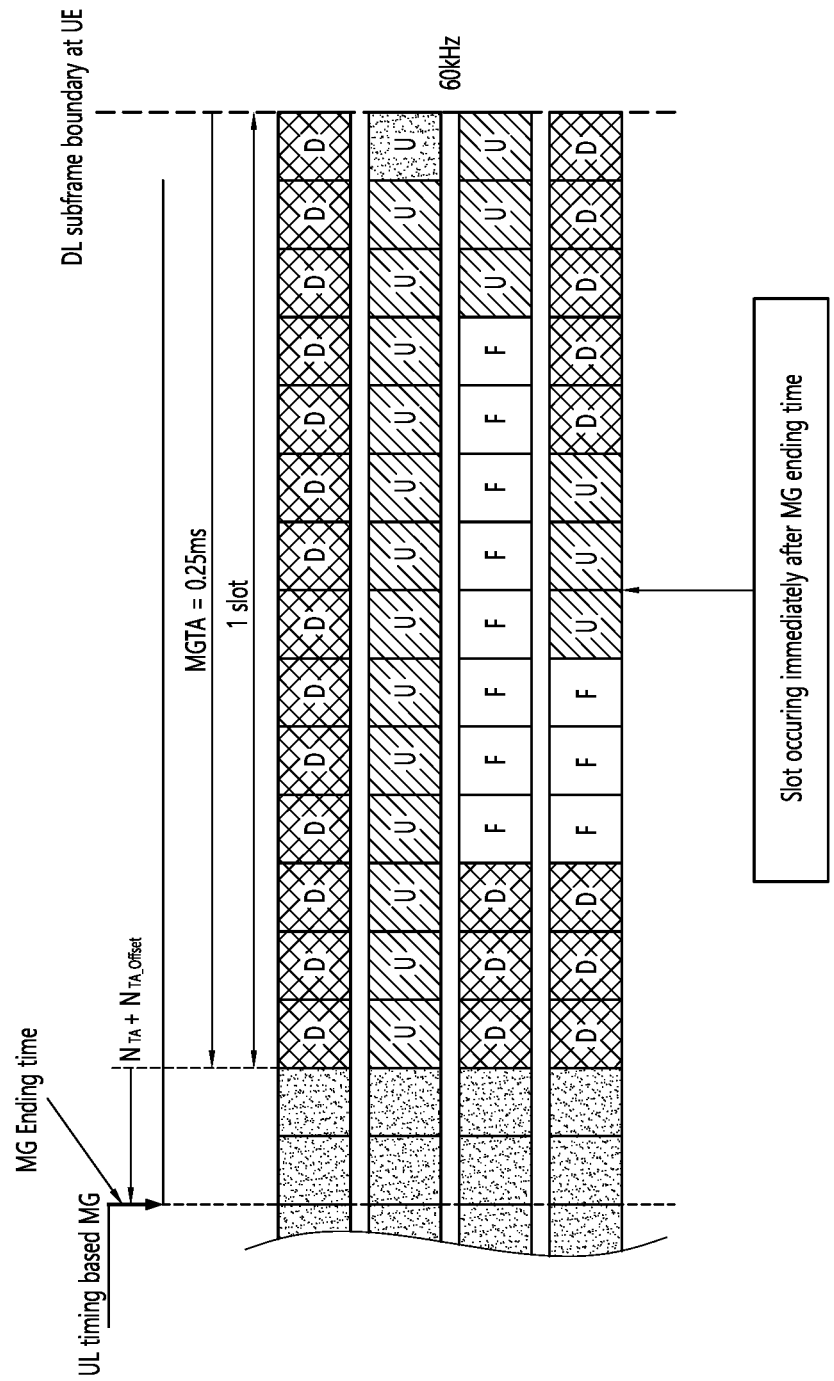
Figure 22:
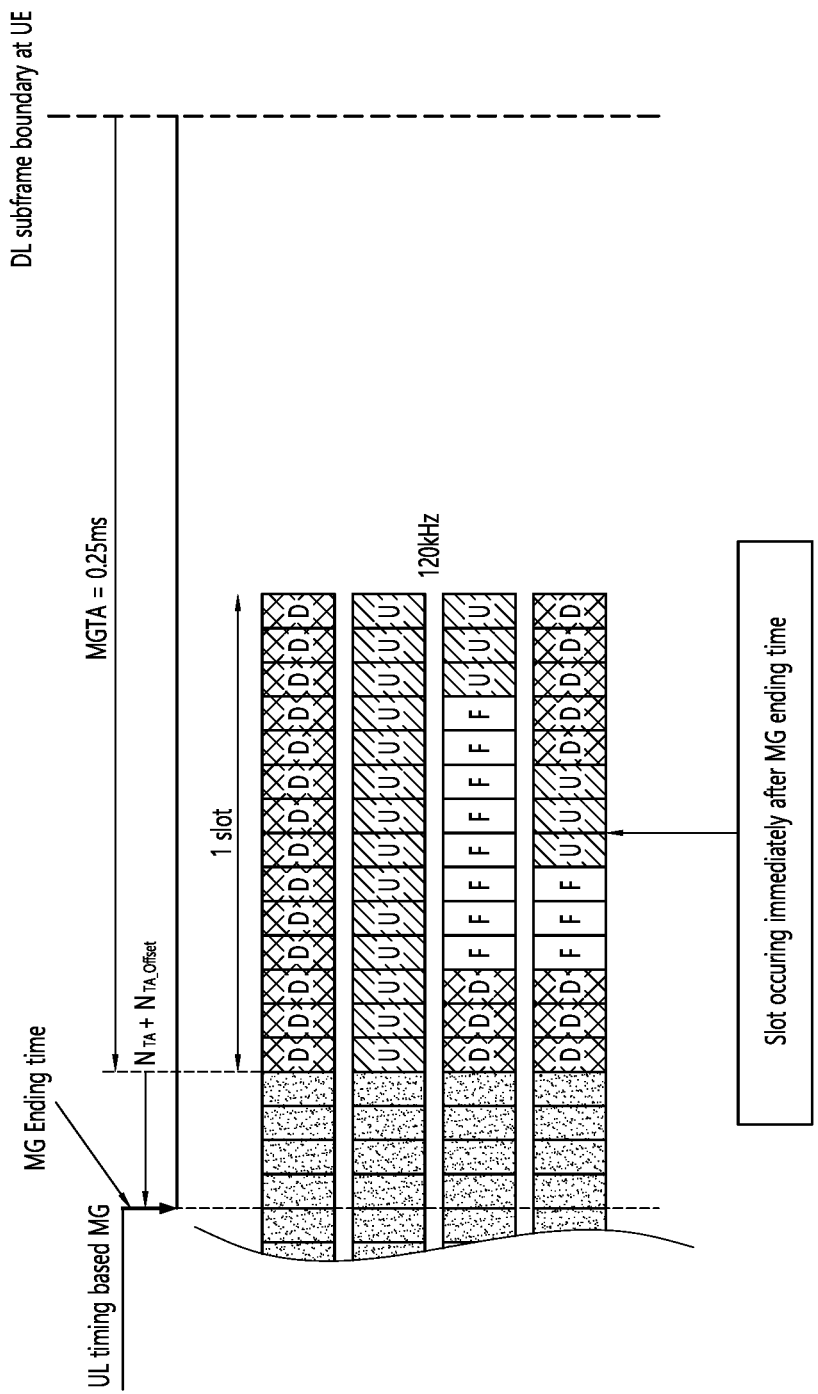
Figure 23A:
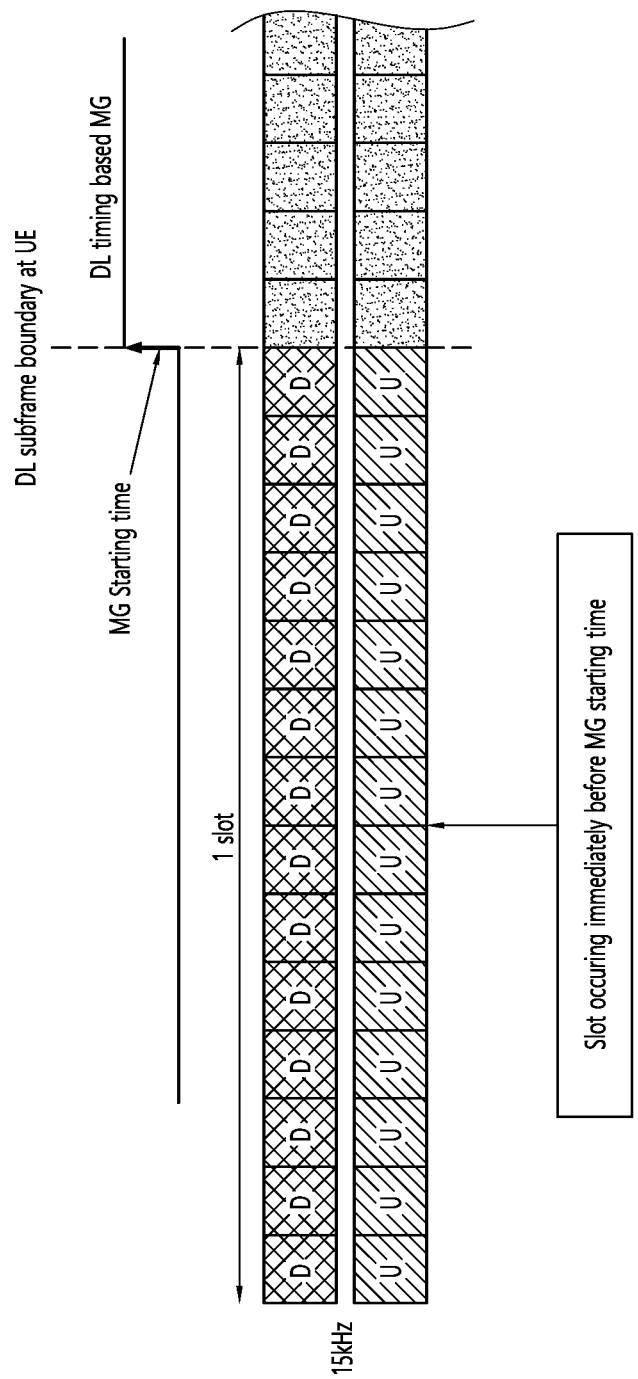
FIGS. 23A to 23F shows an example of UE behavior before or after DL timing based MG with MGTA of 0 ms in NR FDD.
Figure 23B:
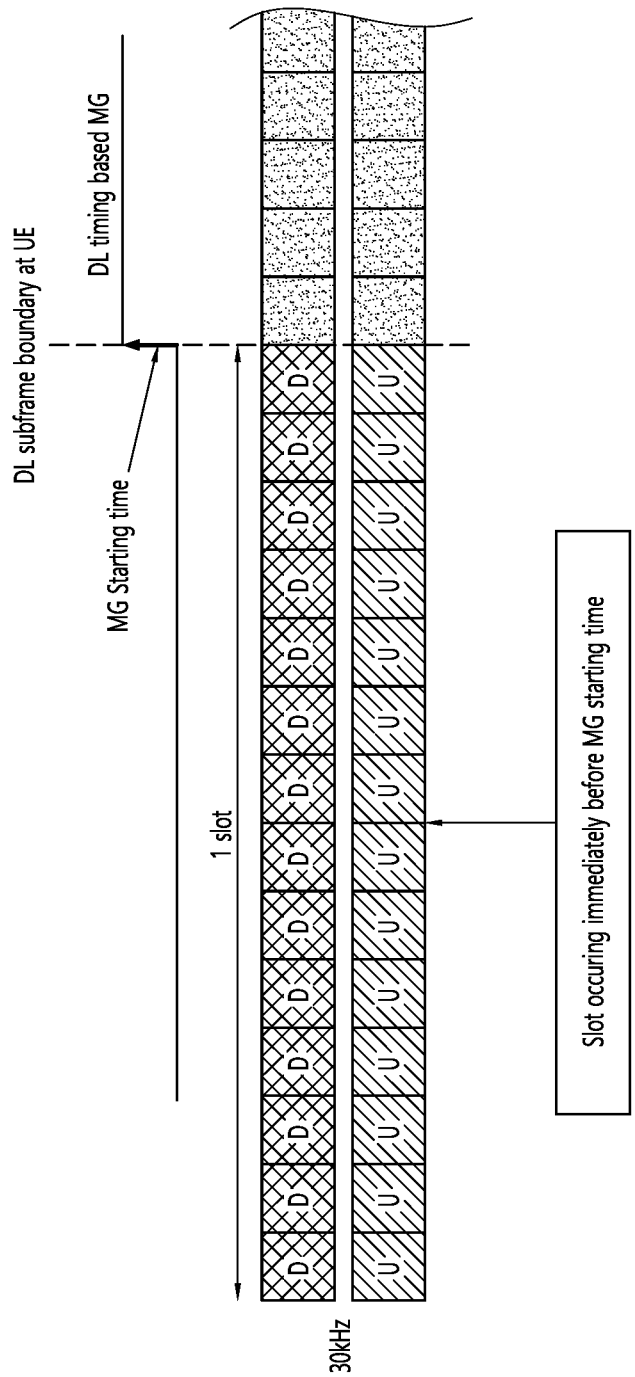
Figure 23C:
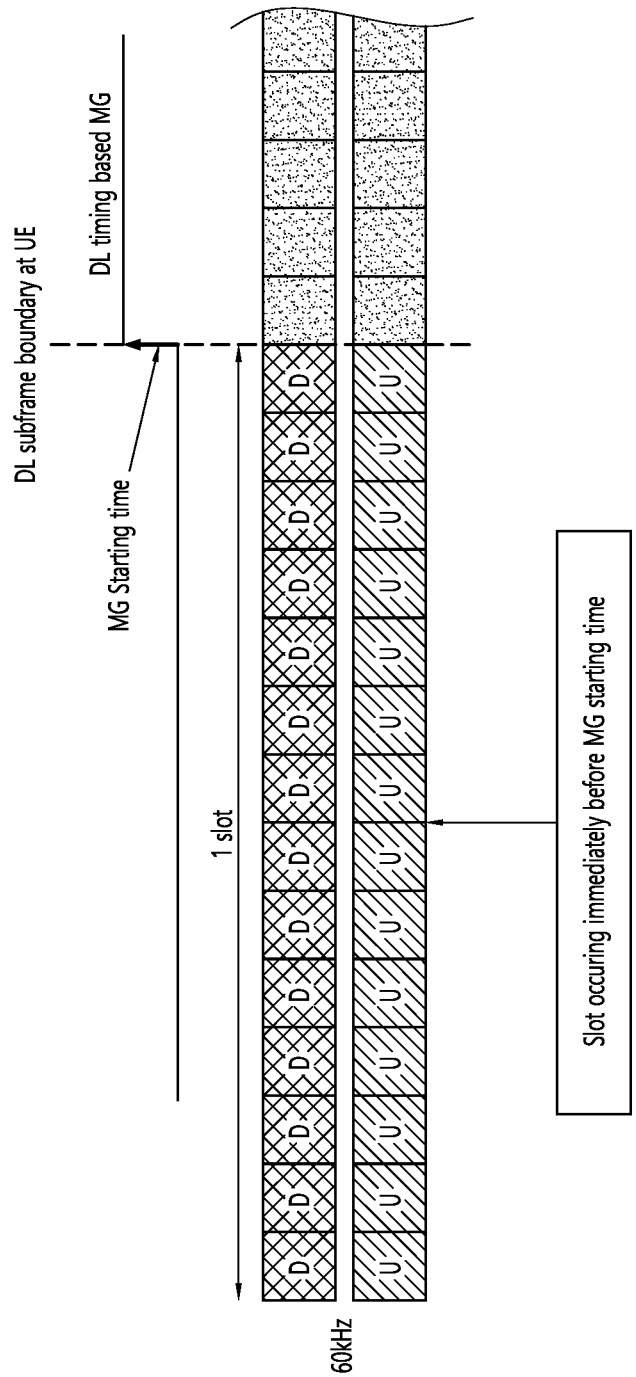
Figure 23D:
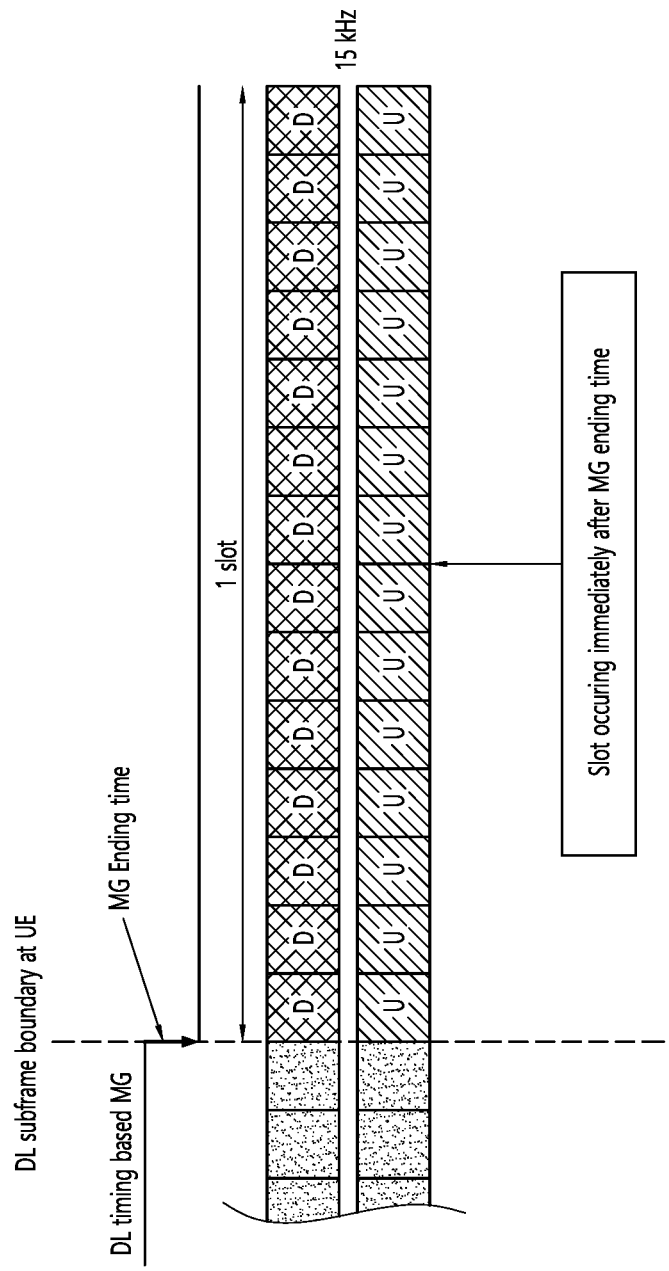
Figure 23E:
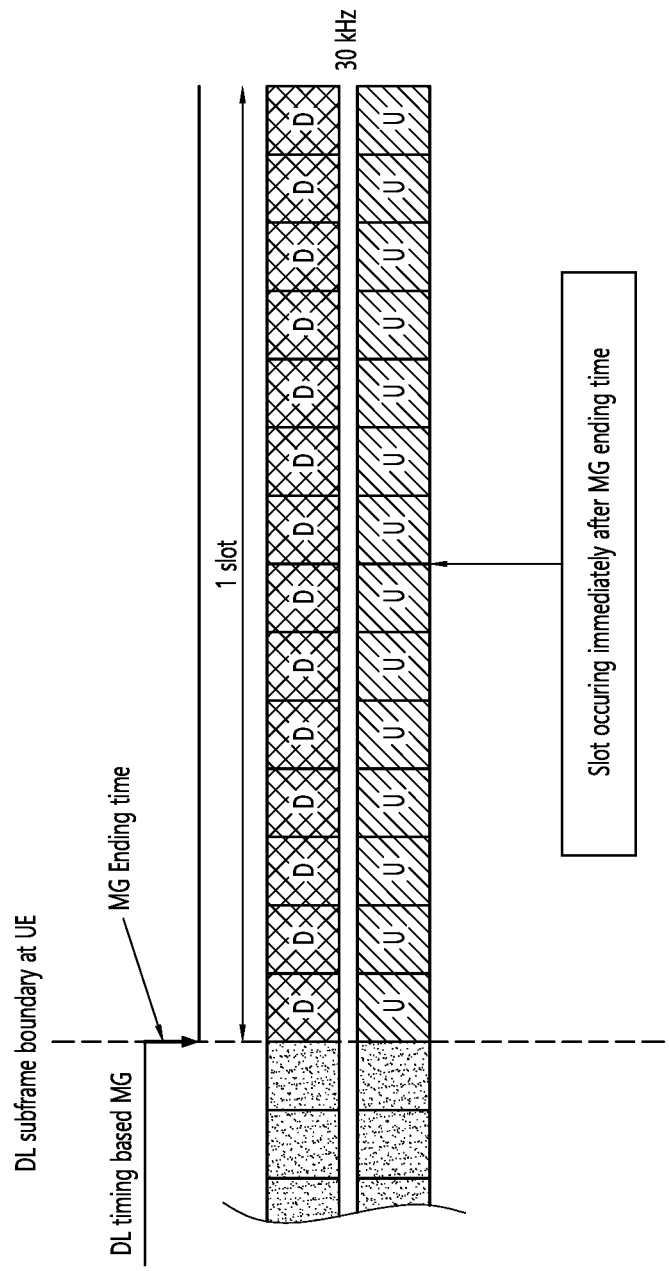
Figure 23F:
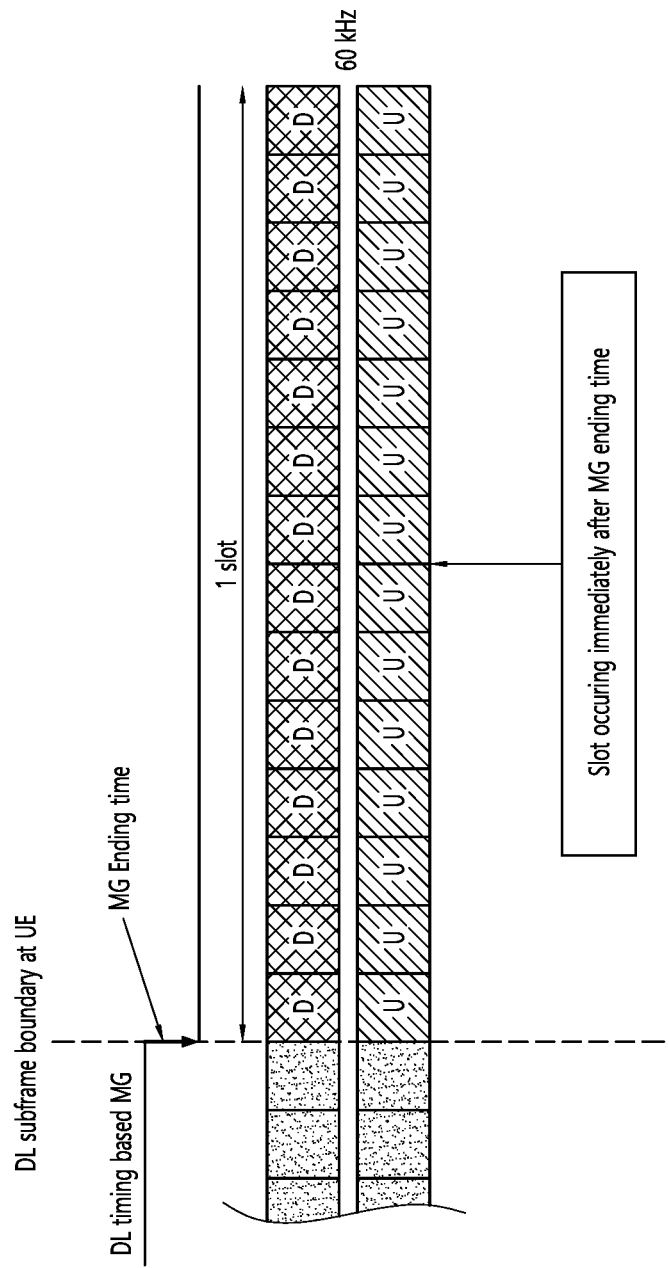
Figure 24A:
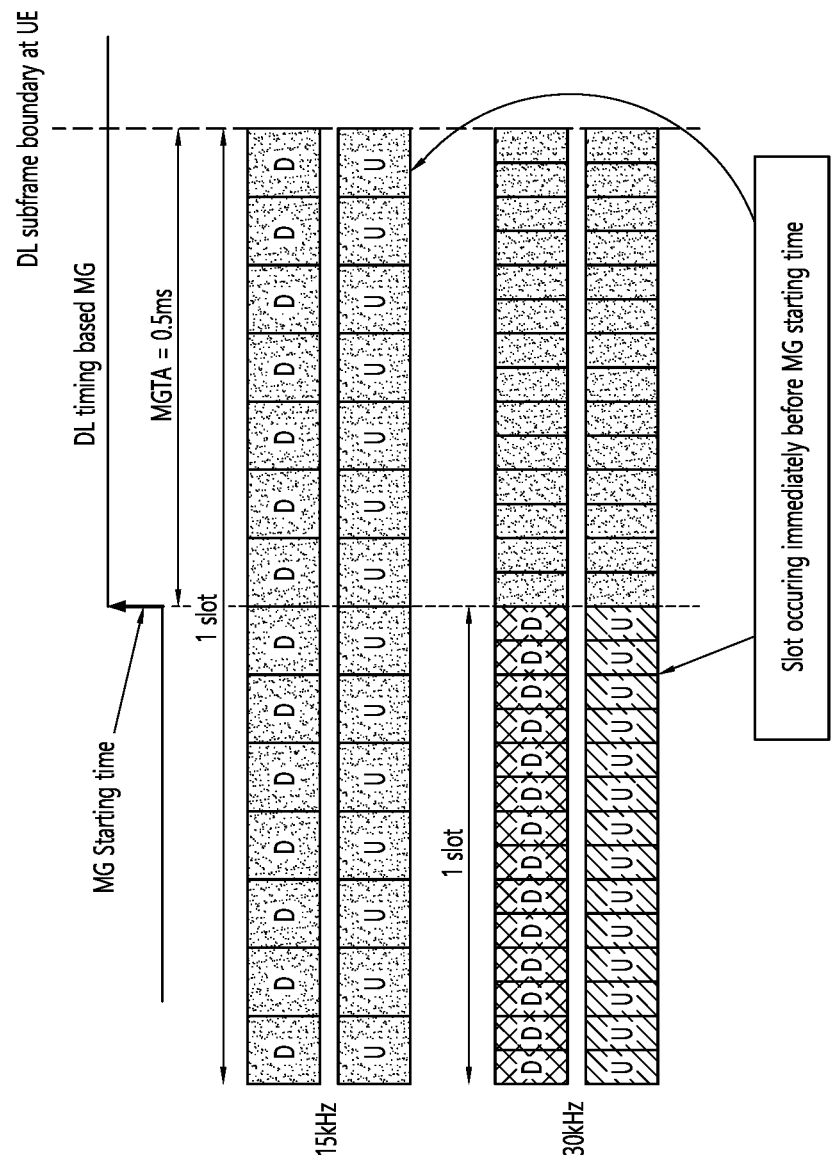
FIGS. 24A to 24D shows an example of UE behavior before or after DL timing based MG with MGTA of 0.5 ms in NR FDD.
Figure 24B:
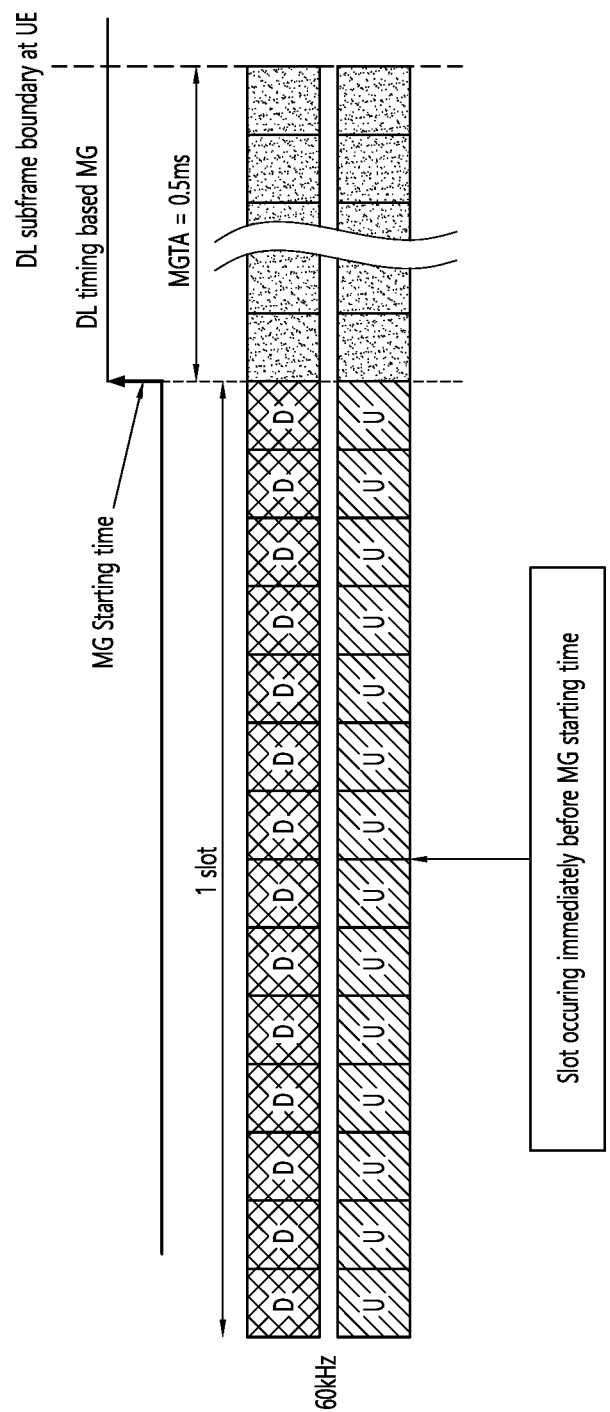
Figure 24C:
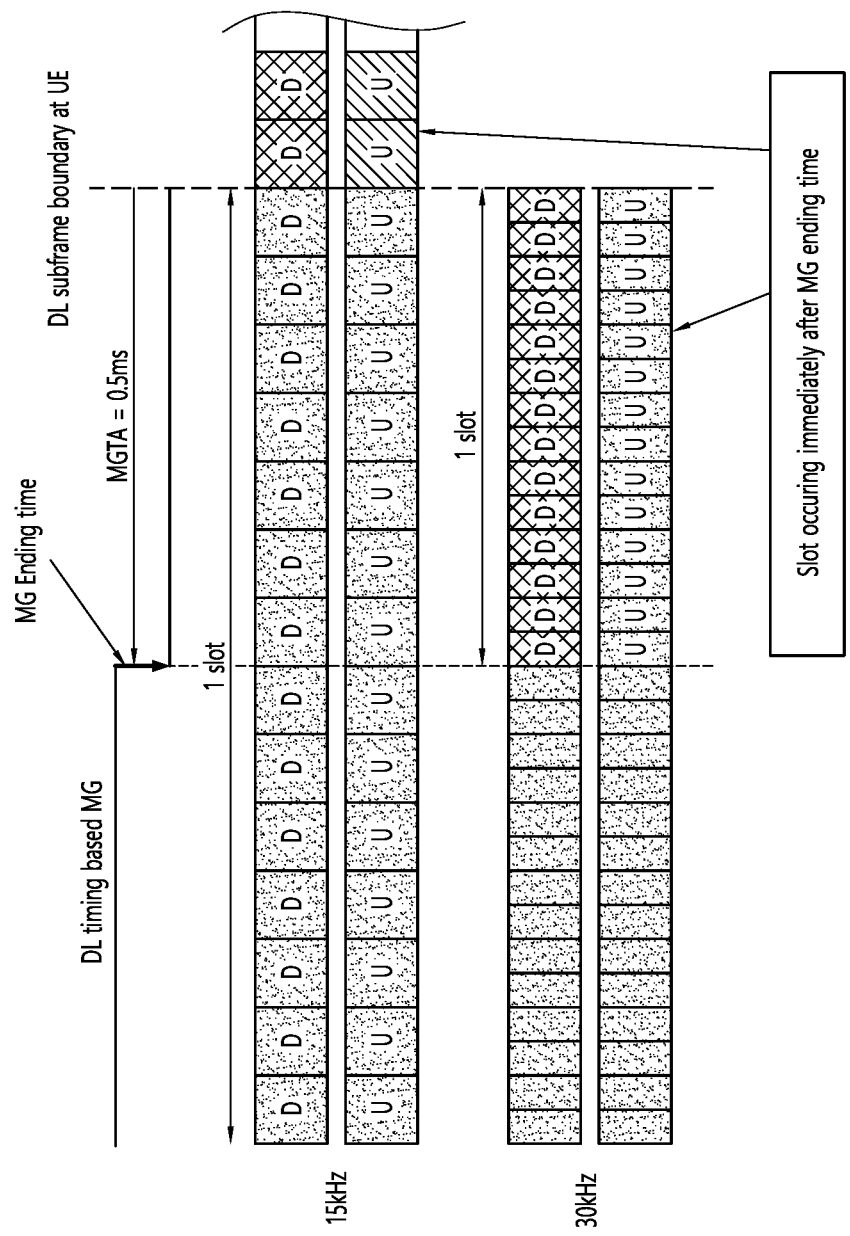
Figure 24D:
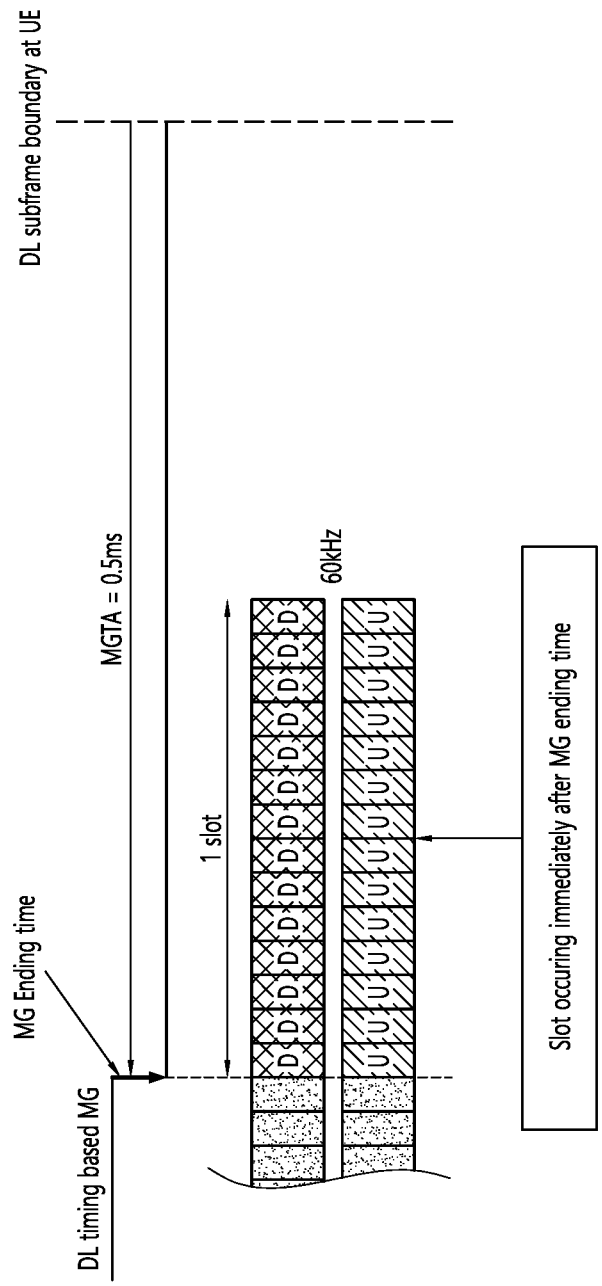

UE behavior before or after MG can be seen as FIGS. 19A to 19F. Herein, DL timing based MG can be applied for the case that the last symbol in the slot before MG is DL symbol (thus, first type and third type of slot formats are shown in FIGS. 19A and 19B). Therefore, 2 different slot formats (all DL, DL-F-UL-DL) can be considered for DL timing based MG.

In FIGS. 19A and 19B, starting time of the MG is the end of the latest subframe of corresponding serving cell occurring immediately before the MG. That is, MG starts at the end of the latest subframe of corresponding serving Cell occurring immediately before the measurement gap.

In FIG. 19C to 19F, all 4 types of slot formats of FIG. 18 are shown. If the first symbol in the slot occurring immediately after the MG is UL symbol, the UE cannot transmit data because the UL symbol is overlapped with the MG due to TA between the UL symbol and DL symbols of other slot formats.

Even if TA, which is applied to UL symbols, is not shown in figures, TA between UL symbol and DL symbol is always applied to UL symbols in all cases.

Based on FIG. 19A to 19F, when the UE determines MG starting time based on DL timing and MGTA is configured with 0 ms for NR TDD, in all SCS cases:

The UE does not expect to transmit or receive data during MG

The UE transmits or receives data in the slot occurring immediately before MG

The UE transmits data in the slot occurring immediately after MG if first symbol in the slot is not UL symbol The UE does not transmit data in the slot occurring immediately after MG if first symbol in the slot is UL symbol The UE receives data in the slot occurring immediately after MG FIGS. 20A to 20F Shows an Example of UE Behavior Before or after UL Timing Based MG with MGTA of 0 ms in NR TDD.

For MGTA of 0 ms, if the starting time of the MG is configured based on UL timing with considering TA (for example, $(N_{TA}+N_{TA,offset})*T_c$ or $N_{TA}+N_{TA,offset}$), UE behavior is shown as FIGS. 20A to 20F.

The UE determines the starting time of the MG based on UL timing and TA. UE behavior before or after MG can be seen as FIG. 20A to 20F. Herein, UL timing based MG can be applied for the case that the last symbol in the slot before MG is UL symbol. That is, the UE may determine the starting time of the MG based on UL timing and TA when the last symbol in the slot occurring immediately before the MG is UL symbol. Therefore, 2 different types of slot formats (all UL, DL-F-UL) can be considered for UL timing based MG.

Here, the UE determines the starting time of the MG to be time that $N_{TA}+N_{TA,offset}$ advanced to the end of the latest subframe of corresponding serving cell occurring immediately before the measurement gap. That is, the MG starts at $N_{TA}+N_{TA,offset}$ before the end of the latest subframe of corresponding serving Cell occurring immediately before the measurement gap.

Based on FIG. 20A to 20F, when the UE determines MG starting time based on UL timing and MGTA is configured with 0 ms for NR TDD, in all SCS cases:

the UE does not expect to transmit or receive data during MG before applying $N_{TA}+N_{TA,offset}$ the UE transmits or receives data in the slot occurring immediately before MG the UE transmits or receives data in the slot occurring immediately after MG FIGS. 21A to 21I Shows an Example of UE Behavior Before or after DL Timing Based MG with MGTA of 0.5 ms or 0.25 ms in NR TDD.

For MGTA of 0.5 ms or 0.25 ms, if MG starting time is configured based on DL timing, UE behavior is shown as FIGS. 21A to 21I.

UE behavior before or after MG can be seen as FIGS. 21A to 21I. Herein, DL timing based MG can be applied for the case that the last symbol in the slot before MG is DL symbol. Therefore, 2 different types of slot formats (all DL, DL-F-UL-DL) can be considered for the DL timing based MG.

For all SCS cases, end time of the last DL symbol in the 2 different types of slot formats (all DL, DL-F-UL-DL) are used as the DL subframe boundary. Slot length depends on SCS. In detail, slot length is 1 ms for 15 kHz SCS, 0.5 ms for 30 kHz SCS, 0.25 ms for 60 kHz SCS and 0.125 ms for 120 kHz SCS. Thus, there are different number of slots overlaps with the MG in different SCS.

For example, when SCS is 15 kHz, half slot overlaps with the MG (with MGTA=0.5 ms) before the DL subframe boundary. When SCS is 30 kHz, 1 slot overlaps with the MG (with MGTA=0.5 ms) before the DL subframe boundary. When SCS is 60 kHz, 2 slot overlaps with the MG (with MGTA=0.5 ms) before the DL subframe boundary and 1 slot overlaps with the MG (with MGTA=0.25 ms) before the DL subframe boundary. When SCS is 120 kHz, 2 slot overlaps with the MG (with MGTA=0.25 ms) before the DL subframe boundary.

Here, the UE determines the starting time of the MG to be time that MGTA advanced to the end of the latest subframe of corresponding serving cell occurring immediately before the MG. That is, the MG starts at MGTA (0.5 ms or 0.25 ms) before the end of the latest subframe of corresponding serving Cell occurring immediately before the measurement gap.

Based on FIG. 21A to 21I, when MG starting time is configured based on DL timing and MGTA is configured with 0.5 ms or 0.25 ms for NR TDD:

1) In cases of SCS is 30 kHz, 60 kHz or 120 kHz:

The UE does not expect to transmit or receive data during MG which MGTA of 0.5 ms or 0.25 ms is applied to The UE transmits or receives data in the slot occurring immediately before MG starting time The UE transmits or receives data in the slot occurring immediately after MG ending time 2) In cases of SCS is 15 kHz:

The UE does not expect to transmit or receive data in the slots overlapped fully or partially with MG after applying MGTA of 0.5 ms or 0.25 ms The UE does not transmit or receive data in the slot occurring immediately before or after MG starting time (because half-slot overlaps with the MG)

The UE transmits or receives data in the slot occurring immediately after MG ending time FIGS. 22A to 22I Shows an Example of UE Behavior Before or after UL Timing Based MG with MGTA of 0.5 ms or 0.25 ms in NR TDD.

For MGTA of 0.5 ms or 0.25 ms, if MG starting time is based on UL timing with considering TA (for example, $(N_{TA}+N_{TA,offset})*T_c$ or $N_{TA}+N_{TA,offset}$), UE behavior is shown as FIG. 22A to 22I.

UE behavior before or after the MG can be seen as FIG. 22A to 22I. Herein, UL timing based MG can be applied for the case that the last symbol in the slot before MG is UL symbol. Therefore, 2 different types of slot formats (all UL, DL-F-UL) can be considered for UL timing based MG.

For all SCS cases, end time of the last UL symbol in the 2 different types of slot formats are used as the UL subframe boundary.

Here, the UE determines the starting time of the MG to be time that MGTA+$(N_{TA}+N_{TA,offset})$ advanced to the end of the latest subframe of corresponding serving Cell occurring immediately before the measurement gap. That is, the MG starts at MGTA+$(N_{TA}+N_{TA,offset})$ before the end of the latest subframe of corresponding serving Cell occurring immediately before the measurement gap.

Based on FIG. 22A to 22I, when MG starting time is configured based on UL timing and MGTA is configured with 0.5 ms or 0.25 ms for NR TDD:

1) In cases of SCS is 30 kHz, 60 kHz or 120 kHz:

The UE does not expect to transmit or receive data during MG after applying MGTA of 0.5 ms or 0.25 ms The UE transmits data in the slot occurring immediately before MG starting time if last UL symbol in the slot is not overlapped with the MG (the last UL symbols in FIG. 22A to 22D are not overlapped with the MG because TA between the UL symbol and DL symbols is always applied to UL symbols)

The UE receives data in the slot occurring immediately before MG starting time if last DL symbol in the slot is not overlapped with the MG The UE transmits or receives data in the slot occurring immediately after MG ending time 2) In case of SCS is 15 kHz:
The UE does not expect to transmit or receive data in the slots overlapped fully or partially with MG after applying MGTA of 0.5 ms or 0.25 ms
The UE does not transmit or receive data in the slot occurring immediately before MG starting time
The UE transmits or receives data in the slot occurring immediately after MG ending time

<NR FDD>

FIGS. 23A to 23F shows an example of UE behavior before or after DL timing based MG with MGTA of 0 ms in NR FDD.

The UE determines the starting time of the MG based on DL timing in NR FDD. For MGTA of 0 ms, if MG starting time is based on DL timing, UE behavior is shown as FIG. 23A to 23F.

UE behavior before or after MG can be seen as FIG. 23A to 23F. Here, the UE determines the starting time of the MG to be the end of the latest DL subframe of corresponding serving Cell occurring immediately before the measurement gap. That is, the MG starts at the end of the latest DL subframe of corresponding serving Cell occurring immediately before the measurement gap.

Based on FIG. 23A to 23F, when MG starting time is configured based on DL timing and MGTA is configured with 0 ms for NR FDD, in all SCS cases:
The UE does not expect to transmit or receive data during MG
The UE transmits or receives data in the slot occurring immediately before MG
The UE does not transmit data in the slot occurring immediately after MG (because the UL symbol occurring immediately after the MG is overlapped with the MG due to TA between the UL symbol and DL symbols)
The UE receives data in the slot occurring immediately after MG FIGS. 24A to 24D Shows an Example of UE Behavior Before or after DL Timing Based MG with MGTA of 0.5 ms in NR FDD.

For MGTA of 0.5 ms, if MG starting time is based on DL timing, UE behavior is shown as FIG. 24A to 24D.

UE behavior before or after MG can be seen as FIG. 24A to 24D. Here, the UE determines the starting time of the MG to be MGTA (0.5 ms) advanced to the end of the latest DL subframe of corresponding serving Cell occurring immediately before the measurement gap. That is, the MG starts at MGTA (0.5 ms) before the end of the latest DL subframe of corresponding serving Cell occurring immediately before the measurement gap.

Based on FIG. 24A to 24D, when MG starting time is configured based on DL timing and MGTA is configured with 0.5 ms for NR FDD:
1) In cases of SCS of 30 kHz and 60 kHz:
The UE does not expect to transmit or receive data during MG after applying MGTA of 0.5 ms
The UE transmits or receives data in the slot occurring immediately before MG starting time
The UE does not transmit data in the slot occurring immediately after MG
The UE receives data in the slot occurring immediately after MG
2) In case of SCS of 15 kHz
The UE does not expect to transmit or receive data in the slots overlapped fully or partially with MG after applying MGTA of 0.5 ms
The UE does not transmit or receive data in the slot occurring immediately before MG starting time
The UE transmits or receives data in the slot occurring immediately after MG ending time Based on explanation mentioned above in both NR TDD case and NR FDD case, the following UE behaviors in Table 25 should be considered for UE behaviors related to the MG.

TABLE 25

1) In the slot occurring immediately before the measurement gap, if measurement gap timing advance is configured with 0ms then:
the UE shall transmit data or
the UE is required to conduct reception of data
2) In the slot occurring immediately after the measurement gap, if measurement gap timing advance is configured with 0ms :
if the following condition is met then the UE shall transmit data:
first symbol in the slot is DL symbol for NR-TDD
if the following condition is met it is up to UE implementation whether or not the UE can transmit:
first symbol in the slot is UL symbol for NR-TDD
otherwise the UE shall not transmit any data
the UE is required to conduct reception of data
3) In the slot occurring immediately before the measurement gap, if measurement gap timing advance is configured with 0.5ms or 0.25ms then:
if the following condition is met then the UE shall transmit data:
for NR-TDD:
SCS of 30 kHz, 60 kHz and 120 kHz; and
last UL symbol in the slot is not overlapped with the MG
for NR-FDD:
SCS of 30 kHz and 60 kHz
otherwise the UE shall not transmit data
if the following condition is met then the UE is required to conduct reception of data:
for NR-TDD:
SCS of 30 kHz, 60 kHz and 120 kHz
last DL symbol in the slot is not overlapped with the MG
for NR-FDD:
SCS of 30 kHz and 60 kHz
otherwise the UE is not required to conduct reception of data
4) In the slot occurring immediately after the measurement gap, if measurement gap timing advance is configured with 0.5 ms or 0.25 ms then:
if the following condition is met then the UE shall transmit data:

TABLE 25-continued for NR-TDD; or
for NR-FDD with SCS of 15 kHz
otherwise the UE shall not transmit any data
the UE is required to conduct reception of data Table 25 shows UE behaviors when the UE receives information related to MGTA from the serving cell (when MGTA is signaled to the UE). Table 25 shows both NR TDD case and NR FDD case based on the received information relate to MGTA. For example, MGTA is assumed to be 0 ms, 0.5 ms or 0.25 ms. UE behaviour mentioned in Table 25 is related to FIG. 26.

Figure 25:
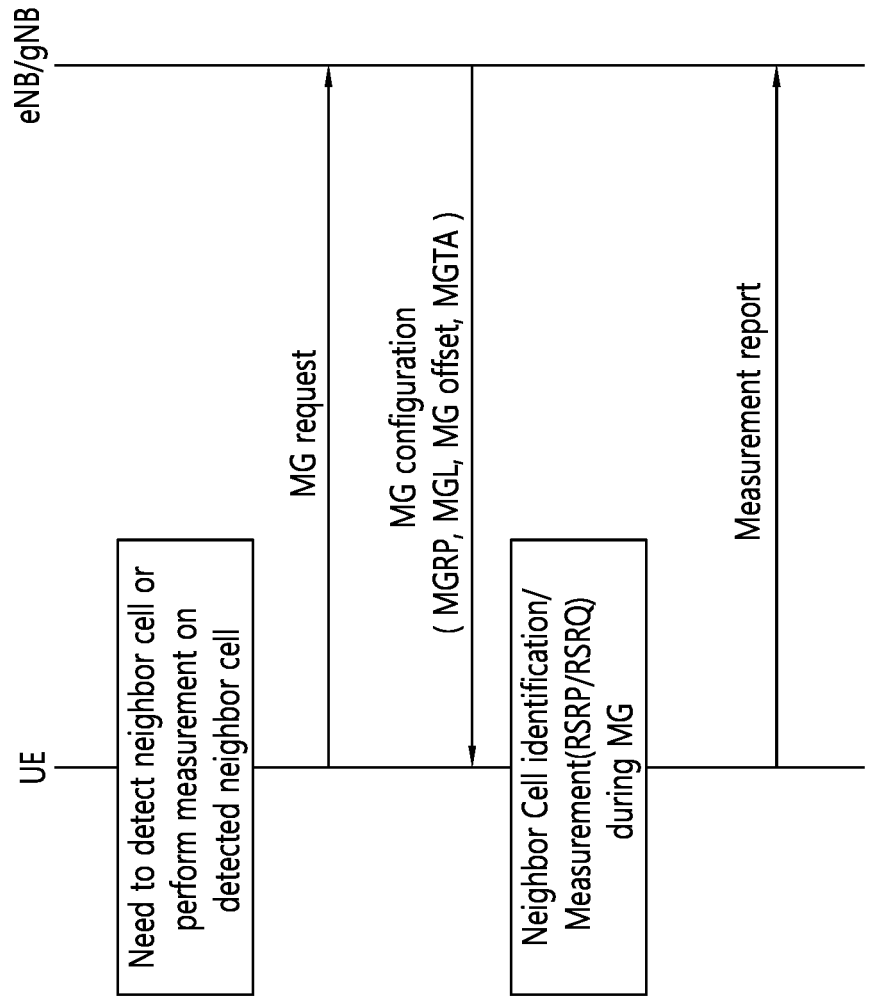
FIG. 25 shows an example of UE behavior for performing measurements.

FIG. 25 Shows an Example of UE Behavior for Performing Measurements.

FIG. 25 shows overall UE operation related to First Example of Disclosure of the Present Specification and Second Example of Disclosure of the Present Specification.

When the UE needs to detect neighbor cell or to perform measurement (SS-RSRP, SS-RSRQ, or SS-SINR(Synchronization signal SINR) on detected neighbor cell, the UE may send MG request to the Node B (eNB or gNB). For example, the UE may send a message that requesting information related to the MG to the Node B.

Then, the Node B may transmit MG configuration to the UE. The MG configuration may be the information related to the MG. The MG configuration may include MGRP, MGL, MG offset, MGTA, etc.

Figure 26:
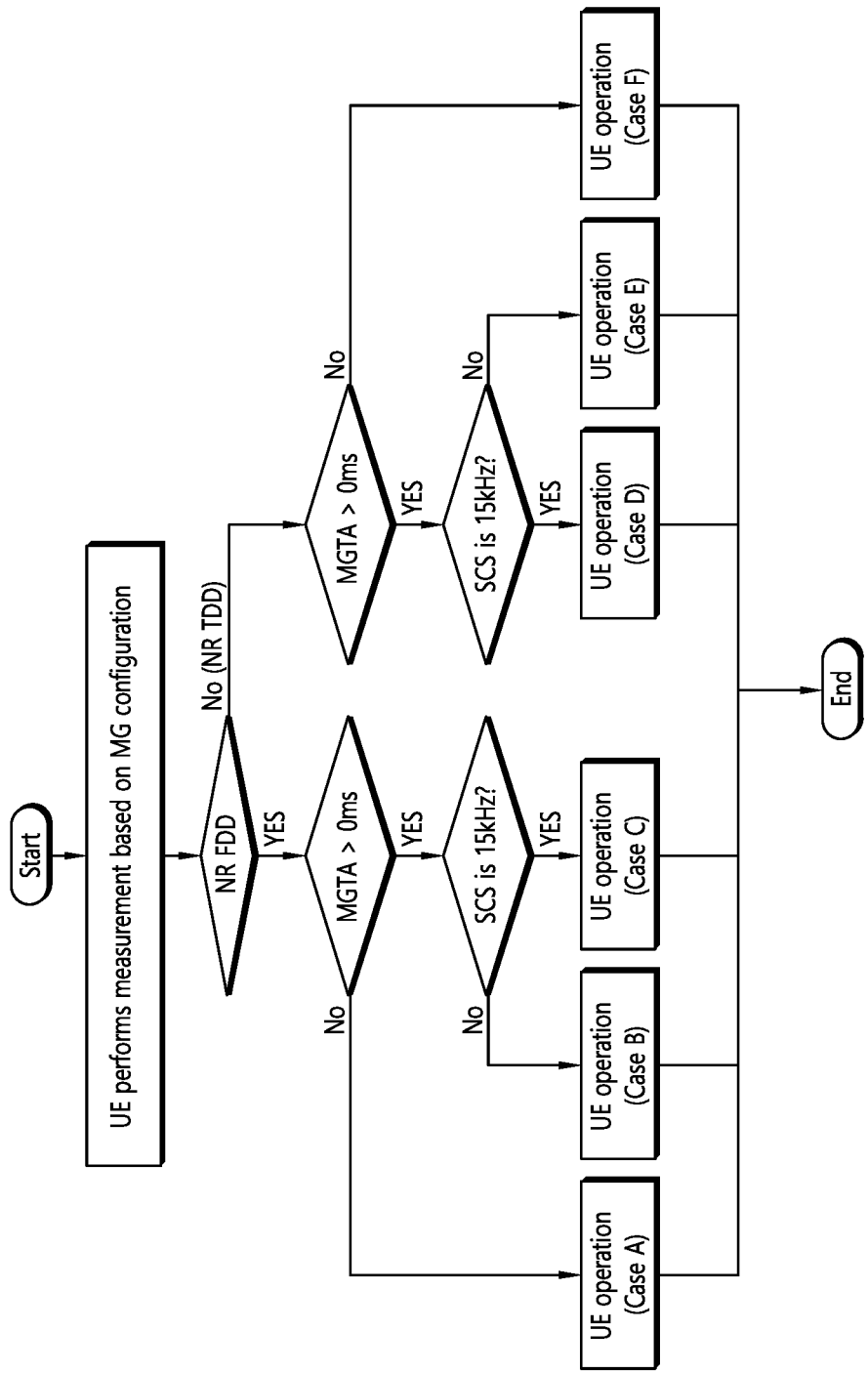
FIG. 26 shows an example of UE behavior for transmission or reception for the serving cell before or after MG.

The UE may perform neighbour cell identification or measurement (RSRP or RSRQ) during the MG. The UE may determine the MG based on the MG configuration. The UE operation, which explained above, is performed in the serving cell slot before/after the MG. FIG. 26 shows an example of UE behaviour based on TDD/FDD, MGTA, SCS.

FIG. 26 Shows an Example of UE Behavior for Transmission or Reception for the Serving Cell Before or after MG.

In FIG. 26, the UE performs measurement (or identification) based on MG configuration, which is received from the Node B of FIG. 25.

Detailed operation of UE varies based on NR FDD/TDD, MGTA and SCS. There are 6 cases based on NR FDD/TDD, MGTA and SCS.

UE operation for Case A (NR FDD, MGTA=0 ms):
The MG starting time is configured based on DL timing and MGTA is configured with 0 ms for NR FDD, in all SCS cases:
    The UE does not expect to transmit or receive data during MG
    The UE transmits or receives data in the slot occurring immediately before MG
    The UE does not transmit data in the slot occurring immediately after MG
    The UE receives data in the slot occurring immediately after MG UE Operation for Case B (NR FDD, MGTA>0 ms, SCS is not 15 kHz) (in Cases of SCS of 30 kHz and 60 kHz):
The MG starting time is configured based on DL timing and MGTA is configured with 0.5 ms for NR FDD:
    The UE does not expect to transmit or receive data during MG after applying MGTA of 0.5 ms
    The UE transmits or receives data in the slot occurring immediately before MG starting time
    The UE does not transmit data in the slot occurring immediately after MG
    The UE receives data in the slot occurring immediately after MG UE operation for Case C(NR FDD, MGTA>0 ms, SCS is 15 kHz)
The MG starting time is configured based on DL timing and MGTA is configured with 0.5 ms for NR FDD:
    The UE does not expect to transmit or receive data in the slots overlapped fully or partially with MG after applying MGTA of 0.5 ms
    The UE does not transmit or receive data in the slot occurring immediately before MG starting time
    The UE transmits or receives data in the slot occurring immediately after MG ending time UE Operation for Case D (NR TDD, MGTA>0 ms, SCS is 15 kHz) (in Case of SCS is 15 kHz)
1) When MG starting time is configured based on DL timing and MGTA is configured with is configured with 0.5 ms or 0.25 ms for NR TDD:
    The UE does not expect to transmit or receive data in the slots overlapped fully or partially with MG after applying MGTA of 0.5 ms or 0.25 ms
    The UE does not transmit or receive data in the slot occurring immediately before or after MG starting time (because half-slot overlaps with the MG)
    The UE transmits or receives data in the slot occurring immediately after MG ending time 2) When MG starting time is configured based on UL timing and MGTA is configured with is configured with 0.5 ms or 0.25 ms for NR TDD:
    The UE does not expect to transmit or receive data in the slots overlapped fully or partially with MG after applying MGTA of 0.5 ms or 0.25 ms
    The UE does not transmit or receive data in the slot occurring immediately before MG starting time
    The UE transmits or receives data in the slot occurring immediately after MG ending time UE Operation for Case E (NR TDD, MGTA>0 ms, SCS is not 15 kHz) (in Cases of SCS is 30 kHz, 60 kHz or 120 kHz)
1) When MG starting time is configured based on DL timing and MGTA is configured with is configured with 0.5 ms or 0.25 ms for NR TDD:
    The UE does not expect to transmit or receive data during MG which MGTA of 0.5 ms or 0.25 ms is applied to
    The UE transmits or receives data in the slot occurring immediately before MG starting time
    The UE transmits or receives data in the slot occurring immediately after MG ending time 2) When MG starting time is configured based on UL timing and MGTA is configured with is configured with 0.5 ms or 0.25 ms for NR TDD:
    The UE does not expect to transmit or receive data during MG after applying MGTA of 0.5 ms or 0.25 ms
    The UE transmits data in the slot occurring immediately before MG starting time if last UL symbol in the slot is not overlapped with the MG The UE receives data in the slot occurring immediately before MG starting time if last DL symbol in the slot is not overlapped with the MG The UE transmits or receives data in the slot occurring immediately after MG ending time UE Operation for Case F (NR TDD, MGTA=0 ms)

Figure 27:
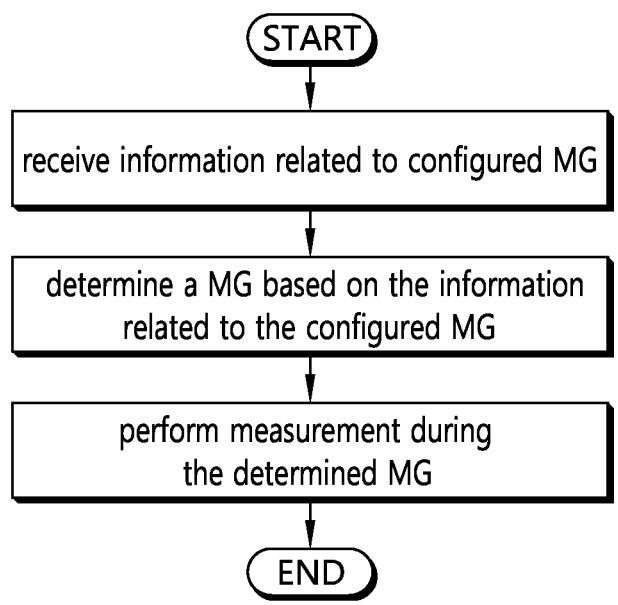
FIG. 27 is a flowchart illustrating operations of a UE based on a disclosure of this specification.

1) When MG starting time is configured based on DL timing and MGTA is configured with 0 ms for NR TDD, in all SCS cases The UE does not expect to transmit or receive data during MG The UE transmits or receives data in the slot occurring immediately before MG The UE transmits data in the slot occurring immediately after MG if first symbol in the slot is not UL symbol The UE does not transmit data in the slot occurring immediately after MG if first symbol in the slot is UL symbol The UE receives data in the slot occurring immediately after MG 2) When MG starting time is configured based on UL timing and MGTA is configured with 0 ms for NR TDD, in all SCS cases the UE does not expect to transmit or receive data during MG before applying $N_{TA}+N_{TA,offset}$ the UE transmits or receives data in the slot occurring immediately before MG the UE transmits or receives data in the slot occurring immediately after MG FIG. 27 is a Flowchart Illustrating Operations of a UE Based on a Disclosure of this Specification.

A UE may receive information related to configured measurement gap (MG) from a serving cell. The information related to the configured MG may be MG configuration of FIG. 25. The information related to the configured MG includes MG timing advance value. Also, The information related to the configured MG may further include MGRP, MGL, MG offset, etc. The configured MG may be one of per-wireless device MG (per-UE MG), per-FR MG for FR1, or per-FR MG for FR2.

The UE may determine a MG based on the information related to the configured MG. The determined MG starts at the MG timing advance value advanced to an end of the latest subframe occurring immediately before the configured MG. The MG timing advance value may be one of 0 ms, 0.25 ms or 0.5 ms. If the MG timing value is equal to 0 ms, the MG timing advance is not applied for measurement. The UE may determine a starting time of the determined MG based on DL timing of the latest subframe immediately before the MG and the information related to the MG. The starting time of the determined MG may be determined to be a time point that the MG timing advance value advanced to the end of the latest subframe occurring immediately before the configured MG.

The UE may perform measurement during the determined MG. The determined starts at the starting time of the MG and the determined MG ends at a time point that a MGL value after from the starting time of the MG. The UE may perform the measurement or cell identification for a cell other than the serving cell during the determined MG.

The UE may transmit uplink data based on subcarrier spacing value configured for the UE and the MG timing value. The UE may transmit uplink data or receive downlink data before/after the determined MG based on NR FDD/TDD, MGTA value, the SCS value and UL or DL timing. Based on that the SCS value configured for the UE is equal to 15 kHz, half-slots, which do not overlap with the determined MG, occur before and after the determined MG.

One of the effect of the present specification is to reduce the resource lost of serving cells due to the MG by defining slots that can not be scheduled for the serving cell before/after MG considering NR TDD, NR FDD, MGTA and SCS.

Figure 28:
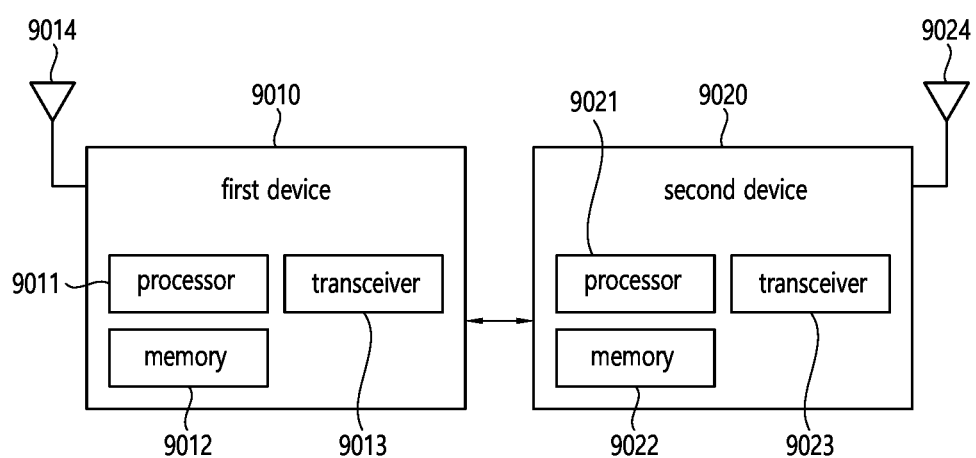
FIG. 28 illustrates a wireless communication device according to embodiments of the present disclosure.

FIG. 28 Illustrates a Wireless Communication Device According to Embodiments of the Present Invention.

FIG. 28 illustrates a wireless communication device according to an embodiment of the present invention.

Referring to FIG. 28, a wireless communication system may include a first device 9010 and a second device 9020.

The first device 9010 may be a base station, a network node, a transmitting terminal, a receiving terminal, a wireless device, a wireless communication device, a vehicle, a vehicle equipped with an autonomous driving function, a connected car, a unmanned aerial vehicle (UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

The second device 9020 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may perform one or more protocols. The processor 9011 may perform one or more layers of a radio interface protocol. The memory 9012 may be connected to the processor 9011 and store various types of information and/or commands. The transceiver 9013 may be connected to the processor 9011 and controlled to transmit/receive a radio signal.

The second device 9020 may include at least one processor, such as a processor 9021, at least one memory, such as a memory 9022, and at least one transceiver, such as a transceiver 9023. The processor 9021 may perform the functions, procedures, and/or methods described above. The processor 9021 may implement one or more protocols. For example, the processor 9021 may implement one or more layers of the radio interface protocol. The memory 9022 may be connected to the processor 9021 and store various types of information and/or commands. The transceiver 9023 may be connected to the processor 9021 and controlled to transmit/receive a radio signal.

The memory 9012 and/or the memory 9022 may be each connected inside or outside the processor 9011 and/or the processor 9021 and connected to other processors through various techniques such as wired or wireless connection.

The first device 9010 and/or the second device 9020 may have one or more antennas. For example, an antenna 9014 and/or an antenna 9024 may be configured to transmit and receive the radio signal.

Figure 29:
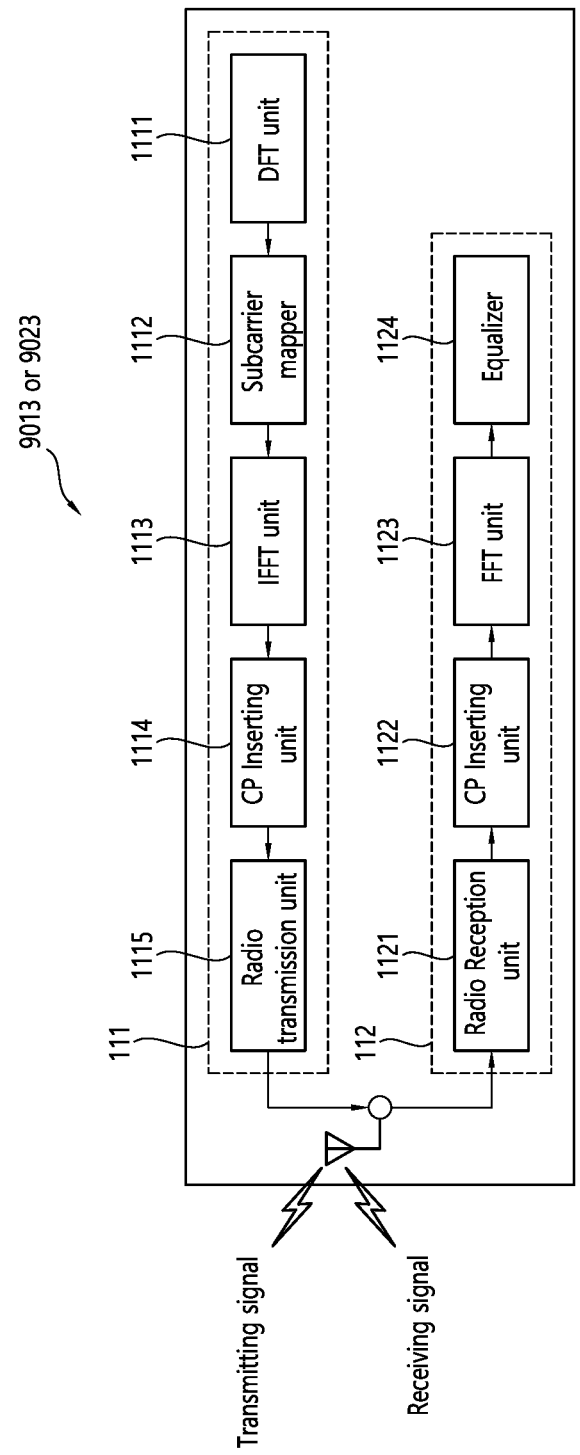
FIG. 29 is a detailed block diagram of a transceiver included in the wireless device shown in FIG. 28.

FIG. 29 is a Detailed Block Diagram of a Transceiver Included in the Wireless Device Shown in FIG. 28.

Referring to FIG. 29, the transceiver (9013 or 9023) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

Figure 30:
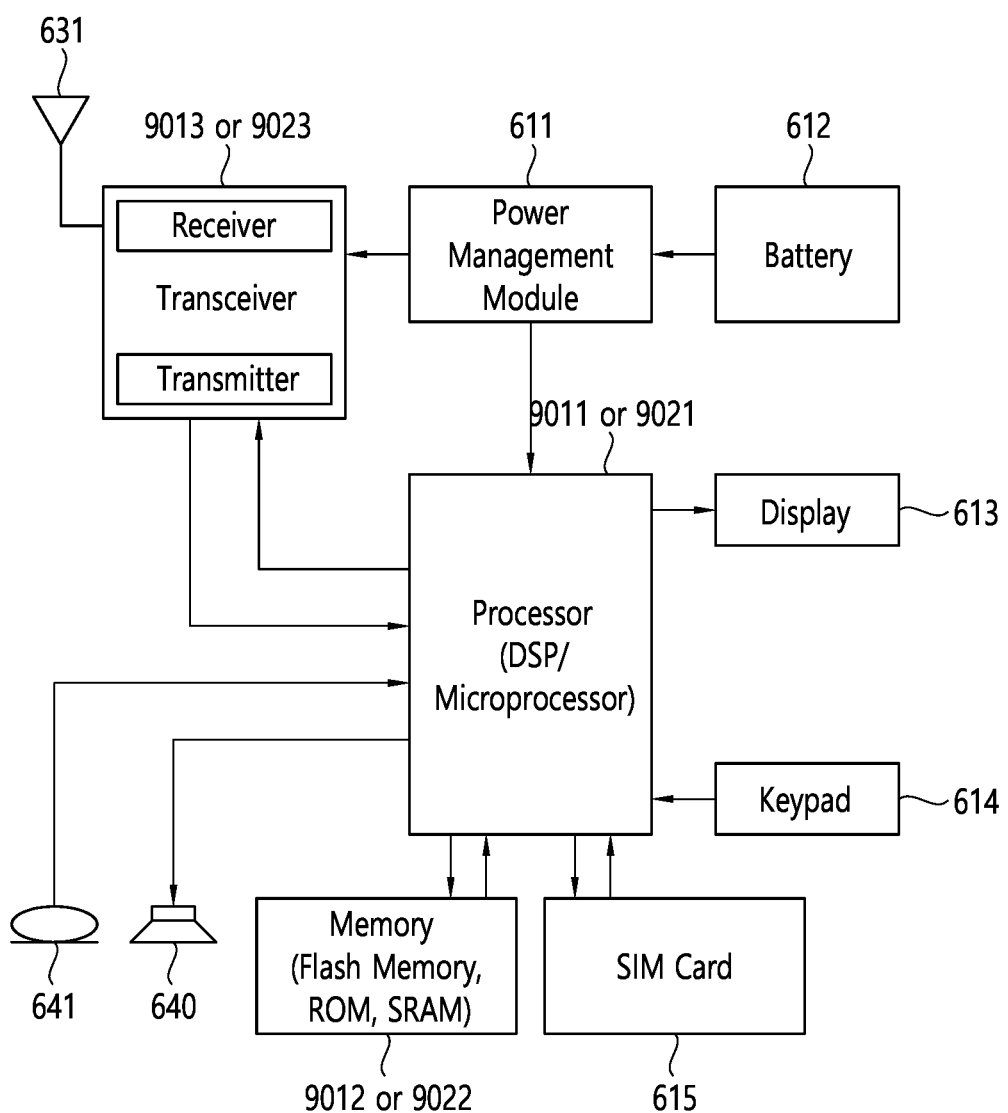
FIG. 30 illustrates a detailed example of the wireless communication device of FIG. 28.

FIG. 30 Illustrates a Detailed Structure of the Wireless Communication Device of FIG. 28.

FIG. 30 shows more detailed wireless communication device to implement an embodiment of the present invention. The present invention described above for UE side or network node side may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641. The processor 610 corresponds to the processor 9011 or the processor 9021. The memory 620 corresponds to the memory 9012 or the memory 9022. The transceiver 630 corresponds to the transceiver 9013 or the transceiver 9023.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to determine transmission power; and control the transceiver 630 to transmit uplink signal based on the transmission power, wherein the transmission power meets a requirement for a minimum Equivalent Isotropic Radiated Power (EIRP) value for the spherical coverage, and wherein the requirement for the minimum EIRP value for the spherical coverage is predetermined based on a 50th percentile of a distribution of measured radiated power.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiment of the present invention shown in FIG. 13, the spherical coverage is considered for the requirement for the EIRP value and the loss term, such as actual display (for example, LCD) and external cover of a UE, are reflected to the requirement.

<The 5G Usage Scenarios for the Present Specification>

Figure 31:
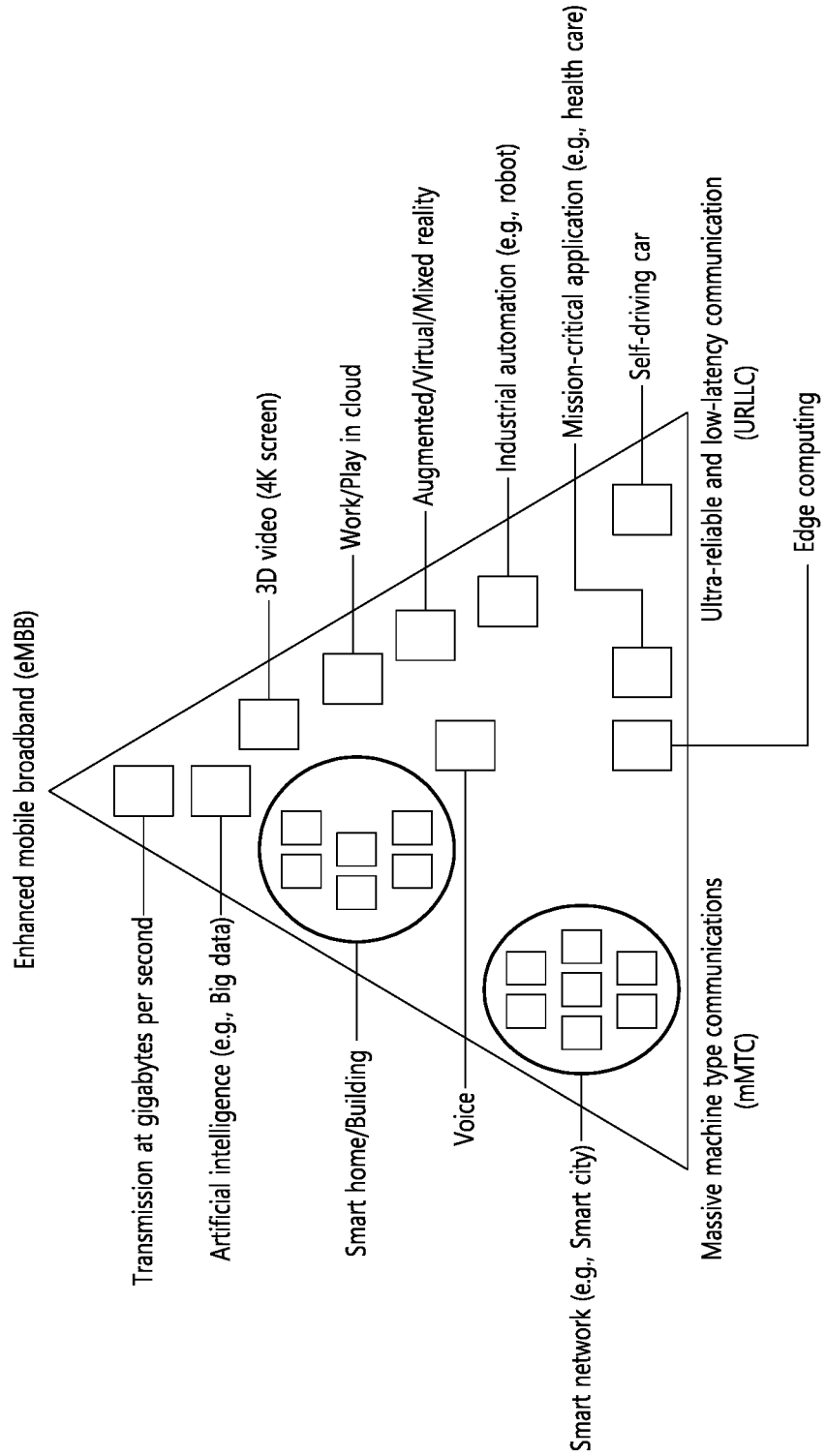
FIG. 31 illustrates examples of 5G usage scenarios to which the technical features of the present disclosure can be applied.

FIG. 31 Illustrates Examples of 5G Usage Scenarios to which the Technical Features of the Present Invention can be Applied.

The 5G usage scenarios shown in FIG. 31 are only exemplary, and the technical features of the present invention can be applied to other 5G usage scenarios which are not shown in FIG. 31.

Referring to FIG. 31, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 31 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

<Artificial Intelligence (AI)>

Artificial Intelligence (AI) refers to AI itself or the field for studying how to build AI, and machine learning refers to the field for defining problems related to AI and studying how to tackle the problems. Machine learning is also defined as an algorithm that constantly performs a specific task to improve performance related to the task.

An Artificial Neural Network (ANN) is a model used in machine learning and may refer to entire models consisting of artificial neurons (nodes) forming a network through combination of synapses to solve problems. The ANN may be defined by a connection pattern between neurons on different layers, a learning procedure for updating a model parameter, and an activation function for generating an output value.

The ANN may include an input layer, an output layer, and selectively one or more hidden layers. Each layer may include one or more neurons, and the ANN may include a synapse connecting one neuron to another neuron. In the ANN, each neuron is able to output a value of an activation function with respect to input signals input through a synapse, weight, and bias.

A model parameter refers to a parameter to be decided through learning, and the model parameter includes a weight of synapse connection, bias in a neuron, etc. In addition, a hyperparameter refers to a parameter to be set in a machine learning algorithm before a learning process begins, and the hyperparameter includes a learning rate, the number of repetition, a mini-batch size, an initialization function, etc.

The purpose of training an ANN is to determine a model that minimizes a loss function. The loss function may be used as an indicator for determining an optimum model parameter in the process of training the ANN.

Machine learning may be classified into supervised learning, unsupervised learning, and reinforcement learning by types of learning.

The supervised learning may refer to a method for training an ANN with a given label for training data, and a label may refer to an answer (or a result) that an ANN needs to infer when training data is input to the ANN. The unsupervised learning may refer to a method for training an ANN without a given label for training data. The reinforcement learning may refer to a learning method for performing training an agent defined in a certain environment to select an action or action sequence that maximizes accumulative compensation.

Machine learning implemented as a Depp Neural Network (DNN) including a plurality of hidden layers among ANNs may be referred to as deep learning, and deep learning is part of machine learning. Hereinafter, machine learning is used to include deep learning.

Figure 32:
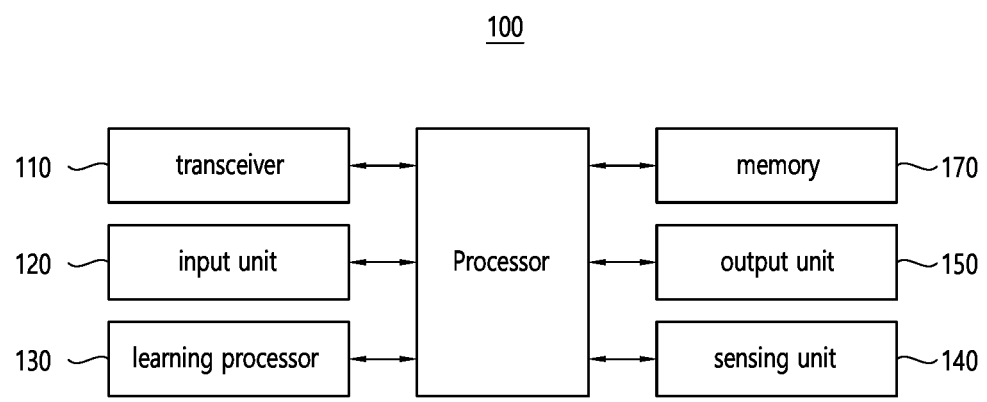
FIG. 32 illustrates an AI device according to an embodiment of the present disclosure.

FIG. 32 Illustrates an AI Device 100 According to an Embodiment of the Present Invention.

The AI device 100 may be a fixed device or a mobile device, such as a TV, a projector, a mobile phone, a smart phone, a desktop, a laptop, a digital broadcasting terminal, a Personal Digital Assistant (PDA), a portable multimedia player (PMP), a navigation device, a tablet PC, a wearable device, a Set Top Box (STB), a DMB receiver, a radio, a washing machine, a refrigerator, a digital signage, a robot, a vehicle, etc. The AI device (100) may correspond to the UE of the present invention or the serving cell of the present invention.

Referring to FIG. 14, a terminal 100 may include a transceiver 110, an input unit 120, a learning processor 130, a sensing unit 140, an output unit 150, a memory 170, and a processor 180.

The transceiver 110 may transmit and receive data with external devices such as other AI devices or an AI server by using a wired or wireless communication technology. For example, the transceiver 110 may transmit and receive sensor information, a user input, a trained model, a control signal, and the like with the external devices.

In this case, the communication technology used by the transceiver 110 may be Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), or the like.

The input unit 120 may acquire various kinds of data.

In this case, the input unit 120 may include a camera to input an image signal, a microphone to receive an audio signal, a user input unit to receive information from a user, and the like. Here, the camera or the microphone may be considered as a sensor, and a signal acquired from the camera or the microphone may be called sensing data or sensor information.

The input unit 120 may acquire input data, which is to be used to acquire an output, by using training data for training a model and a trained model. The input unit 120 may acquire unprocessed input data, and, in this case, the processor 180 or the learning processor 130 may extract an input feature from the input data by performing pre-processing.

The learning processor 130 may train a model, which is configured as an ANN, using training data. Here, a trained ANN may be referred to as a trained model. The trained model may be used to infer a result value from new input data, not from the training data, and the inferred value may be used as the basis of determining a certain operation.

In this case, the learning processor 130 may perform AI processing together with a learning processor of the AI server.

In this case, the learning processor 130 may include a memory integrated into or implemented in the AI device 100. Alternatively, the learning processor 130 may be implemented using the memory 170, an external memory coupled directly to the AI device 100, or a memory used in an external device.

Using various sensors, the sensing unit 140 may acquire at least one of internal information of the AI device 100, surrounding environment information of the AI device 100, or user information.

In this case, the sensors included in the sensor 140 may be a proximity sensor, an illumination sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a radar, a lidar, etc.

The output unit 150 may generate an output relating to visible sense, auditory sense, or tactile sense.

In this case, the output unit 150 may include a display unit for outputting visual information, a speaker for outputting auditory information, a haptic module for outputting tactile information, etc.

The memory 170 may store data that supports various functions of the AI device 100. For example, the memory 170 may store input data acquired by the input unit 120, training data, a trained model, a learning history, etc.

The processor 180 may determine at least one executable operation of the AI device 100 based on information that is decided or generated using a data analytic algorithm or a machine learning algorithm. In addition, the processor 180 may perform an operation that is determined by controlling elements of the AI device 100.

To this end, the processor 180 may request, search, receive, or utilize data from the learning processor 130 or the memory 170, and control the elements of the AI device 100 to execute a predicted operation among the at least one executable operation or execute an operation determined to be preferable.

In this case, when interaction with an external device is required to perform the determined operation, the processor 180 may generate a control signal for controlling the external device, and transmit the generated control signal to the external device.

The processor 180 may acquire intent information regarding a user input, and decide a user's demand based on the intent information.

In this case, using at least one of a Speech To Text (STT) engine for converting a voice input into a character string or a Natural Language Processing (NLP) engine for acquiring intent information of a natural language, the processor 180 may acquire intent information corresponding to a user input.

In this case, at least one of the STT engine or the NLP engine may be partially composed of an ANN that is trained by a machine learning algorithm. In addition, at least one of the STT engine or the NLP engine may be trained by the learning processor 130, by the learning processor of the AI server, or distributed processing thereof.

The processor 180 may collect history information including details of an operation of the AI device 100 or a user's feedback on the operation, and store the collected history information in the memory 170 or the learning processor 130 or transmit the collected history information to an external device such as the AI server. The collected history information may be used to update a trained model.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing measurement, the method performed by a communication device and comprising:
receiving information related to configured measurement gap (MG) from a serving cell,
wherein the information related to the configured MG includes a MG timing advance value;
determining a MG based on the information related to the configured MG; and
performing the measurement during the determined MG,
wherein the determined MG starts at the MG timing advance value advanced to an end of the latest subframe occurring immediately before the configured MG, and
wherein the MG timing advance value is 0.5 ms, and
wherein half-slots, which do not overlap with the determined MG, occur before and after the determined MG, based on a subcarrier spacing (SCS) value configured for the wireless device being equal to 15 kHz.

2. The method of claim 1, wherein a starting time of the determined MG is determined based on DL timing of the latest subframe occurring immediately before the MG and the information related to the configured MG.

3. The method of claim 2, wherein the starting time of the determined MG is determined to be a time point corresponding to the MG timing advance value advanced to the end of the latest subframe occurring immediately before the configured MG.

4. The method of claim 2, wherein the determined MG starts at the starting time of the MG and the determined MG ends at a time point corresponding to a MG Length (MGL) value after the starting time of the MG.

5. The method of claim 1, wherein the information related to the configured MG further includes a MG Length (MGL) value and a MG Repetition Period (MGRP) value.

6. The method of claim 1, wherein the configured MG is one of per-wireless device MG, per-FR MG for (Frequency Range) FR 1, or per-FR MG for FR 2.

7. The method of claim 1, further comprising: transmitting uplink data based on the SCS value and the MG timing advance value.

8. The method of claim 1, wherein the MG timing advance value is one of 0 ms, 0.25 ms or 0.5 ms.

9. The method of claim 8, wherein the MG timing advance is not applied for the measurement based on that the MG timing advance value is equal to 0 ms.

10. A communication device for performing measurement, the communication device comprising,
a transceiver;
a memory and
a processor operatively coupled to the transceiver and the memory, the processor is configured to:
control the transceiver to receive information related to measurement gap (MG) from a serving cell,
wherein the information related to the configured MG includes MG timing advance value;
determine a MG based on the information related to the configured MG; and
perform the measurement during the determined MG,
wherein the determined MG starts at the MG timing advance value advanced to an end of the latest subframe occurring immediately before the configured MG,
wherein the MG timing advance value is 0.5 ms,
and wherein half-slots, which do not overlap with the determined MG, occur before and after the determined MG, based on a subcarrier spacing (SCS) value configured for the wireless device being equal to 15 kHz.

11. The communication device of claim 10, wherein a starting time of the determined MG is determined based on DL timing of the latest subframe occurring immediately before the MG and the information related to the configured MG.

12. The communication device of claim 11, wherein the starting time of the determined MG is determined to be a time point corresponding to the MG timing advance value advanced to the end of the latest subframe occurring immediately before the configured MG.

13. The communication device of claim 10, wherein the information related to the configured MG further includes a MG Length (MGL) value and a MG Repetition Period (MGRP) value.

14. The communication device of claim 10, wherein the configured MG is one of per-wireless device MG, per-FR MG for (Frequency Range) FR 1, or per-FR MG for FR 2.

15. The communication device of claim 10, the processor is further configured to: control the transceiver to transmit uplink data based on the SCS value and the MG timing advance value.

16. The communication of claim 10, wherein the MG timing advance is not applied for the measurement based on that the MG timing advance value is equal to 0 ms.

17. The communication device of claim 10, wherein the communication device is an autonomous driving device communicating with at least one of a mobile terminal, network or autonomous driving vehicle other than the communication device.

18. A processor for a communication device comprising: circuitry,
wherein the circuitry is configured to control the communication device to:
receive information related to measurement gap (MG) from a serving cell,
wherein the information related to the configured MG includes MG timing advance value;
determine a MG based on the information related to the configured MG; and
perform the measurement during the determined MG,
wherein the determined MG starts at the MG timing advance value advanced to an end of the latest subframe occurring immediately before the configured MG, wherein the MG timing advance value is 0.5 ms, and
wherein half-slots, which do not overlap with the determined MG, occur before and after the determined MG, based on a subcarrier spacing (SCS) value configured for the wireless device being equal to 15 kHz.

* * * * *